United States Patent
Hiramoto et al.

(10) Patent No.: US 7,791,766 B2
(45) Date of Patent: Sep. 7, 2010

(54) IMAGE PROCESSING APPARATUS AND IMAGE PROCESSING METHOD

(75) Inventors: Kenichiro Hiramoto, Tokyo (JP); Qing Gao, Tokyo (JP)

(73) Assignee: Konica Minolta Holdings, Inc., Tokyo (JP)

( * ) Notice: Subject to any disclaimer, the term of this patent is extended or adjusted under 35 U.S.C. 154(b) by 161 days.

(21) Appl. No.: 12/267,113

(22) Filed: Nov. 7, 2008

(65) Prior Publication Data
US 2009/0116072 A1    May 7, 2009

Related U.S. Application Data

(63) Continuation of application No. 10/893,607, filed on Jul. 16, 2004, now abandoned.

(30) Foreign Application Priority Data

| Jul. 23, 2003 | (JP) | ............................. 2003-200460 |
| Aug. 12, 2003 | (JP) | ............................. 2003-292120 |
| Aug. 28, 2003 | (JP) | ............................. 2003-304549 |
| Nov. 10, 2003 | (JP) | ............................. 2003-379682 |

(51) Int. Cl.
*G06K 15/00* (2006.01)
*H04N 1/405* (2006.01)

(52) U.S. Cl. ...................... 358/3.19; 358/1.9; 358/3.06; 358/3.09; 358/3.1; 358/3.13; 358/3.14; 358/3.26; 358/3.27; 358/533; 358/534

(58) Field of Classification Search .................. 358/1.9, 358/3.03–3.27, 533–536
See application file for complete search history.

(56) References Cited

U.S. PATENT DOCUMENTS

| 4,920,501 | A | * | 4/1990 | Sullivan et al. ............. 358/3.19 |
| 5,528,377 | A | * | 6/1996 | Hutcheson .................. 358/1.9 |
| 5,973,803 | A | | 10/1999 | Cheung et al. |
| 6,124,844 | A | * | 9/2000 | Ilbery .......................... 345/596 |
| 6,363,172 | B1 | * | 3/2002 | Cheung et al. .............. 382/167 |
| 6,476,934 | B1 | * | 11/2002 | Ilbery et al. ................ 358/3.04 |

(Continued)

FOREIGN PATENT DOCUMENTS

JP    8279920    10/1996

(Continued)

OTHER PUBLICATIONS

"Anti-Correlation Digital Halftoning", Dimitri A. Gusev, Indiana University.*

(Continued)

*Primary Examiner*—King Y Poon
*Assistant Examiner*—Richard Z Zhu
(74) *Attorney, Agent, or Firm*—Lucas & Mercanti, LLP

(57) ABSTRACT

An image processing apparatus comprises a processor for quantizing multi-gradation image data with regard to each of R, G and B to convert it into pseudo halftone output image data. First, the processor performs a first quantization for deciding a dot appearance pattern $C_{(B)i,j}[k]$ with respect to an observed pixel of the multi-gradation image data with regard to blue. After that, the processor performs a second quantization for deciding the dot appearance pattern of green with respect to the observed pixel so as to make an anti-correlation with the dot appearance pattern $C_{(B)i,j}[k]$ decided by the first quantization.

20 Claims, 39 Drawing Sheets

U.S. PATENT DOCUMENTS

| | | | |
|---|---|---|---|
| 6,501,564 B1 * | 12/2002 | Schramm et al. | 358/1.9 |
| 6,798,537 B1 * | 9/2004 | Lau et al. | 358/1.9 |
| 7,079,289 B2 * | 7/2006 | Loce et al. | 358/3.03 |
| 7,173,733 B2 * | 2/2007 | Nino et al. | 358/1.9 |
| 7,362,472 B2 * | 4/2008 | Couwenhoven et al. | 358/3.03 |
| 7,492,482 B2 * | 2/2009 | Gao | 358/3.13 |
| 2002/0097456 A1 * | 7/2002 | Yamada et al. | 358/536 |

FOREIGN PATENT DOCUMENTS

| | | |
|---|---|---|
| JP | 1081026 | 3/1998 |
| JP | 11069155 | 3/1999 |
| JP | 2001245151 | 9/2001 |
| JP | 2001285629 | 10/2001 |
| JP | 2002144608 | 5/2002 |
| WO | 9803341 | 1/1998 |

OTHER PUBLICATIONS

Japanese Decision to Dismiss the Amendment and English Translation thereof.

Japanese Decision of Refusal and English Translation thereof.

Dmitri A. Gusev, "Anti-Correlation Digital Halftoning", Aug. 1998, Indiana University, U.S.A.

* cited by examiner

FIG.9
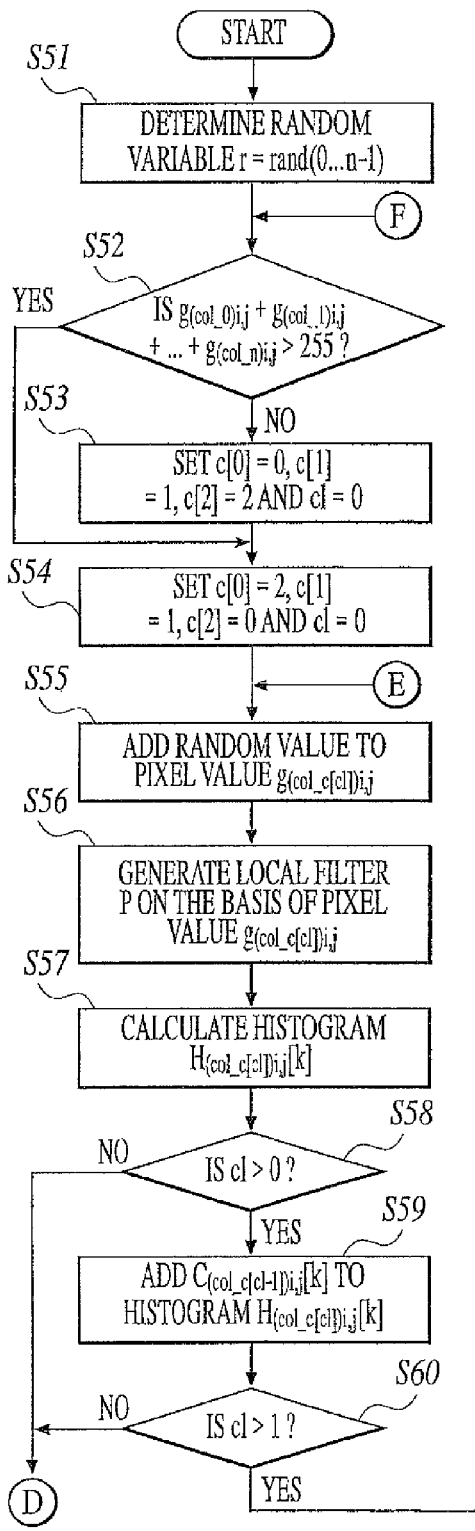
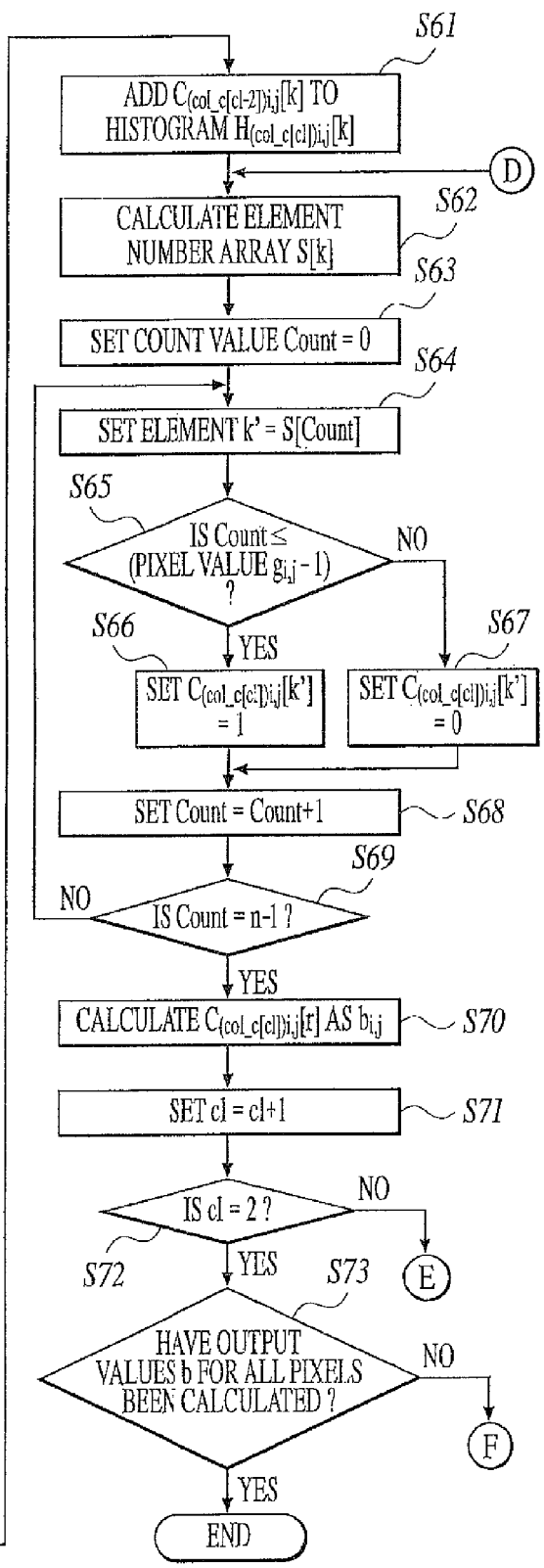

STATUS 1

STATUS 2

| INPUT<br>PIXEL VALUE | STATUS 1<br>LEVEL VALUE ($g_1$) | STATUS 2<br>LEVEL VALUE ($g_2$) |
|---|---|---|
| 96 | 84 | 12 |
| 80 | 60 | 20 |
| 64 | 32 | 32 |
| 48 | 18 | 30 |
| 32 | 8 | 24 |
| 16 | 2 | 14 |
| 0 | 0 | 0 |

FIG.25A

| 4 | 4 | 5 | 5 | 5 | 5 | 5 | 5 | 6 | 6 | 6 | 6 | 1 | 1 | 0 | 0 | 0 | 0 | 0 | 0 | 0 | 0 |
|---|---|---|---|---|---|---|---|---|---|---|---|---|---|---|---|---|---|---|---|---|---|
| 4 | 5 | 5 | 5 | 5 | 5 | 6 | 6 | 6 | 6 | 6 | 6 | 1 | 1 | 1 | 1 | 1 | 0 | 0 | 0 | 0 | 0 |
| 5 | 5 | 5 | 5 | 6 | 6 | 6 | 6 | 7 | 7 | 7 | 7 | 1 | 1 | 1 | 1 | 1 | 1 | 0 | 0 | 0 | 0 |
| 5 | 5 | 5 | 6 | 6 | 6 | 7 | 7 | 7 | 8 | 8 | 8 | 1 | 1 | 1 | 1 | 1 | 1 | 1 | 0 | 0 | 0 |
| 5 | 5 | 6 | 6 | 6 | 7 | 7 | 8 | 8 | 9 | 9 | 9 | 1 | 1 | 1 | 1 | 1 | 1 | 1 | 1 | 0 | 0 |
| 5 | 5 | 6 | 6 | 7 | 8 | 8 | 9 | 10 | 10 | 11 | 11 | 2 | 2 | 1 | 1 | 1 | 1 | 1 | 1 | 0 | 0 |
| 5 | 6 | 6 | 7 | 7 | 8 | 9 | 10 | 11 | 12 | 13 | 13 | 2 | 2 | 2 | 2 | 1 | 1 | 1 | 1 | 1 | 0 |
| 5 | 6 | 6 | 7 | 8 | 9 | 10 | 11 | 13 | 14 | 16 | 16 | 4 | 3 | 3 | 2 | 2 | 1 | 1 | 1 | 1 | 0 |
| 6 | 6 | 7 | 7 | 8 | 10 | 11 | 13 | 15 | 18 | 20 | 21 | 6 | 5 | 4 | 3 | 2 | 1 | 1 | 1 | 1 | 0 |
| 6 | 6 | 7 | 8 | 9 | 10 | 12 | 14 | 18 | 23 | 29 | 32 | 13 | 8 | 5 | 3 | 2 | 2 | 1 | 1 | 1 | 1 |
| 6 | 6 | 7 | 8 | 9 | 11 | 13 | 16 | 20 | 29 | 45 | 64 | 32 | 13 | 6 | 4 | 2 | 2 | 1 | 1 | 1 | 1 |
| 6 | 6 | 7 | 8 | 9 | 11 | 13 | 16 | 21 | 32 | 64 | × |   |   |   |   |   |   |   |   |   |   |

↓ POSITIVE NUMBER

FIG.25B

| 4 | 4 | 5 | 5 | 5 | 5 | 5 | 5 | 6 | 6 | 6 | 6 | 1 | 1 | 0 | 0 | 0 | 0 | 0 | 0 | 0 | 0 |
|---|---|---|---|---|---|---|---|---|---|---|---|---|---|---|---|---|---|---|---|---|---|
| 4 | 5 | 5 | 5 | 5 | 5 | 6 | 6 | 6 | 6 | 6 | 6 | 1 | 1 | 1 | 1 | 1 | 0 | 0 | 0 | 0 | 0 |
| 5 | 5 | 5 | 5 | 6 | 6 | 6 | 6 | 7 | 7 | 7 | 7 | 1 | 1 | 1 | 1 | 1 | 1 | 0 | 0 | 0 | 0 |
| 5 | 5 | 5 | 6 | 6 | 6 | 7 | 7 | 7 | 8 | 8 | 8 | 1 | 1 | 1 | 1 | 1 | 1 | 1 | 0 | 0 | 0 |
| 5 | 5 | 6 | 6 | 6 | 7 | 7 | 8 | 8 | 9 | 9 | 9 | 1 | 1 | 1 | 1 | 1 | 1 | 1 | 1 | 0 | 0 |
| 5 | 5 | 6 | 6 | 7 | 8 | 8 | 9 | 10 | 10 | 11 | 11 | 2 | 2 | 1 | 1 | 1 | 1 | 1 | 1 | 0 | 0 |
| 5 | 6 | 6 | 7 | 7 | 8 | 9 | 10 | 11 | 12 | 13 | 13 | 2 | 2 | 2 | 2 | 1 | 1 | 1 | 1 | 1 | 0 |
| 5 | 6 | 6 | 7 | 8 | 9 | 10 | 11 | 13 | 14 | 16 | 16 | 4 | 3 | 3 | 2 | 2 | 1 | 1 | 1 | 1 | 0 |
| 6 | 6 | 7 | 7 | 8 | 10 | 11 | 13 | 15 | 18 | 20 | 21 | 6 | 5 | 4 | 3 | 2 | 1 | 1 | 1 | 1 | 0 |
| 6 | 6 | 7 | 8 | 9 | 10 | 12 | 14 | 18 | 23 | 29 | 32 | 13 | 8 | 5 | 3 | 2 | 2 | 1 | 1 | 1 | 1 |
| 6 | 6 | 7 | 8 | 9 | 11 | 13 | 16 | 20 | 29 | 45 | 64 | 32 | 13 | 6 | 4 | 2 | 2 | 1 | 1 | 1 | 1 |
| 6 | 6 | 7 | 8 | 9 | 11 | 13 | 16 | 21 | 32 | −64 | × |   |   |   |   |   |   |   |   |   |   |

↓ NEGATIVE NUMBER

STATUS 1: 0, STATUS 2: 32

STATUS 1: 8, STATUS 2: 24

STATUS 1: 16, STATUS 2: 16

STATUS 1: 24, STATUS 2: 8

STATUS 1: 32, STATUS 2: 0

FIG.28A
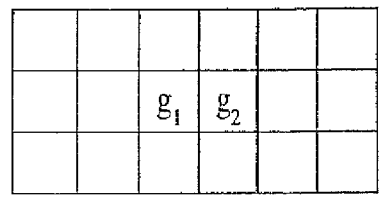
FIG.28B
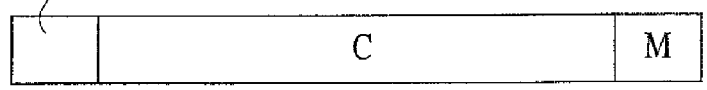
FIG.28C
FIG.28D
| C | C | C | M | C | C | C | C | W | C | C | C | C | C | M | C |
|---|---|---|---|---|---|---|---|---|---|---|---|---|---|---|---|
| W | C | C | C | C | W | C | C | C | M | C | C | M | C | C | C |
| C | C | M | C | C | C | C | M | C | C | C | W | C | C | C | M |
| C | C | C | C | W | C | C | C | C | W | C | C | C | W | C | C |
| C | M | C | C | C | C | M | C | C | C | C | C | M | C | C | W |
| C | C | C | W | C | C | C | W | C | C | C | C | C | W | C | C |
| C | W | C | C | C | C | M | C | C | C | W | C | C | C | C | C |
| C | C | C | M | C | C | C | W | C | C | C | C | M | C | W | C |
| C | C | C | W | C | C | C | C | C | C | M | C | C | C | C | C |
| C | C | C | C | C | M | C | W | C | C | C | W | C | C | C | C |
| C | C | M | C | C | C | C | C | C | M | C | C | C | M | C | W |
| M | C | C | W | C | C | C | M | C | C | C | C | C | C | C | C |
| C | C | C | C | C | C | W | C | C | W | C | C | W | C | M | C |
| C | C | M | C | C | C | C | C | M | C | C | C | C | C | C | C |
| C | C | C | C | M | C | W | C | C | C | C | W | C | M | C | C |
| W | C | C | C | C | C | C | C | W | C | C | C | C | C | C | C |
| C | M | C | C | C | W | C | M | C | C | C | M | C | C | C | C |

FIG.29A

|   |   |       |       |   |   |
|---|---|-------|-------|---|---|
|   |   |       |       |   |   |
|   |   | $g_1$ | $g_2$ |   |   |
|   |   |       |       |   |   |

FIG.29B

| B(C+M) | M | C |
|---|---|---|

FIG.29C

| M | C | B(C+M) | M |
|---|---|---|---|

FIG.29D

| M | M | B | M | M | M | M | M | M | M | M | M | M | M | M | M | M |
|---|---|---|---|---|---|---|---|---|---|---|---|---|---|---|---|---|
| M | C | M | M | M | M | M | B | M | M | M | M | M | M | B | M | M |
| M | M | M | M | M | M | M | M | C | M | M | M | M | M | C | M | M |
| M | M | M | M | B | M | M | M | M | M | M | M | M | M | M | M | M |
| M | M | M | M | M | C | M | M | M | M | M | M | M | M | M | M | M |
| B | M | M | M | M | M | M | M | M | M | M | B | M | M | M | M | M |
| M | M | C | M | M | M | M | M | B | C | M | M | M | M | M | M | M |
| M | M | M | M | M | M | M | M | M | M | M | M | M | M | M | M | M |
| M | M | M | M | M | M | B | M | M | M | M | M | M | M | M | C | M |
| M | M | M | M | M | M | C | M | M | M | B | M | M | M | M | M | M |
| M | B | C | M | M | M | M | M | M | M | C | M | M | M | M | M | M |
| M | M | M | M | M | M | M | M | M | M | M | M | M | M | M | M | M |
| M | M | M | B | M | M | C | M | M | M | M | M | M | M | M | M | C |
| M | C | M | M | M | M | M | M | M | M | C | M | M | M | M | M | M |
| M | M | M | M | M | M | M | M | M | M | M | M | M | M | M | M | M |
| M | M | M | M | M | M | M | M | M | B | M | M | M | M | M | M | M |

FIG.31
PRIOR ART

| $\Delta$ | $P$ |
|---|---|
| $\Delta \in [0, 13/255)$ | $R(K_1, 6, -5)$ |
| $\Delta \in [13/255, 28/255)$ | $R(K_2, 6, -5)$ |
| $\Delta \in [28/255, 31/255]$ | $R(K_3, 5+\text{rand}(0..1), -l_k+1)$ |
| $\Delta \in (31/255, 45/255)$ | $R(K_3, 5+2 \cdot \text{rand}(0..1), -l_k+1)$ |
| $\Delta \in (45/255, 49/255]$ | $R(K_3, 5+\text{rand}(0..2), -l_k+1)$ |
| $\Delta \in (49/255, 88/255)$ | $R(K_3, 5+\text{rand}(0..2), -1)$ |
| $\Delta \in [88/255, 94/255)$ | $R(K_4, 5, -1)$ |
| $\Delta \in [94/255, 95/255]$ | $R(K_4, 5+\text{rand}(0..1), -1)$ |
| $\Delta \in (95/255, 100/255]$ | $R(K_5, 7, -2)$ |
| $\Delta \in (100/255, 106/255]$ | $R(K_6, 7, -2)$ |
| $\Delta \in (106/255, 111/255]$ | $R(K_6, 7, -2-\text{rand}(0..1))$ |
| $\Delta \in (111/255, 120/255]$ | $R(K_6, 5, -3)$ |
| $\Delta \in (120/255, 121/255]$ | $R(K_4, 6, 5)$ |
| $\Delta \in (121/255, 122/255]$ | $R(K_4, 6+\text{rand}(0..1), -l_k+1)$ |
| $\Delta \in (122/255, 1]$ | $R(K_4, [255\Delta]-116, -l_k+1)$ |

FIG.32A PRIOR ART $K_1$

| 4 | 4 | 5 | 5 | 5 | 5 | 5 | 5 | 6 | 6 | 6 | 6 |
| 4 | 5 | 5 | 5 | 5 | 5 | 6 | 6 | 6 | 6 | 6 | 6 |
| 5 | 5 | 5 | 5 | 6 | 6 | 6 | 6 | 7 | 7 | 7 | 7 |
| 5 | 5 | 5 | 6 | 6 | 6 | 7 | 7 | 7 | 8 | 8 | 8 |
| 5 | 5 | 6 | 6 | 6 | 7 | 7 | 8 | 8 | 9 | 9 | 9 |
| 5 | 6 | 6 | 7 | 7 | 8 | 8 | 9 | 10 | 10 | 11 | 11 |
| 5 | 6 | 6 | 7 | 7 | 8 | 9 | 10 | 11 | 12 | 13 | 13 |
| 6 | 6 | 7 | 7 | 8 | 9 | 10 | 11 | 13 | 14 | 16 | 20 |
| 6 | 6 | 7 | 8 | 9 | 10 | 11 | 13 | 15 | 18 | 21 | 21 |
| 6 | 6 | 7 | 8 | 9 | 10 | 12 | 14 | 18 | 28 | 34 | 45 |
| 6 | 6 | 7 | 8 | 9 | 11 | 13 | 16 | 21 | 34 | 46 | 50 |
| 6 | 6 | 7 | 8 | 9 | 11 | 13 | 20 | 21 | 45 | 64 | X |
| 1 | 1 | 1 | 1 | 1 | 2 | 2 | 4 | 5 | 16 | 34 | |
| 1 | 1 | 1 | 1 | 1 | 2 | 2 | 3 | 5 | 6 | 13 | |
| 0 | 1 | 1 | 1 | 1 | 1 | 2 | 3 | 4 | 5 | 5 | |
| 0 | 1 | 1 | 1 | 1 | 1 | 2 | 2 | 3 | 3 | 4 | |
| 0 | 1 | 1 | 1 | 1 | 1 | 2 | 2 | 2 | 2 | 2 | |
| 0 | 0 | 1 | 1 | 1 | 1 | 1 | 1 | 2 | 2 | 2 | |
| 0 | 0 | 0 | 1 | 1 | 1 | 1 | 1 | 1 | 1 | 1 | |
| 0 | 0 | 0 | 1 | 1 | 1 | 1 | 1 | 1 | 1 | 1 | |
| 0 | 0 | 0 | 0 | 0 | 1 | 1 | 1 | 1 | 1 | 1 | |
| 0 | 0 | 0 | 0 | 0 | 0 | 1 | 1 | 1 | 1 | 1 | |
| 0 | 0 | 0 | 0 | 0 | 0 | 0 | 0 | 0 | 1 | 1 | |

FIG 32B
PRIOR ART $K_2$

| 0 | 0 | 0 | 0 | 0 | 0 | 0 | 0 | 0 | 1 | 1 |  |
|---|---|---|---|---|---|---|---|---|---|---|---|
| 0 | 0 | 0 | 0 | 0 | 0 | 1 | 1 | 1 | 1 | 1 |  |
| 0 | 0 | 0 | 0 | 0 | 1 | 1 | 1 | 1 | 1 | 1 |  |
| 0 | 0 | 0 | 1 | 1 | 1 | 1 | 1 | 1 | 1 | 1 |  |
| 0 | 0 | 0 | 1 | 1 | 1 | 1 | 1 | 1 | 1 | 1 |  |
| 0 | 0 | 1 | 1 | 1 | 1 | 1 | 1 | 1 | 2 | 2 |  |
| 0 | 1 | 1 | 1 | 1 | 1 | 1 | 2 | 2 | 2 | 2 |  |
| 0 | 1 | 1 | 1 | 1 | 1 | 2 | 2 | 3 | 3 | 4 |  |
| 0 | 1 | 1 | 1 | 1 | 1 | 2 | 2 | 3 | 4 | 5 | 6 |
| 1 | 1 | 1 | 1 | 1 | 2 | 2 | 3 | 5 | 7 | 13 |  |
| 1 | 1 | 1 | 1 | 1 | 2 | 2 | 4 | 6 | 16 | 34 |  |
| 6 | 6 | 7 | 8 | 9 | 11 | 13 | 16 | 21 | 44 | 64 | X |
| 6 | 6 | 7 | 8 | 9 | 11 | 13 | 16 | 20 | 34 | 46 | 50 |
| 6 | 6 | 7 | 8 | 9 | 10 | 12 | 14 | 18 | 28 | 34 | 44 |
| 6 | 6 | 7 | 7 | 8 | 10 | 11 | 13 | 15 | 18 | 20 | 21 |
| 5 | 6 | 6 | 7 | 8 | 9 | 10 | 11 | 13 | 14 | 16 | 16 |
| 5 | 6 | 6 | 7 | 7 | 8 | 9 | 10 | 11 | 13 | 13 | 13 |
| 5 | 5 | 6 | 6 | 7 | 8 | 8 | 9 | 10 | 10 | 11 | 11 |
| 5 | 5 | 6 | 6 | 6 | 7 | 7 | 8 | 8 | 9 | 9 | 9 |
| 5 | 5 | 5 | 6 | 6 | 6 | 7 | 7 | 7 | 8 | 8 | 8 |
| 5 | 5 | 5 | 5 | 6 | 6 | 6 | 6 | 7 | 7 | 7 | 7 |
| 4 | 5 | 5 | 5 | 5 | 5 | 6 | 6 | 6 | 6 | 6 | 6 |
| 4 | 4 | 5 | 5 | 5 | 5 | 5 | 5 | 6 | 6 | 6 | 6 |

FIG.32C
PRIOR ART $K_3$

| | | | | | | | | | | |
|---|---|---|---|---|---|---|---|---|---|---|
| 0 | 0 | 0 | 0 | 0 | 0 | 0 | 0 | 0 | 1 | 1 |
| 0 | 0 | 0 | 0 | 0 | 0 | 1 | 1 | 1 | 1 | 1 |
| 0 | 0 | 0 | 0 | 0 | 1 | 1 | 1 | 1 | 1 | 1 |
| 0 | 0 | 0 | 1 | 1 | 1 | 1 | 1 | 1 | 1 | 1 |
| 0 | 0 | 0 | 1 | 1 | 1 | 1 | 1 | 1 | 1 | 1 |
| 0 | 0 | 1 | 1 | 1 | 1 | 1 | 1 | 1 | 2 | 2 |
| 0 | 1 | 1 | 1 | 1 | 1 | 1 | 2 | 2 | 2 | 2 |
| 0 | 1 | 1 | 1 | 1 | 1 | 2 | 2 | 3 | 3 | 4 |
| 0 | 1 | 1 | 1 | 1 | 1 | 2 | 3 | 4 | 5 | 6 |
| 1 | 1 | 1 | 1 | 1 | 2 | 2 | 3 | 5 | 8 | 13 |
| 1 | 1 | 1 | 1 | 1 | 2 | 2 | 4 | 6 | 13 | 32 |
| 6 | 6 | 7 | 8 | 9 | 11 | 13 | 16 | 21 | 32 | 64 | X |
| 6 | 6 | 7 | 8 | 9 | 11 | 13 | 16 | 20 | 29 | 45 | 64 |
| 6 | 6 | 7 | 8 | 9 | 10 | 12 | 14 | 18 | 23 | 29 | 32 |
| 6 | 6 | 7 | 7 | 8 | 10 | 11 | 13 | 15 | 18 | 20 | 21 |
| 5 | 6 | 6 | 7 | 8 | 9 | 10 | 11 | 13 | 14 | 16 | 16 |
| 5 | 6 | 6 | 7 | 7 | 8 | 9 | 10 | 11 | 12 | 13 | 13 |
| 5 | 5 | 6 | 6 | 7 | 8 | 8 | 9 | 10 | 10 | 11 | 11 |
| 5 | 5 | 6 | 6 | 6 | 7 | 7 | 8 | 8 | 9 | 9 | 9 |
| 5 | 5 | 5 | 6 | 6 | 6 | 7 | 7 | 7 | 8 | 8 | 8 |
| 5 | 5 | 5 | 5 | 6 | 6 | 6 | 6 | 7 | 7 | 7 | 7 |
| 4 | 5 | 5 | 5 | 5 | 5 | 6 | 6 | 6 | 6 | 6 | 6 |
| 4 | 4 | 5 | 5 | 5 | 5 | 5 | 5 | 6 | 6 | 6 | 6 |

FIG.33A
PRIOR ART $K_4$

| | | | | | | | | | | | |
|---|---|---|---|---|---|---|---|---|---|---|---|
| 0 | 0 | 0 | 0 | 0 | 0 | 0 | 0 | 0 | 1 | 1 | |
| 0 | 0 | 0 | 0 | 0 | 0 | 1 | 1 | 1 | 1 | 1 | |
| 0 | 0 | 0 | 0 | 0 | 1 | 1 | 1 | 1 | 1 | 1 | |
| 0 | 0 | 0 | 1 | 1 | 1 | 1 | 1 | 1 | 1 | 1 | |
| 0 | 0 | 0 | 1 | 1 | 1 | 1 | 1 | 1 | 1 | 1 | |
| 0 | 0 | 1 | 1 | 1 | 1 | 1 | 1 | 1 | 2 | 2 | |
| 0 | 1 | 1 | 1 | 1 | 1 | 1 | 2 | 2 | 2 | 2 | |
| 0 | 1 | 1 | 1 | 1 | 1 | 2 | 2 | 2 | 3 | 3 | 4 |
| 0 | 1 | 1 | 1 | 1 | 1 | 2 | 3 | 4 | 5 | 5 | 6 |
| 1 | 1 | 1 | 1 | 1 | 2 | 2 | 3 | 5 | 8 | 13 | |
| 1 | 1 | 1 | 1 | 1 | 2 | 2 | 4 | 6 | 13 | 32 | |
| 6 | 6 | 7 | 8 | 9 | 11 | 13 | 16 | 21 | 32 | 64 | X |
| 6 | 6 | 7 | 8 | 9 | 11 | 13 | 16 | 20 | 32 | 45 | 64 |
| 6 | 6 | 7 | 8 | 9 | 10 | 10 | 12 | 20 | 18 | 23 | 32 |
| 6 | 6 | 7 | 7 | 8 | 10 | 11 | 13 | 15 | 18 | 20 | 21 |
| 5 | 6 | 6 | 7 | 8 | 9 | 10 | 11 | 13 | 16 | 16 | 16 |
| 5 | 6 | 6 | 7 | 7 | 8 | 9 | 10 | 11 | 12 | 13 | 13 |
| 5 | 5 | 6 | 6 | 7 | 8 | 8 | 9 | 10 | 10 | 11 | 11 |
| 5 | 5 | 6 | 6 | 6 | 7 | 7 | 8 | 8 | 9 | 9 | 9 |
| 5 | 5 | 5 | 6 | 6 | 6 | 7 | 7 | 7 | 8 | 8 | 8 |
| 5 | 5 | 5 | 5 | 6 | 6 | 6 | 6 | 7 | 7 | 7 | 7 |
| 4 | 5 | 5 | 5 | 5 | 5 | 6 | 6 | 6 | 6 | 6 | 6 |
| 4 | 4 | 5 | 5 | 5 | 5 | 5 | 5 | 6 | 6 | 6 | 6 |

FIG. 33B
PRIOR ART $K_5$

| | | | | | | | | | | |
|---|---|---|---|---|---|---|---|---|---|---|
| 1 | 1 | 1 | 1 | 1 | 1 | 1 | 1 | 1 | 1 | |
| 1 | 1 | 1 | 1 | 1 | 1 | 1 | 1 | 1 | 1 | |
| 1 | 1 | 1 | 1 | 1 | 1 | 1 | 1 | 1 | 1 | |
| 1 | 1 | 1 | 1 | 1 | 1 | 1 | 1 | 1 | 1 | |
| 1 | 1 | 1 | 1 | 1 | 1 | 1 | 1 | 1 | 1 | |
| 1 | 1 | 1 | 1 | 1 | 1 | 1 | 1 | 1 | 1 | |
| 1 | 1 | 1 | 1 | 1 | 1 | 1 | 1 | 1 | 1 | |
| 1 | 1 | 1 | 1 | 1 | 1 | 1 | 1 | 1 | 1 | |
| 1 | 1 | 1 | 1 | 1 | 1 | 1 | 1 | 1 | 2 | |
| 1 | 1 | 1 | 1 | 1 | 1 | 1 | 1 | 3 | 5 | |
| 1 | 1 | 1 | 1 | 1 | 1 | 1 | 2 | 6 | 24 | |
| 1 | 1 | 1 | 1 | 1 | 1 | 2 | 8 | 26 | 64 | X |
| 1 | 1 | 1 | 1 | 1 | 1 | 2 | 7 | 26 | 45 | 64 |
| 1 | 1 | 1 | 1 | 1 | 1 | 2 | 5 | 17 | 26 | 26 |
| 1 | 1 | 1 | 1 | 1 | 1 | 1 | 2 | 5 | 7 | 8 |
| 1 | 1 | 1 | 1 | 1 | 1 | 1 | 1 | 2 | 2 | 2 |
| 1 | 1 | 1 | 1 | 1 | 1 | 1 | 1 | 1 | 1 | 1 |
| 1 | 1 | 1 | 1 | 1 | 1 | 1 | 1 | 1 | 1 | |
| 1 | 1 | 1 | 1 | 1 | 1 | 1 | 1 | 1 | 1 | |
| 1 | 1 | 1 | 1 | 1 | 1 | 1 | 1 | 1 | 1 | |
| 1 | 1 | 1 | 1 | 1 | 1 | 1 | 1 | 1 | 1 | |
| 1 | 1 | 1 | 1 | 1 | 1 | 1 | 1 | 1 | 1 | |

FIG.33C PRIOR ART $K_5$

| | | | | | | | | | | | |
|---|---|---|---|---|---|---|---|---|---|---|---|
| 1 | 1 | 1 | 1 | 1 | 1 | 1 | 1 | 1 | 1 | 1 | |
| 1 | 1 | 1 | 1 | 1 | 1 | 1 | 1 | 1 | 1 | 1 | |
| 1 | 1 | 1 | 1 | 1 | 1 | 1 | 1 | 1 | 1 | 1 | |
| 1 | 1 | 1 | 1 | 1 | 1 | 1 | 1 | 1 | 1 | 1 | |
| 1 | 1 | 1 | 1 | 1 | 1 | 1 | 1 | 1 | 1 | 1 | |
| 1 | 1 | 1 | 1 | 1 | 1 | 1 | 1 | 1 | 1 | 1 | |
| 1 | 1 | 1 | 1 | 1 | 1 | 1 | 1 | 1 | 1 | 1 | |
| 1 | 1 | 1 | 1 | 1 | 1 | 1 | 1 | 1 | 1 | 1 | |
| 1 | 1 | 1 | 1 | 1 | 1 | 1 | 1 | 1 | 1 | 2 | |
| 1 | 1 | 1 | 1 | 1 | 1 | 1 | 1 | 1 | 3 | 5 | |
| 1 | 1 | 1 | 1 | 1 | 1 | 1 | 1 | 2 | 6 | 24 | |
| 1 | 1 | 1 | 1 | 1 | 1 | 1 | 2 | 6 | 26 | 64 | X |
| 1 | 1 | 1 | 1 | 1 | 1 | 1 | 2 | 7 | 26 | 45 | 64 |
| 1 | 1 | 1 | 1 | 1 | 1 | 1 | 2 | 5 | 17 | 26 | 26 |
| 1 | 1 | 1 | 1 | 1 | 1 | 1 | 1 | 2 | 6 | 7 | 5 |
| 1 | 1 | 1 | 1 | 1 | 1 | 1 | 1 | 1 | 2 | 2 | 2 |
| 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 |

FIG.34
PRIOR ART $R(K_6, 4, -1)$

| 2 | 5  | 7  | 6  | 2  | 0 | 0 |
|---|----|----|----|----|---|---|
| 6 | 17 | 26 | 26 | 6  | 0 | 0 |
| 7 | 26 | 45 | 64 | 24 | 0 | 0 |
| 5 | 26 | 64 | ×  |    |   |   |

FIG.35A
PRIOR ART

| x1,y1 | x1,y2 | x1,y3 | x1,y4 | x1,y5 | x1,y6 | x1,y7 |
|-------|-------|-------|-------|-------|-------|-------|
| x2,y1 | x2,y2 | x2,y3 | x2,y4 | x2,y5 | x2,y6 | x2,y7 |
| x3,y1 | x3,y2 | x3,y3 | x3,y4 | x3,y5 | x3,y6 | x3,y7 |
| x4,y1 | x4,y2 | x4,y3 | × | | | |

FIG.35B
PRIOR ART

| $P_{x1,y1}$ | $P_{x1,y2}$ | $P_{x1,y3}$ | $P_{x1,y4}$ | $P_{x1,y5}$ | $P_{x1,y6}$ | $P_{x1,y7}$ |
|-------------|-------------|-------------|-------------|-------------|-------------|-------------|
| $P_{x2,y1}$ | $P_{x2,y2}$ | $P_{x2,y3}$ | $P_{x2,y4}$ | $P_{x2,y5}$ | $P_{x2,y6}$ | $P_{x2,y7}$ |
| $P_{x3,y1}$ | $P_{x3,y2}$ | $P_{x3,y3}$ | $P_{x3,y4}$ | $P_{x3,y5}$ | $P_{x3,y6}$ | $P_{x3,y7}$ |
| $P_{x4,y1}$ | $P_{x4,y2}$ | $P_{x4,y3}$ | × | | | |

IMAGE PROCESSING APPARATUS AND IMAGE PROCESSING METHOD

This patent application is a Continuation of U.S. patent application Ser. No. 10/893,607, filed Jul. 16, 2004, which claimed the priority of Japanese Patent Application 2003-200460 filed Jul. 23, 2003, Japanese Patent Application 2003-292120 filed Aug. 12, 2003, Japanese Patent Application 2003-304549 filed Aug. 28, 2003, and Japanese Patent Application 2003-379682, filed Nov. 10, 2003, the priority of each of these Application is claimed and each of these Applications are incorporated herein by reference.

BACKGROUND OF THE INVENTION

1. Field of the Invention

The present invention relates to an image processing apparatus and an image processing method. In particular, the present invention relates to an image processing apparatus and an image processing method for quantizing multi-gradation image data to convert it into pseudo halftone output image data.

2. Description of Related Art

Conventionally, an ordered dither method, an error diffusion method or the like have been known as a quantization processing method for converting multi-gradation original image data into pseudo halftone output image data. Among the above methods, the error diffusion method has been often used for high quality images and improved variously, because it can provide relative high quality images. An object as for the image quality in the error diffusion method is of how to reduce the texture specific to an algorism without amplifying noises.

For example, it is disclosed that securing uniformity is attempted by using a plurality of error diffusion matrices (refer to JP-Tokukaihei-4-328957A discloses). Specifically, switching two matrices according to input values, using a large matrix to a highlight part or a shadow part, preventing generation of pattern called "worm", and minimizing noises are disclosed.

Further, it is also disclosed that changing a threshold value by using a threshold value depended on an output value, in order to obtain further uniformity in a highlight part or a shadow part (refer to JP-Tokukaihei-8-107500A). Specifically, what is disclosed are performing threshold value change corresponding to input, with respect to a neighboring pixel, depending on whether bilevel halftoning output is white or black, and using the threshold value change repeatedly.

In addition to the above, methods for optimizing the size and the coefficient of an error diffusion matrix, changing of processing order (that is, scan direction) or the like have been performed. Although it was possible to obtain certain effects by using the above means, the effects were not sufficient.

On the other hand, an anti-correlation digital halftoning method is supposed as the quantization processing means different from the error diffusion method or improved method thereof and the dither method (refer to "Anti-Correlation Digital Halftoning", Dmitri A. Gusev, August 1998, Indiana University, Published online Jul. 1, 2003, Internet Published at indiana.edu. This method is for setting an array (hereinafter, referred to as a dot appearance pattern) representing dot appearance information for every pixel, that is, dot presence/absence information of the number substantively proportional to the number of gradations composed of an observed pixel, and for performing halftoning on the basis of the information. In order to decide the content of dot appearance pattern of the observed pixel, the method includes: using the dot appearance pattern which has been already decided to neighboring pixels of the observed pixel; calculating expectation value (hereinafter, referred to as a histogram) of the dot appearance in the neighboring pixels for every element number of elements composing the dot appearance pattern; setting dot presence information preferentially to the element number of which the dot appearance number is small, on the basis of the expectation value; and deciding the dot appearance pattern of the observed pixel so as to set dot absence information to the element number of which dot appearance number is large.

Hereinafter, the anti-correlation digital halftoning method will be explained with concrete examples. In the following explanation, the processing is performed with changing the observed pixel from left to right.

As shown in FIG. 30, in the image processing by the anti-correlation digital halftoning method, a random valuable r (r is an integral value) is previously determined at random from the range of 0 to (n−1) (Step T1), before original image data (multi-gradation image data) are input. "n" is the maximum number of a pixel value $g_{i,j}$. The pixel value $g_{i,j}$ is a gradation value of the pixel in i-th row and the j-th column, and is any one of values in the range of 0 to n.

After the original image data are input, the pixel value $g_{i,j}$ of the pixel (the observed pixel) in i and row j column is obtained from the original image data (Step T2).

After the pixel value $g_{i,j}$ is obtained, a local filter P of the pixel in the i-th row and the j-th column is generated on the basis of the pixel value $g_{i,j}$ (Step T3). Concretely, first, Δ is obtained by assigning the pixel value $g_{i,j}$ to the following formula (1). Then, the range of the left column of FIG. 31 where the obtained belongs is specified. Thereby, the information of the local filter P corresponding to the specified range is specified from the right column of FIG. 31. Incidentally, in FIG. 31, for example, "Δ∈[0, 13/255)" means "0≦Δ<13/255".

$$\Delta = |g_{i,j} - n/2|/n \quad (1)$$

For example, if the pixel value $g_{i,j}$ is 120, "Δ=|120−255/2|/255=7.5/255" is derived by the above formula (1). Then, it can be specified that the Δ (7.5/255) belongs to "Δ∈[0, 13/255)" described in the most upper cell of the left column of the table in FIG. 31. Thereby, R($K_1$, 6, −5), which is described in the cell to the right of the above specified cell where "Δ∈[0, 13/255)" is described, can be specified as the information of the local filter P.

Next, when the specified information is conveniently generalized to define as "R(K, lk, ∈(lk))", first, any one of six basic filters $K_1$ to $K_6$ shown in FIGS. 32A to 33C is selected with reference to the "K". Next, a filter with lk rows×(2lk−1) columns having breadth for (lk−1) pixels from the pixel marked with "x", that is, the pixel in the i-th row and the j-th column, in the upper, left and right direction respectively, is generated. Then, with reference to the "lk" and "∈(lk)", the pixel number of the basic filter K is applied directly to each of pixels from the 1st column to the (lk−∈(lk))-th column of the generated filter. Moreover, 0 is applied to each of pixels beyond the (lk−∈(lk))-th column. Thereby, the local filter P is generated.

For example, if the information of the local filter P is represented as R($K_6$, 4, −1), the local filter P is generated with the following procedures. That is, in the R($K_6$, 4, −1), the entry corresponding to the basic filter K is "$K_6$", and therefore, a basic filter $K_6$ shown in FIG. 33C is specified as the basic filter K from three basic filters $K_4$ to $K_6$ respectively shown in FIGS. 33A to 33C. Then, in the R($K_6$, 4, −1), the entry corresponding to lk is "4", and the entry corresponding to ϵ(lk) is "−1". Therefore, first, a filter with 4 rows×7 (=2× 4−1) columns having breadth for 3 (=lk−1) pixels in the upper, left and right direction respectively from the pixel marked with "x" in the basic filter $K_6$ in FIG. 33C, is generated. After that, in the generated filter with 4 rows×7 columns, the pixel number of the basic filter $K_6$ is applied directly to each of pixels from the 1st column to the 5th (=4−(−1)) column. Moreover, 0 is applied to each of pixels beyond the 5th column. The local filter P generated with the above procedures is shown in FIG. 34.

After the local filter P is generated, a histogram $H_{i,j}[k]$ of the pixel in the i-th row and the j-th column is calculated (Step T4). The "histogram $H_{i,j}[k]$" means the sum value (the expectation value) which is obtained as follows; that is, when each arrangement position of the neighboring pixel of the observed pixel indicated by "x" in the local filter P is represented by (x, y), each dot appearance pattern $C_{x,y}[k]$ of the neighboring pixel of the observed pixel is weighted with the pixel value of the pixel in the position of (x, y) of the local filter P and added one another for every value of an element (an element number) k. In this regard, however, "k" is an arbitrary integral value from 0 to (n−1), and is synonymous with the element (the element number) k of the dot appearance pattern $C_{x,y}[k]$. Further, "the dot appearance pattern $C_{x,y}[k]$" is the sequence (the dot appearance information array) composed of $C_{i,j}[0]$ to $C_{i,j}[n-1]$ respectively taking the value of 0 and 1. In this case, when any one of values from 0 to (n−1) is assigned to the element k, if the dot appearance pattern $C_{i,j}[k]$ is "1", it denotes that a dot is formed in the pixel in the i-th row and the j-th column, and if the dot appearance pattern $C_{i,j}[k]$ is "0", it denotes that a dot is not formed.

For example, when the local filter P shown in FIG. 34 is generated, if the position (x, y) of each pixel and the pixel value $p_{x,y}$ of each pixel in the local filter P are set as shown in FIGS. 35A and 35B respectively, the histogram $H_{i,j}[k]$ of the observed pixel (the pixel marked with "x" in FIGS. 34, 35A and 35B) in the i-th row and the j-th column is calculated for every value of an element (an element number) k, according to the following Formulas.

$$H_{i,j}[0]=C_{x1,y1}[0]\times p_{x1,y1}+C_{x1,y2}[0]\times p_{x1,y2}+C_{x1,y3}[0]\times p_{x1,y3}+\ldots+C_{x4,y3}[0]\times p_{x4,y3}$$

$$H_{i,j}[1]=C_{x1,y1}[1]\times p_{x1,y1}+C_{x1,y2}[1]\times p_{x1,y2}+C_{x1,y3}[1]\times p_{x1,y3}+\ldots+C_{x4,y3}[1]\times p_{x4,y3}$$

$$H_{i,j}[2]=C_{x1,y1}[2]\times p_{x1,y1}+C_{x1,y2}[2]\times p_{x1,y2}+C_{x1,y3}[2]\times p_{x1,y3}+\ldots+C_{x4,y3}[2]\times p_{x4,y3}$$

...

...

$$H_{i,j}[n-1]=C_{x1,y1}[n-1]\times p_{x1,y1}+C_{x1,y2}[n-1]\times p_{x1,y2}+C_{x1,y3}[n-1]\times p_{x1,y3}+\ldots+C_{x4,y3}[n-1]\times p_{x4,y3}$$

Next, the histograms $H_{i,j}[0]$ to $H_{i,j}[n-1]$ respectively calculated for each element k are rearranged in ascending order. Then, an element number array S[k] for the histogram $H_{i,j}[k]$ is calculated (Step T5).

For example, when the histograms $H_{i,j}[0]$ to $H_{i,j}[n-1]$ are rearranged in the order of "$H_{i,j}[8]<H_{i,j}[3]<H_{i,j}[4]<H_{i,j}[1]<H_{i,j}[5]<\ldots<H_{i,j}[n-1]$", the element number array S[k] is calculated as {8, 3, 4, 1, 5, . . . , (n−1)}. Incidentally, in the element number array S[k], "8" is the 0th element and "3" is the 1st element.

After the element number array S[k] is calculated, a count value Count is set to 0 (Step T6). Then, the value of the element S[Count] in the order corresponding to the value of the count value Count among the element number array S[k] is assigned to the element k' of the element number array S[k] (Step T7). That is, for example, in the above case of the element number array S[k] (={8, 3, 4, 1, 5, . . . , (n−1)}), because the count value Count is "0", "8" (=S[0]) is assigned to the k'.

Accordingly, the relation between the count value Count and the pixel value $(g_{i,j}-1)$ is compared (Step T8).

As the result of the comparison, if the count value is equal to or less than the pixel value $(g_{i,j}-1)$, the dot appearance pattern $C_{i,j}[k']$ corresponding to the element k' is set to "1" (Step T9), or if the count value is more than the pixel value $(g_{i,j}-1)$, the dot appearance pattern $C_{i,j}[k']$ corresponding to the element k' is set to "0" (Step T10). For example, when the pixel value $(g_{i,j}-1)$ is "3" and the element number array S[k] is {8, 3, 4, 1, 5, . . . , (n−1)}, first, the element $C_{i,j}[8]$ is set to "1", among the dot appearance pattern $C_{i,j}[k]$.

After the processing in Step T9 or Step T10 is completed, "1" is added to the count value Count (Step T11), the relation between the count value Count (=1) and (n−1) is compared (Step T12), the processing from Step T7 to Step T11 are repeated until the count value Count becomes the same value as (n−1), and thereby, the dot appearance pattern $C_{i,j}[k']$ is decided. Thereby, the elements $C_{i,j}[8]$, $C_{i,j}[3]$ and $C_{i,j}[4]$ are set to "1" as described above. After the dot appearance pattern $C_{i,j}[k]$ is decided, $C_{i,j}[r]$ of which element number is random variable r determined in above Step T1 is calculated as an output value $b_{i,j}$ of the pixel in the i-th row and the j-th column, among the dot appearance pattern $C_{i,j}[k]$ (Step T13). Incidentally, the output value $b_{i,j}$ is "0" or "1" as can be seen from the processing of above Step T9 or Step T10.

After the output value $b_{i,j}$ is calculated, it is judged whether or not the output values b have been calculated with respect to all the pixels of the input original image data (Step T14). If it is judged that the output values b of all the pixels is not calculated, the processing from above Step T2 to Step T13 are repeated with respect to each unprocessed pixel. If it is judged that the output values b of all the pixels, that is, the output image data of pseudo halftone is calculated, the processing is ended.

According to the image processing by the above anti-correlation digital halftoning, when one pixel is focused, dot appearance frequency is proportional to the pixel value of the pixel. Further, when a plurality of pixels adjacent each other are focused, the dot in each of pixels appears so as to maximize the anti-correlation with the neighboring pixels substantially. Therefore, the dispersibility of the dots formed on a recording medium while an image recording is improved. Therefore, the anti-correlation digital halftoning method has the feature that there are few textures peculiar to the error diffusion method.

Incidentally, for deciding the dot appearance pattern $C_{i,j}[k]$ with respect to the end portion of an image, the dot appearance pattern with respect to the neighboring pixels other than an area of the image is required. Therefore, for the neighboring pixels other than an area of the image, the dot appearance pattern is previously decided by using a random valuable or the like. In particular, for example, the dot appearance pattern is defined as follows.

$$C_{i,j}[k]=1(rBR<n\Delta), 0(rBR\geq n\Delta)$$

Hereupon, $\Delta=|g_{i,j}-n/2|/n$, and "$g_{i,j}$" is the pixel value of the observed pixel. Further, "rBR" is a random valuable included in {0, 1, . . . (int)(n/2)} and is different value every time.

However, in the above anti-correlation digital halftoning method, there are following problems.

In the first place, in the case where the anti-correlation digital halftoning method is applied to a color image or a grayscale image resolved for every different density, because the dot arrangement between the different colors is not concerned, the color heterogeneity is easily generated. Further, the local variation of lightness becomes random, and accordingly, the roughness is increased.

In the second place, the anti-correlation digital halftoning method comprises the outstanding feature that the dispersibility for the bilevel halftoning of a monochrome image is well. However, the anti-correlation digital halftoning method sometimes generates the pattern comprising a regular periodic structure with respect to a specific input value. As the problems being spoken generally, although it seems that the simple periodic pattern is preferred as the result of the halftoning of the input data with a certain level, on the other hand, the border where the data value changes is enhanced and a pseudo outline is generated in many cases.

In the anti-correlation digital halftoning method, because a certain level of consideration has been already given, it is difficult to generate the periodic pattern as that generated by the common Floyd-Steinberg type error diffusion method. However, the periodic structure is sometimes generated with respect to a specific image pattern. For example, it has been known that although the pseudo outline is not outstanding with respect to the gradation pattern (ramp input), a regular checker pattern is sometimes generated in the portion where the 50% value constantly continues in a wide range.

In the third place, there is the case where the generation of continuous dots is required in the highlight part of the image, by the printing method of printers such as electro-photographic system or the like.

However, conventionally, the generation probability of a systematic dot arrangement or a different dot arrangement has not been controlled. Therefore, the dot arrangement of the processed image strongly depends on the image. Further, the effect of the processing is unstable because of indetermination of the shape of the dot arrangement or interference of a different dot arrangement.

In the fourth place, in the case where the anti-correlation digital halftoning method is applied to a color image or a grayscale image resolved for every different density, if the dispersibility between the non-recording dot and the low occupancy rate dot in the case where the summation of the occupancy rate per different dot unit area is not more than 100%, or the dispersibility between the overlapped recording dots and the low occupancy rate dot in the case where the summation of the occupancy rate per different dot unit area is more than 100% is worse, the periodic structure becomes to be outstanding. However, because those relations have not been considered conventionally, the dot dispersibility sometimes becomes worse when there is the dot of which occupancy rate is low.

SUMMARY OF THE INVENTION

As a first object, it is an object of the present invention to provide an image processing apparatus and an image processing method capable of reducing color heterogeneity or roughness and obtaining a color image or a grayscale image of which local variation of lightness is inhibited.

As a second object, it is an object of the present invention to provide an image processing apparatus and an image processing method capable of controlling a dot so as not to make the dot have the periodic structure and preventing the pseudo outline, when the halftoning processing using the anti-correlation digital halftoning method is performed.

As a third object, it is an object of the present invention to provide an image processing apparatus and an image processing method capable of specifying generation probability of the systematic dot arrangement and the different dot arrangement in the highlight part of the image to obtain resolution faithful to the original image the original image, and at the same time, generating a specified systematic dot arrangement, improving the dispersibility between the different dots and the stable effect of the processing which has low dependence on the image, when the halftoning processing using the anti-correlation digital halftoning method is performed.

As a fourth object, it is an object of the present invention to provide an image processing apparatus and an image processing method capable of obtaining favorable dot dispersibility, regardless of the occupancy rate per unit area of each of dots, when the halftoning processing using the anti-correlation digital halftoning method is performed.

To solve the above problems, according to a first aspect of the present invention, an image processing apparatus comprises a processor for performing:

a first quantization for deciding a dot appearance information array with respect to an observed pixel of multi-gradation image data with regard to a first color of a plurality of colors different from each other; and a second quantization for deciding a dot appearance information array so as to make an anti-correlation with the dot appearance information array decided by the first quantization to be high, with respect to the observed pixel of multi-gradation image data with regard to a second color other than the first color of the plurality of colors different from each other, after the first quantization is performed, when the multi-gradation image data with regard to each of the plurality of colors different from each other are quantized and converted into pseudo halftone output image data.

Hereupon, "the plurality of colors" means the plurality of colors that at least any one of lightness, chroma, or hue is different.

Further, "deciding a dot appearance information array with respect to an observed pixel of multi-gradation image data" means deciding the dot appearance information array with respect to the data with regard to the observed pixel among the multi-gradation image data.

"The dot appearance information array decided by the first quantization" may be decided with respect to the observed pixel, or may be decided with respect to each of the observed pixel and the neighboring pixel of the observed pixel.

Further, "deciding a dot appearance information array so as to make an anti-correlation with the dot appearance information array decided by the first quantization to be high" means deciding the second color dot appearance information array so as to make the expectation value of the second color dot appearance to be small in the element number of which the expectation value of the dot appearance is large among the first color dot appearance information array, and make the expectation value of the second color dot appearance to be large in the element number of which the expectation value of the dot appearance is small among the first color dot appearance information array.

The first color and the second color are not limited to one color, respectively, and may be a plurality of colors.

According to the image processing apparatus of the present invention, in the second quantization, the second color dot appearance information array is decided so as to make the anti-correlation with the dot appearance information array decided by the first quantization to be high, with respect to the observed pixel. Accordingly, the correlation between the dots of the different colors is adjusted.

Therefore, unlike in the conventional case, it is possible to obtain the color image of which color heterogeneity and roughness are reduced and local variation of lightness is inhibited.

In the above case, preferably, an anti-correlation of the dot appearance information array with respect to the observed pixel, which is decided by the first quantization, with a dot appearance information array with respect to a neighboring pixel of the observed pixel, to which the first quantization is already performed, is substantially the highest.

According to the above image processing apparatus, the anti-correlation of the dot appearance information array with respect to the observed pixel, which is decided by the first quantization, with the dot appearance information array with respect to the neighboring pixel of the observed pixel, to which the first quantization is already performed, is substantially the highest. Accordingly, the dots of the first color are certainly dispersed.

Therefore, it is possible to adjust the correlation between the dots of the different colors, after the roughness of the first color has been previously reduced. Accordingly, it is possible to obtain color image of which roughness is further reduced and local variation of lightness is inhibited.

Incidentally, "an anti-correlation of the dot appearance information array with respect to the observed pixel with a dot appearance information array with respect to a neighboring pixel of the observed pixel, to which the first quantization is already performed, is high" means that the expectation value of the dot appearance in the observed pixel is small in the element number of which the expectation value of the dot appearance is large among the dot appearance information array of the neighboring pixel, and the expectation value of the dot appearance in the observed pixel is large in the element number of which the expectation value of the dot appearance is small among the dot appearance information array of the neighboring pixel.

Further, "the neighboring pixel of the observed pixel" is the pixel other than the observed pixel, and is the pixel in the range which is required for representing the necessary gradation value where the observed pixel is as the center thereof by the area rate. For example, the neighboring pixels in the case where the bilevel halftoning is performed to 8-bit gradation image data are ideally the 256 pixels which are the closest to the observed pixel. However, the neighboring pixels are actually the pixels the number of which is several times 256, because of nonlinearity of visual property and reflectivity. However, only part of the pixels the number of which is several times 256 may be used as the neighboring pixels because of the balance with the amount of calculation in the image processing.

Further preferably, the processor decides the dot appearance information array so as to make an anti-correlation with the dot appearance information array decided by the first quantization, to which a predetermined weighting is performed, to be high, in the second quantization.

According to the above image processing apparatus, the dot appearance information array is decided so as to make the anti-correlation with the dot appearance information array decided by the first quantization, to which the predetermined weighting is performed, to be high. Accordingly, it is possible to easily adjust the correlation between the dots of the different colors.

Further preferably, the processor performs a third quantization for deciding a dot appearance information array so as to make an anti-correlation with the dot appearance information decided by at least one of the first quantization and the second quantization, with respect to the observed pixel of the multi-gradation image data with regard to a third color other than the first color and the second color of the plurality of colors, after the second quantization is performed.

According to the above image processing apparatus, the dot appearance information array of the third color is decided so as to make the anti-correlation with the dot appearance information decided by at least one of the first quantization and the second quantization, with respect to the observed pixel, in the third quantization. Accordingly, the correlation between the third color and the first color, or between the third color and the second color is adjusted.

Therefore, unlike in the conventional case, it is possible to obtain the color image of which color heterogeneity and roughness are reduced and local variation of lightness is inhibited.

Hereupon, "the dot appearance information of the first color and the second color respectively decided by the first quantization and the second quantization" may be decided with respect to the observed pixel or may be decided with respect to each of the observed pixel and the neighboring pixel.

Further, the third color is not limited to one color, and may be a plurality of colors.

Further preferably, lightness of the first color is lower than lightness of the second color.

According to the above image processing apparatus, the dot appearance information array is decided in ascending order of the lightness, that is, in descending order of visibility. Accordingly, unlike in the case where the dot appearance information array is decided in descending order of lightness, it is possible to certainly disperse the dots of which color comprises high visibility.

Therefore, it is possible to obtain the image of which color heterogeneity and roughness are little.

Further preferably, the first color is blue and the second color is red or green.

According to the above image processing apparatus, it is possible to obtain the effects similar to those of the invention described, with respect to the multi-gradation image data with regard to RGB.

Further preferably, the first color is black and the second color is magenta or cyan.

According to the above image processing apparatus, it is possible to obtain the effects similar to those of the invention described, with respect to the multi-gradation image data with regard to YMCK.

Further preferably, the processor calculates an expectation value of an appearance of a dot in a neighboring pixel of the observed pixel, for every element number of an element composing the dot appearance information array with respect to the neighboring pixel of the observed pixel, and adds a random value to the calculated expectation value.

According to the above image processing apparatus, in the dot arrangement in the processing for quantizing the multi-gradation image data to convert it into pseudo halftone output image data, it is possible to control the dot so as not to generate the periodic structure by adding a random value to the expectation value of the dot appearance in the neighboring pixel of the observed pixel, which is calculated for every element number of the element composing the dot appearance information array with respect to the neighboring pixel of the observed pixel. Accordingly, it is possible to prevent the output image from the pseudo outline.

Further preferably, the processor performs the quantization for deciding the dot appearance information array so as to make the anti-correlation with the dot appearance information array with respect to a neighboring pixel, to which the quantization is already performed, of the observed pixel of the multi-gradation image data, to be high, after a random value is added to a gradation value of the observed pixel.

According to the above image processing apparatus, in the dot arrangement in the processing for quantizing the multi-gradation image data to convert it into pseudo halftone output image data, it is possible to control the dot so as not to generate the periodic structure by adding a random value to the gradation value of the observed pixel of the multi-gradation image data. Accordingly, it is possible to prevent the output image from the pseudo outline.

Moreover, when the multi-value anti-correlation digital halftoning method is applied, it is possible to prevent the pseudo outline in the vicinity of the quantization level.

Further preferably, the processor controls performing an arrangement of a dot of which an occupancy rate per unit area is low, after performing an arrangement of a dot of which the occupancy rate per unit area is high, in a case that there are two or more kinds of dots of which the occupancy rates per unit area are different from each other and a summation of the occupancy rates of dots is not more than 100%, in the multi-gradation image data, and performing the arrangement of the dot of which the occupancy rate per unit area is high, after performing the arrangement of the dot of which the occupancy rate per unit area is low, in a case that there are two or more kinds of dots of which the occupancy rates per unit area are different from each other and the summation of the occupancy rates of dots is more than 100%, in the multi-gradation image data.

According to the above image processing apparatus, in the image processing for quantizing the multi-gradation image data to convert it into pseudo halftone output image data, the arrangement of the dot of which the occupancy rate per unit area is low is performed, after performing the arrangement of the dot of which the occupancy rate per unit area is high is performed, in the case where there are two or more kinds of the dots of which the occupancy rates per unit area are different from each other and the summation of the occupancy rates of dots is not more than 100%, in the multi-gradation image data, and the arrangement of the dot of which the occupancy rate per unit area is high is performed, after performing the arrangement of the dot of which the occupancy rate per unit area is low is performed, in a case that there are two or more kinds of dots of which the occupancy rates per unit area are different from each other and the summation of the occupancy rates of dots is more than 100%, in the multi-gradation image data. Accordingly, it is possible to obtain the favorable dot dispersibility, regardless of the occupancy rate per unit area of each of dots. Thereby, it is possible to perform the favorable image processing.

According to a second aspect of the present invention, an image processing method comprises:

performing a first quantization for deciding a dot appearance information array with respect to an observed pixel of multi-gradation image data with regard to a first color of a plurality of colors different from each other; and performing a second quantization for deciding a dot appearance information array so as to make an anti-correlation with the dot appearance information array decided by the first quantization to be high, with respect to the observed pixel of multi-gradation image data with regard to a second color other than the first color of the plurality of colors different from each other, after the first quantization is performed, when the multi-gradation image data with regard to each of the plurality of colors different from each other are quantized and converted into pseudo halftone output image data.

According to the image processing method of the present invention, in the second quantization, the second color dot appearance information array is decided so as to make the anti-correlation with the dot appearance information array decided by the first quantization to be high, with respect to the observed pixel. Accordingly, the correlation between the dots of the different colors is adjusted.

Therefore, unlike in the conventional case, it is possible to obtain the color image of which color heterogeneity and roughness are reduced and local variation of lightness is inhibited.

In the above case, preferably, the dot appearance information array with respect to the observed pixel is decided so as to make an anti-correlation with a dot appearance information array with respect to a neighboring pixel of the observed pixel, to which the first quantization is already performed, to be substantially the highest, in the first quantization.

According to the above image processing method, the dot appearance information array with respect to the observed pixel is decided so as to make the anti-correlation with the dot appearance information array with respect to the neighboring pixel of the observed pixel, to which the first quantization is already performed, to be substantially the highest, in the first quantization. Accordingly, the dots of the first color are certainly dispersed.

Therefore, it is possible to adjust the correlation between the dots of the different colors, after the roughness of the first color has been previously reduced. Accordingly, it is possible to obtain color image of which roughness is further reduced and local variation of lightness is inhibited.

Further preferably, the dot appearance information array is decided so as to make an anti-correlation with the dot appearance information array previously decided by the first quantization, to which a predetermined weighting is performed, to be high, in the second quantization.

According to the above image processing method, the dot appearance information array is decided so as to make the anti-correlation with the dot appearance information array previously decided by the first quantization, to which a predetermined weighting is performed, to be high. Accordingly, it is possible to easily adjust the correlation between the dots of the different colors.

Further preferably, the method further comprises performing a third quantization for deciding a dot appearance information array so as to make an anti-correlation with the dot appearance information decided by at least one of the first quantization and the second quantization, with respect to the observed pixel of the multi-gradation image data with regard to a third color other than the first color and the second color of the plurality of colors, after the second quantization is performed.

According to the above image processing method, in the third quantization, the dot appearance information array of the third color is decided so as to make the anti-correlation with the dot appearance information decided by at least one of the first quantization and the second quantization, with respect to the observed pixel. Accordingly, the correlation between the third color and the first color, or between the third color and the second color is adjusted.

Therefore, unlike in the conventional case, it is possible to obtain the color image of which color heterogeneity and roughness are reduced and local variation of tightness is inhibited.

Further preferably, a color of which lightness is lower than lightness of the second color is selected as the first color, in the first quantization.

According to the above image processing method, the dot appearance information array is decided in ascending order of the lightness, that is, in descending order of visibility. Accordingly, unlike in the case where the dot appearance information array is decided in descending order of lightness, it is possible to certainly disperse the dots of which the visibility is high.

Therefore, it is possible to obtain the image of which color heterogeneity and roughness are little.

Further preferably, blue is selected as the first color, and red or green is selected as the second color.

According to the above image processing method, it is possible to obtain the effects similar to those of the invention described, with respect to the multi-gradation image data with regard to RGB.

Further preferably, black is selected as the first color, and magenta or cyan is selected as the second color.

According to the above image processing method, it is possible to obtain the effects similar to those of the invention described, with respect to the multi-gradation image data with regard to YMCK.

Further preferably, an expectation value of an appearance of a dot in a neighboring pixel of the observed pixel is calculated for every element number of an element composing the dot appearance information array with respect to the neighboring pixel of the observed pixel; and a random value is added to the calculated expectation value.

According to the above image processing method, in the dot arrangement in the processing for quantizing the multi-gradation image data to convert it into pseudo halftone output image data, it is possible to control the dot so as not to generate the periodic structure by adding a random value to the expectation value of the dot appearance in the neighboring pixel of the observed pixel, which is calculated for every element number of the element composing the dot appearance information array with respect to the neighboring pixel of the observed pixel. Accordingly, it is possible to prevent the output image from the pseudo outline.

Further preferably, the quantization for deciding the dot appearance information array is performed so as to make the anti-correlation with the dot appearance information array with respect to a neighboring pixel, to which the quantization is already performed, of the observed pixel of the multi-gradation image data, to be high, after a random value is added to a gradation value of the observed pixel.

According to the above image processing method, in the dot arrangement in the processing for quantizing the multi-gradation image data to convert it into pseudo halftone output image data, it is possible to control the dot so as not to generate the periodic structure by adding a random value to the gradation value of the observed pixel of the multi-gradation image data. Accordingly, it is possible to prevent the output image from the pseudo outline.

Moreover, when the multi-value anti-correlation digital halftoning method is applied, it is possible to prevent the pseudo outline in the vicinity of the quantization level.

Further preferably, an arrangement of a dot of which an occupancy rate per unit area is low is performed, after an arrangement of a dot of which the occupancy rate per unit area is high is performed, in a case that there are two or more kinds of dots of which the occupancy rates per unit area are different from each other and a summation of the occupancy rates of dots is not more than 100%, in the multi-gradation image data, and the arrangement of the dot of which the occupancy rate per unit area is high is performed, after the arrangement of the dot of which the occupancy rate per unit area is low is performed, in a case that there are two or more kinds of dots of which the occupancy rates per unit area are different from each other and the summation of the occupancy rates of dots is more than 100%, in the multi-gradation image data.

According to the above image processing method, in the image processing for quantizing the multi-gradation image data to convert it into pseudo halftone output image data, an arrangement of a dot of which an occupancy rate per unit area is low is performed, after an arrangement of a dot of which the occupancy rate per unit area is high is performed, in a case that there are two or more kinds of dots of which the occupancy rates per unit area are different from each other and a summation of the occupancy rates of dots is not more than 100%, in the multi-gradation image data, and the arrangement of the dot of which the occupancy rate per unit area is high is performed, after the arrangement of the dot of which the occupancy rate per unit area is low is performed, in a case that there are two or more kinds of dots of which the occupancy rates per unit area are different from each other and the summation of the occupancy rates of dots is more than 100%, in the multi-gradation image data. Accordingly, it is possible to obtain the favorable dot dispersibility, regardless of the occupancy rate per unit area of each of dots. Thereby, it is possible to perform the favorable image processing.

According to a third aspect of the present invention, an image processing apparatus comprises a processor for performing:

a first quantization for deciding a dot appearance information array with respect to an observed pixel of multi-gradation image data with regard to a first density of a plurality of densities different from each other; and a second quantization for deciding a dot appearance information array so as to make an anti-correlation with the dot appearance information array decided by the first quantization to be high, with respect to the observed pixel of multi-gradation image data with regard to a second density other than the first density of the plurality of densities different from each other, after the first quantization is performed, When multi-gradation black-and-white image data are resolved into the multi-gradation image data comprising the plurality of densities different from each other, and then, quantized and converted into pseudo halftone output image data.

According to the image processing apparatus of the present invention, in the second quantization, the second density dot appearance information array is decided so as to make the anti-correlation with the dot appearance information array decided by the first quantization to be high, with respect to the observed pixel. Accordingly, the correlation between the dots of the different density is adjusted.

Therefore, unlike in the conventional case, it is possible to obtain the grayscale image of which density heterogeneity and roughness are reduced and local variation of lightness is inhibited.

In the above case, preferably, an anti-correlation of the dot appearance information array with respect to the observed pixel, which is decided by the first quantization, with a dot appearance information array with respect to a neighboring pixel of the observed pixel, to which the first quantization is already performed is substantially the highest.

According to the above image processing apparatus, the anti-correlation of the dot appearance information array with respect to the observed pixel, which is decided by the first quantization, with the dot appearance information array with respect to the neighboring pixel of the observed pixel, to which the first quantization is already performed, is substantially the highest. Accordingly, the dots of the first density are certainly dispersed.

Therefore, it is possible to adjust the correlation between the dots of the different density, after the roughness of the first density has been previously reduced. Accordingly, it is possible to obtain grayscale image of which roughness is further reduced and local variation of lightness is inhibited.

Further preferably, the processor decides the dot appearance information array so as to make an anti-correlation with the dot appearance information array decided by the first quantization, to which a predetermined weighting is performed, to be high, in the second quantization.

According to the above image processing apparatus, the dot appearance information array is decided so as to make the anti-correlation with the dot appearance information array decided by the first quantization, to which the predetermined weighting is performed, to be high. Accordingly, it is possible to easily adjust the correlation between the dots of the different density.

Further preferably, the processor performs a third quantization for deciding a dot appearance information array so as to make an anti-correlation with the dot appearance information decided by at least one of the first quantization and the second quantization, with respect to the observed pixel of the multi-gradation image data with regard to a third density other than the first density and the second density of the plurality of densities, after the second quantization is performed.

According to the above image processing apparatus, in the third quantization, the dot appearance information array of the third density is decided so as to make the anti-correlation with the dot appearance information decided by at least one of the first quantization and the second quantization, with respect to the observed pixel. Accordingly, the correlation between the third density and the first density, or between the third density and the second color is adjusted.

Therefore, unlike in the conventional case, it is possible to obtain the grayscale image of which density heterogeneity and roughness are reduced and local variation of lightness is inhibited.

Further preferably, lightness of the first density is lower than lightness of the second density.

According to the above image processing apparatus, the dot appearance information array is decided in ascending order of the lightness, that is, in descending order of visibility. Accordingly, unlike in the case where the dot appearance information array is decided in descending order of lightness, it is possible to certainly disperse the dots of which density comprises high visibility.

Therefore, it is possible to obtain the image of which density heterogeneity and roughness are little.

Further preferably, the processor calculates an expectation value of an appearance of a dot in a neighboring pixel of the observed pixel, for every element number of an element composing the dot appearance information array with respect to the neighboring pixel of the observed pixel, and adds a random value to the calculated expectation value.

According to the above image processing apparatus, in the dot arrangement in the processing for quantizing the multi-gradation image data to convert it into pseudo halftone output image data, it is possible to control the dot so as not to generate the periodic structure by adding a random value to the expectation value of the dot appearance in the neighboring pixel of the observed pixel, which is calculated for every element number of the element composing the dot appearance information array with respect to the neighboring pixel of the observed pixel. Accordingly, it is possible to prevent the output image from the pseudo outline.

Further preferably, the processor performs the quantization for deciding the dot appearance information array so as to make the anti-correlation with the dot appearance information array with respect to a neighboring pixel, to which the quantization is already performed, of the observed pixel of the multi-gradation image data, to be high, after a random value is added to a gradation value of the observed pixel.

According to the above image processing apparatus, in the dot arrangement in the processing for quantizing the multi-gradation image data to convert it into pseudo halftone output image data, it is possible to control the dot so as not to generate the periodic structure by adding a random value to the gradation value of the observed pixel of the multi-gradation image data. Accordingly, it is possible to prevent the output image from the pseudo outline.

Moreover, when the multi-value anti-correlation digital halftoning method is applied, it is possible to prevent the pseudo outline in the vicinity of the quantization level.

Further preferably, the processor controls.

performing an arrangement of a dot of which an occupancy rate per unit area is low, after performing an arrangement of a dot of which the occupancy rate per unit area is high, in a case that there are two or more kinds of dots of which the occupancy rates per unit area are different from each other and a summation of the occupancy rates of dots is not more than 100%, in the multi-gradation image data, and performing the arrangement of the dot of which the occupancy rate per unit area is high, after performing the arrangement of the dot of which the occupancy rate per unit area is low, in a case that there are two or more kinds of dots of which the occupancy rates per unit area are different from each other and the summation of the occupancy rates of dots is more than 100%, in the multi-gradation image data.

According to the above image processing apparatus, in the image processing for quantizing the multi-gradation image data to convert it into pseudo halftone output image data, the arrangement of the dot of which the occupancy rate per unit area is low is performed, after performing the arrangement of the dot of which the occupancy rate per unit area is high is performed, in the case that there are two or more kinds of the dots of which the occupancy rates per unit area are different from each other and the summation of the occupancy rates of dots is not more than 100%, in the multi-gradation image data, and the arrangement of the dot of which the occupancy rate per unit area is high is performed, after the arrangement of the dot of which the occupancy rate per unit area is low is performed, in a case that there are two or more kinds of dots of which the occupancy rates per unit area are different from each other and the summation of the occupancy rates of dots is more than 100%, in the multi-gradation image data. Accordingly, it is possible to obtain the favorable dot dispersibility, regardless of the occupancy rate per unit area of each of dots. Thereby, it is possible to perform the favorable image processing.

According to a fourth aspect of the present invention, an image processing method comprises:

performing a first quantization for deciding a dot appearance information array with respect to an observed pixel of multi-gradation image data with regard to a first density of a plurality of densities different from each other; and performing a second quantization for deciding a dot appearance information array so as to make an anti-correlation with the dot appearance information array decided by the first quantization to be high, with respect to the observed pixel of multi-gradation image data with regard to a second density other than the first density of the plurality of densities different from each other, after the first quantization is performed, When multi-gradation black-and-white image data are resolved into the multi-gradation image data comprising the plurality of densities different from each other, and then, quantized and converted into pseudo halftone output image data.

According to the image processing method of the present invention, in the second quantization, the second density dot appearance information array is decided so as to make the anti-correlation with the dot appearance information array decided by the first quantization to be high, with respect to the observed pixel. Accordingly, the correlation between the dots of the different density is adjusted.

Therefore, unlike in the conventional case, it is possible to obtain the grayscale image of which density heterogeneity and roughness are reduced and local variation of lightness is inhibited.

In the above case, preferably, the dot appearance information array with respect to the observed pixel is decided so as to make an anti-correlation with a dot appearance information array with respect to a neighboring pixel of the observed pixel, to which the first quantization is already performed, to be substantially the highest, in the first quantization.

According to the above image processing method, the dot appearance information array with respect to the observed pixel is decided so as to make the anti-correlation with the dot appearance information array with respect to the neighboring pixel of the observed pixel, to which the first quantization is already performed, to be substantially the highest, in the first quantization. Accordingly, the dots of the first density are certainly dispersed.

Therefore, it is possible to adjust the correlation between the dots of the different density, after the roughness of the first density has been previously reduced. Accordingly, it is possible to obtain grayscale image of which roughness is further reduced and local variation of lightness is inhibited.

Further preferably, the dot appearance information array is decided so as to make an anti-correlation with the dot appearance information array previously decided by the first quantization, to which a predetermined weighting is performed, to be high, in the second quantization.

According to the above image processing method, the dot appearance information array is decided so as to make the anti-correlation with the dot appearance information array decided by the first quantization, to which the predetermined weighting is performed, to be high. Accordingly, it is possible to easily adjust the correlation between the dots of the different density.

Further preferably, the method further comprises performing a third quantization for deciding a dot appearance information array so as to make an anti-correlation with the dot appearance information decided by at least one of the first quantization and the second quantization to be high, with respect to the observed pixel of the multi-gradation image data with regard to a third density other than the first density and the second density of the plurality of densities, after the second quantization is performed.

According to the above image processing method, in the third quantization, the dot appearance information array of the third density is decided so as to make the anti-correlation with the dot appearance information decided by at least one of the first quantization and the second quantization to be high, with respect to the observed pixel. Accordingly, the correlation between the third density and the first density, or between the third density and the second color is adjusted.

Therefore, unlike in the conventional case, it is possible to obtain the grayscale image of which density heterogeneity and roughness are reduced and local variation of lightness is inhibited.

Further preferably, a density of which lightness is lower than lightness of the second density is selected as the first density, in the first quantization.

According to the above image processing method, the dot appearance information array is decided in ascending order of the lightness, that is, in descending order of visibility. Accordingly, unlike in the case where the dot appearance information array is decided in descending order of lightness, it is possible to certainly disperse the dots of which density comprises high visibility.

Therefore, it is possible to obtain the image of which density heterogeneity and roughness are little.

Further preferably, an expectation value of an appearance of a dot in a neighboring pixel of the observed pixel is calculated for every element number of an element composing the dot appearance information array with respect to the neighboring pixel of the observed pixel; and a random value is added to the calculated expectation value.

According to the above image processing method, in the dot arrangement in the processing for quantizing the multi-gradation image data to convert it into pseudo halftone output image data, it is possible to control the dot so as not to generate the periodic structure by adding a random value to the expectation value of the dot appearance in the neighboring pixel of the observed pixel, which is calculated for every element number of the element composing the dot appearance information array with respect to the neighboring pixel of the observed pixel. Accordingly, it is possible to prevent the output image from the pseudo outline.

Further preferably, the quantization for deciding the dot appearance information array is performed so as to make the anti-correlation with the dot appearance information array with respect to a neighboring pixel, to which the quantization is already performed, of the observed pixel of the multi-gradation image data, to be high, after a random value is added to a gradation value of the observed pixel.

According to the above image processing method, in the dot arrangement in the processing for quantizing the multi-gradation image data to convert it into pseudo halftone output image data, it is possible to control the dot so as not to generate the periodic structure by adding a random value to the gradation value of the observed pixel of the multi-gradation image data. Accordingly, it is possible to prevent the output image from the pseudo outline.

Moreover, when the multi-value anti-correlation digital halftoning method is applied, it is possible to prevent the pseudo outline in the vicinity of the quantization level.

Further preferably, an arrangement of a dot of which an occupancy rate per unit area is low is performed, after an arrangement of a dot of which the occupancy rate per unit area is high is performed, in a case that there are two or more kinds of dots of which the occupancy rates per unit area are different from each other and a summation of the occupancy rates of dots is not more than 100%, in the multi-gradation image data, and the arrangement of the dot of which the occupancy rate per unit area is high is performed, after the arrangement of the dot of which the occupancy rate per unit area is low is performed, in a case that there are two or more kinds of dots of which the occupancy rates per unit area are different from each other and the summation of the occupancy rates of dots is more than 100%, in the multi-gradation image data.

According to the above image processing method, in the image processing for quantizing the multi-gradation image data to convert it into pseudo halftone output image data, the arrangement of the dot of which the occupancy rate per unit area is low is performed, after the arrangement of the dot of which the occupancy rate per unit area is high is performed, in the case that there are two or more kinds of dots of which the occupancy rates per unit area are different from each other and the summation of the occupancy rates of dots is not more than 100%, in the multi-gradation image data, and the arrangement of the dot of which the occupancy rate per unit area is high is performed, after the arrangement of the dot of which the occupancy rate per unit area is low is performed, in the case that there are two or more kinds of dots of which the occupancy rates per unit area are different from each other and the summation of the occupancy rates of dots is more than 100%, in the multi-gradation image data. Accordingly, it is possible to obtain the favorable dot dispersibility, regardless of the occupancy rate per unit area of each of dots. Thereby, it is possible to perform the favorable image processing.

According to a fifth aspect of the present invention, an image processing apparatus comprises a processor for:

calculating an expectation value of an appearance of a dot in a neighboring pixel, to which a quantization is already performed, of the observed pixel of multi-gradation image data, for every element number of an element composing the dot appearance information array with respect to the neighboring pixel; and adding a random value to the calculated expectation value, when the quantization for deciding the dot appearance information array is performed so as to make an anti-correlation with the dot appearance information array with respect to the neighboring pixel to be high, in a case that the multi-gradation image data are quantized and converted into pseudo halftone output image data.

According to the image processing apparatus of the present invention, in the dot arrangement in the processing for quantizing the multi-gradation image data to convert it into pseudo halftone output image data, it is possible to control the dot so as not to generate the periodic structure by adding a random value to the expectation value of the dot appearance in the neighboring pixel of the observed pixel, which is calculated for every element pixel number of the element composing the dot appearance information array with respect to the neighboring pixel. Accordingly, it is possible to prevent the output image from the pseudo outline.

In the above case, preferably, the processor sets and changes the random value according to a gradation value of each pixel.

According to the above image processing apparatus, it is possible to adequately set the amount of correction for preventing the periodicity, according to the input gradation value, by setting and changing the random value according to the gradation value of the pixel. Consequently, it is possible to set the strength of the randomness corresponding to the degree of needs. Therefore it is possible to control the dot so as not to generate the periodic structure. Accordingly, it is possible to prevent the output image from the pseudo outline.

Further preferably, the processor sets and changes the random value according to a position of each pixel.

According to the above image processing apparatus, it is possible to control the space frequency characteristic by setting and changing the random value according to the position of the pixel. Consequently, it is possible to control the dot so as not to generate the periodic structure, more certainly. Accordingly, it is possible to prevent the output image from the pseudo outline.

According to a sixth aspect of the present invention, an image processing apparatus comprises a processor for performing a quantization for deciding a dot appearance information array so as to make an anti-correlation with a dot appearance information array with respect to a neighboring pixel, to which the quantization is already performed, of the observed pixel of the multi-gradation image data, to be high, after a random value is added to a gradation value of the observed pixel, in a case that the multi-gradation image data are quantized and converted into pseudo halftone output image data.

According to the image processing apparatus of the present invention, in the dot arrangement in the processing for quantizing the multi-gradation image data to convert it into pseudo halftone output image data, it is possible to control the dot so as not to generate the periodic structure by adding a random value to the gradation value of the observed pixel of the multi-gradation image data. Accordingly, it is possible to prevent the output image from the pseudo outline.

Moreover, when the multi-value anti-correlation digital halftoning method is applied, it is possible to prevent the pseudo outline in the vicinity of the quantization level.

In the above case, preferably, the processor sets and changes the random value according to a gradation value of each pixel.

According to the above image processing apparatus, it is possible to adequately set the amount of correction for preventing the periodicity, according to the input gradation value, by setting and changing the random value according to the gradation value of the pixel. Consequently, it is possible to set the strength of the randomness corresponding to the degree of needs. Therefore it is possible to control the dot so as not to generate the periodic structure. Accordingly, it is possible to prevent the output image from the pseudo outline.

Further preferably, the processor sets and changes the random value according to a position of each pixel.

According to the above image processing apparatus, it is possible to control the space frequency characteristic by setting and changing the random value according to the position of the pixel. Consequently, it is possible to control the dot so as not to generate the periodic structure, more certainly. Accordingly, it is possible to prevent the output image from the pseudo outline.

According to a seventh aspect of the present invention, an image processing method comprises:

calculating an expectation value of an appearance of a dot in a neighboring pixel, to which a quantization is already performed, of the observed pixel of multi-gradation image data, for every element number of an element composing the dot appearance information array with respect to the neighboring pixel; and adding a random value to the calculated expectation value, when the quantization for deciding the dot appearance information array is performed so as to make an anti-correlation with the dot appearance information array with respect to the neighboring pixel to be high, in a case that the multi-gradation image data are quantized and converted into pseudo halftone output image data.

According to the image processing method of the present invention, in the dot arrangement in the processing for quantizing the multi-gradation image data to convert it into pseudo halftone output image data, it is possible to control the dot so as not to generate the periodic structure by adding a random value to the expectation value of the dot appearance in the neighboring pixel of the observed pixel, which is calculated for every element pixel number of the element composing the dot appearance information array with respect to the neighboring pixel. Accordingly, it is possible to prevent the output image from the pseudo outline.

In the above case, preferably, the random value is set and changed according to a gradation value of each pixel.

According to the above image processing method, it is possible to adequately set the amount of correction for preventing the periodicity, according to the input gradation value, by setting and changing the random value according to the gradation value of the pixel. Consequently, it is possible to set the strength of the randomness corresponding to the degree of needs. Therefore it is possible to control the dot so as not to generate the periodic structure. Accordingly, it is possible to prevent the output image from the pseudo outline.

Further preferably, the random value is set and changed according to a position of each pixel.

According to the above image processing method, it is possible to control the space frequency characteristic by setting and changing the random value according to the position of the pixel. Consequently, it is possible to control the dot so as not to generate the periodic structure, more certainly. Accordingly, it is possible to prevent the output image from the pseudo outline.

According to an eighth aspect of the present invention, an image processing method comprises:

performing a quantization for deciding a dot appearance information array so as to an anti-correlation with a dot appearance information array with respect to a neighboring pixel, to which the quantization is already performed, of the observed pixel of the multi-gradation image data, to be high, after a random value is added to a gradation value of the observed pixel, in a case that the multi-gradation image data are quantized and converted into pseudo halftone output image data.

According to the image processing method of the present invention, in the dot arrangement in the processing for quantizing the multi-gradation image data to convert it into pseudo halftone output image data, it is possible to control the dot so as not to generate the periodic structure by adding a random value to the gradation value of the observed pixel of the multi-gradation image data. Accordingly, it is possible to prevent the output image from the pseudo outline.

Moreover, when the multi-value anti-correlation digital halftoning method is applied, it is possible to prevent the pseudo outline in the vicinity of the quantization level.

In the above case, preferably, the random value is set and changed according to a gradation value of each pixel.

According to the above image processing method, it is possible to adequately set the amount of correction for preventing the periodicity, according to the input gradation value, by setting and changing the random value according to the gradation value of the pixel. Consequently, it is possible to set the strength of the randomness corresponding to the degree of needs. Therefore it is possible to control the dot so as not to generate the periodic structure. Accordingly, it is possible to prevent the output image from the pseudo outline.

Further preferably, the random value is set and changed according to a position of each pixel.

According to the above image processing method, it is possible to control the space frequency characteristic by setting and changing the random value according to the position of the pixel. Consequently, it is possible to control the dot so as not to generate the periodic structure, more certainly. Accordingly, it is possible to prevent the output image from the pseudo outline.

According to a ninth aspect of the present invention, an image processing apparatus comprises a processor for performing control of specifying a shape of a systematic dot arrangement in highlight part of multi-gradation image data, when the multi-gradation image data are quantized and converted into pseudo halftone output image data.

According to the image processing apparatus of the present invention, in the dot arrangement in the processing for quantizing the multi-gradation image data to convert it into pseudo halftone output image data, the shape of the systematic dot arrangement is specified in the highlight part of the multi-gradation image data. Therefore, it is possible to obtain the resolution faithful to the original image. At the same time, it is possible to generate the specified systematic dot arrangement to improve the dispersibility between the different dot arrangements, and obtain the stable effect of the processing having less dependence on the image.

In the above case, preferably, the processor performs control of specifying the shape of the systematic dot arrangement, by specifying generation probability of the dot arrangement in the highlight part of the multi-gradation image data.

According to the above image processing apparatus, the shape of the systematic dot arrangement is specified by specifying the generation probability of the dot arrangement in the highlight part of the multi-gradation image data. Therefore, it is possible to obtain the resolution faithful to the original image, certainly. At the same time, it is possible to generate the specified systematic dot arrangement to improve the dispersibility between the different dot arrangements, and obtain the stable effect of the processing having less dependence on the image, certainly.

Further preferably, the processor sets a value representing a different dot arrangement in a same dot appearance information array, after deciding a local filter for every value corresponding to the generation probability of the different dot arrangement to calculate an element number array according to the local filter, in an observed pixel of the multi-gradation image data.

According to the above image processing apparatus, the value representing the different dot arrangement is set in the same dot appearance information array, after the local filter is decided for every value corresponding to the generation probability of the different dot arrangement to calculate the element number array according to the local filter, in the observed pixel of the multi-gradation image data. Therefore, it is possible to obtain the resolution faithful to the original image, more certainly. At the same time, it is possible to generate the specified systematic dot arrangement to improve the dispersibility between the different dot arrangements, and obtain the stable effect of the processing having less dependence on the image, more certainly.

Further preferably, the processor sets the value representing the dot arrangement while avoiding an element number where a value representing other dot arrangement is set.

According to the above image processing apparatus, the value representing the dot arrangement is set while avoiding the element number where the value representing other dot arrangement is set. Therefore, it is possible to obtain the resolution faithful to the original image, further certainly. At the same time, it is possible to generate the specified systematic dot arrangement to improve the dispersibility between the different dot arrangements, and obtain the stable effect of the processing having less dependence on the image, further certainly.

Further preferably, the processor judges an output status of the observed pixel according to a status of a pixel which is already processed and the specified dot arrangement.

According to the above image processing apparatus, the output status of the observed pixel is judged according to the status of the pixel which is already processed and the specified dot arrangement. Therefore, it is possible to obtain the resolution faithful to the original image, furthermore certainly. At the same time, it is possible to generate the specified systematic dot arrangement to improve the dispersibility between the different dot arrangements, and obtain the stable effect of the processing having less dependence on the image, furthermore certainly.

Further preferably, the processor specifies the shape of the dot arrangement by setting a coefficient, which is close to the observed pixel in a dot continuous generation direction in the local filter, to be a negative number, with respect to the pixel needed to be generated continuously.

According to the above image processing apparatus, the shape of the dot arrangement is specified by setting a coefficient, which is close to the observed pixel in a dot continuous generation direction in the local filter, to be a negative number, with respect to the pixel needed to be generated continuously. Therefore, it is possible to obtain the resolution faithful to the original image, much further certainly. At the same time, it is possible to generate the specified systematic dot arrangement to improve the dispersibility between the different dot arrangements, and obtain the stable effect of the processing having less dependence on the image, much further certainly.

According to a tenth aspect of the present invention, an image processing method comprises specifying a shape of a systematic dot arrangement in a highlight part of multi-gradation image data, when the multi-gradation image data are quantized and converted into pseudo halftone output image data.

According to the image processing method of the present invention, in the dot arrangement in the processing for quantizing the multi-gradation image data to convert it into pseudo halftone output image data, the shape of the systematic dot arrangement is specified in the highlight part of the multi-gradation image data. Therefore, it is possible to obtain the resolution faithful to the original image. At the same time, it is possible to generate the specified systematic dot arrangement to improve the dispersibility between the different dot arrangements, and obtain the stable effect of the processing having less dependence on the image.

In the above case, preferably, the shape of the systematic dot arrangement is specified by specifying generation probability of the dot arrangement in the highlight part of the multi-gradation image data.

According to the above image processing method, the shape of the systematic dot arrangement is specified by specifying the generation probability of the dot arrangement in the highlight part of the multi-gradation image data. Therefore, it is possible to obtain the resolution faithful to the original image, certainly. At the same time, it is possible to generate the specified systematic dot arrangement to improve the dispersibility between the different dot arrangements, and obtain the stable effect of the processing having less dependence on the image, certainly.

Further preferably, a value representing a different dot arrangement is set in a same dot appearance information array, after a local filter is decided for every value corresponding to the generation probability of the different dot arrangement to calculate an element number array according to the local filter, in an observed pixel of the multi-gradation image data.

According to the above image processing method, the value representing the different dot arrangement is set in the same dot appearance information array, after the local filter is decided for every value corresponding to the generation probability of the different dot arrangement to calculate the element number array according to the local filter, in the observed pixel of the multi-gradation image data. Therefore, it is possible to obtain the resolution faithful to the original image, more certainly. At the same time, it is possible to generate the specified systematic dot arrangement to improve the dispersibility between the different dot arrangements, and obtain the stable effect of the processing having less dependence on the image, more certainly.

Further preferably, the value representing the dot arrangement is set while avoiding an element number where a value representing other dot arrangement is set.

According to the above image processing method, the value representing the dot arrangement is set while avoiding the element number where the value representing other dot arrangement is set. Therefore, it is possible to obtain the resolution faithful to the original image, further certainly. At the same time, it is possible to generate the specified systematic dot arrangement to improve the dispersibility between the different dot arrangements, and obtain the stable effect of the processing having less dependence on the image, further certainly.

Further preferably, an output status of the observed pixel is judged according to a status of a pixel which is already processed and the specified dot arrangement.

According to the above image processing method, the output status of the observed pixel is judged according to the status of the pixel which is already processed and the specified dot arrangement. Therefore, it is possible to obtain the resolution faithful to the original image, furthermore certainly. At the same time, it is possible to generate the specified systematic dot arrangement to improve the dispersibility between the different dot arrangements, and obtain the stable effect of the processing having less dependence on the image, furthermore certainly.

Further preferably, the shape of the dot arrangement is specified by setting a coefficient, which is close to the observed pixel in a dot continuous generation direction in the local filter, to be a negative number, with respect to the pixel needed to be generated continuously.

According to the above image processing method, the shape of the dot arrangement is specified by setting a coefficient, which is close to the observed pixel in a dot continuous generation direction in the local filter, to be a negative number, with respect to the pixel needed to be generated continuously. Therefore, it is possible to obtain the resolution faithful to the original image, much further certainly. At the same time, it is possible to generate the specified systematic dot arrangement to improve the dispersibility between the different dot arrangements, and obtain the stable effect of the processing having less dependence on the image, much further certainly.

According to an eleventh aspect of the present invention, an image processing apparatus comprises a processor controls performing an arrangement of a dot of which an occupancy rate per unit area is low, after performing an arrangement of a dot of which the occupancy rate per unit area is high, in a case that there are two or more kinds of dots of which the occupancy rates per unit area are different from each other and a summation of the occupancy rates of dots is not more than 100%, in the multi-gradation image data, and performing the arrangement of the dot of which the occupancy rate per unit area is high, after performing the arrangement of the dot of which the occupancy rate per unit area is low, in a case that there are two or more kinds of dots of which the occupancy rates per unit area are different from each other and the summation of the occupancy rates of dots is more than 100%, in the multi-gradation image data when the multi-gradation image data are quantized and converted into pseudo halftone output image data.

According to the image processing apparatus of the present invention, in the image processing for quantizing the multi-gradation image data to convert it into pseudo halftone output image data, the arrangement of the dot of which the occupancy rate per unit area is low is performed, after performing the arrangement of the dot of which the occupancy rate per unit area is high is performed, in the case where there are two or more kinds of the dots of which the occupancy rates per unit area are different from each other and the summation of the occupancy rates of dots is not more than 100%, in the multi-gradation image data, and the arrangement of the dot of which the occupancy rate per unit area is high is performed, after performing the arrangement of the dot of which the occupancy rate per unit area is low is performed, in a case that there are two or more kinds of dots of which the occupancy rates per unit area are different from each other and the summation of the occupancy rates of dots is more than 100%, in the multi-gradation image data. Accordingly, it is possible to obtain the favorable dot dispersibility, regardless of the occupancy rate per unit area of each of dots. Thereby, it is possible to perform the favorable image processing.

According to a twelfth aspect of the present invention, an image processing method comprises performing an arrangement of a dot of which an occupancy rate per unit area is low, after performing an arrangement of a dot of which the occupancy rate per unit area is high, in a case that there are two or more kinds of dots of which the occupancy rates per unit area are different from each other and a summation of the occupancy rates of dots is not more than 100%, in the multi-gradation image data, and performing the arrangement of the dot of which the occupancy rate per unit area is high, after performing the arrangement of the dot of which the occupancy rate per unit area is low, in a case that there are two or more kinds of dots of which the occupancy rates per unit area are different from each other and the summation of the occupancy rates of dots is more than 100%, in the multi-gradation image data when the multi-gradation image data are quantized and converted into pseudo halftone output image data.

According to the image processing method of the present invention, in the image processing for quantizing the multi-gradation image data to convert it into pseudo halftone output image data, the arrangement of the dot of which the occupancy rate per unit area is low is performed, after performing the arrangement of the dot of which the occupancy rate per unit area is high is performed, in the case where there are two or more kinds of the dots of which the occupancy rates per unit area are different from each other and the summation of the occupancy rates of dots is not more than 100%, in the multi-gradation image data, and the arrangement of the dot of which the occupancy rate per unit area is high is performed, after performing the arrangement of the dot of which the occupancy rate per unit area is low is performed, in a case that there are two or more kinds of dots of which the occupancy rates per unit area are different from each other and the summation of the occupancy rates of dots is more than 100%, in the multi-gradation image data. Accordingly, it is possible to obtain the favorable dot dispersibility, regardless of the occupancy rate per unit area of each of dots. Thereby, it is possible to perform the favorable image processing.

BRIEF DESCRIPTION OF THE DRAWINGS

The present invention will become more fully understood from the detailed description given hereinafter and the accompanying drawing given by way of illustration only, and thus are not intended as a definition of the limits of the present invention, and wherein:

FIG. 3 is a drawing schematically showing an output image in the case where an image processing method related to a first embodiment is used;

FIG. 4 is a drawing schematically showing an output image in the case where an image processing method related to a first embodiment is used;

FIG. 5 is a drawing schematically showing an output image in the case where an image processing method related to a first embodiment is used;

FIG. 6 is a drawing schematically showing an output image in the case where a conventional image processing method is used;

FIG. 7 is a drawing schematically showing an output image in the case where a conventional image processing method is used;

FIG. 8 is a drawing schematically showing an output image in the case where a conventional image processing method is used;

FIG. 9 is a flowchart showing an anti-correlation digital halftoning processing over time, executed by a processor of an image processing apparatus, in a second embodiment;

FIG. 25A is a drawing showing a basic filter $K_A$ in a seventh embodiment;

FIG. 25B is a drawing showing a basic filter $K_B$ in a seventh embodiment;

FIGS. 28A to 28D are drawings for explaining a dot arrangement method in the case where the summation of an occupancy rate per unit area of dots is not more than 100% in an eighth embodiment;

FIGS. 29A to 29D are drawings for explaining a dot arrangement method in the case where the summation of an occupancy rate per unit area of dots is more than 100% in an eighth embodiment;

FIG. 31 is a table showing correspondence between a value Δ based on a pixel value and information of a local filter P;

FIG. 32A is a drawing showing a basic filter $K_1$;

FIG. 323 is a drawing showing a basic filter $K_2$;

FIG. 32C is a drawing showing a basic filter $K_3$;

FIG. 33A is a drawing showing a basic filter $K_4$;

FIG. 33B is a drawing showing a basic filter $K_5$;

FIG. 33C is a drawing showing a basic filter $K_6$;

FIG. 34 is a drawing showing a local filter P (=R($K_6$, 4, −1))

FIGS. 35A and 35B are drawings for explaining generation of a histogram $H_{i,j}[k]$.

PREFERRED EMBODIMENTS OF THE INVENTION

Figure 1:
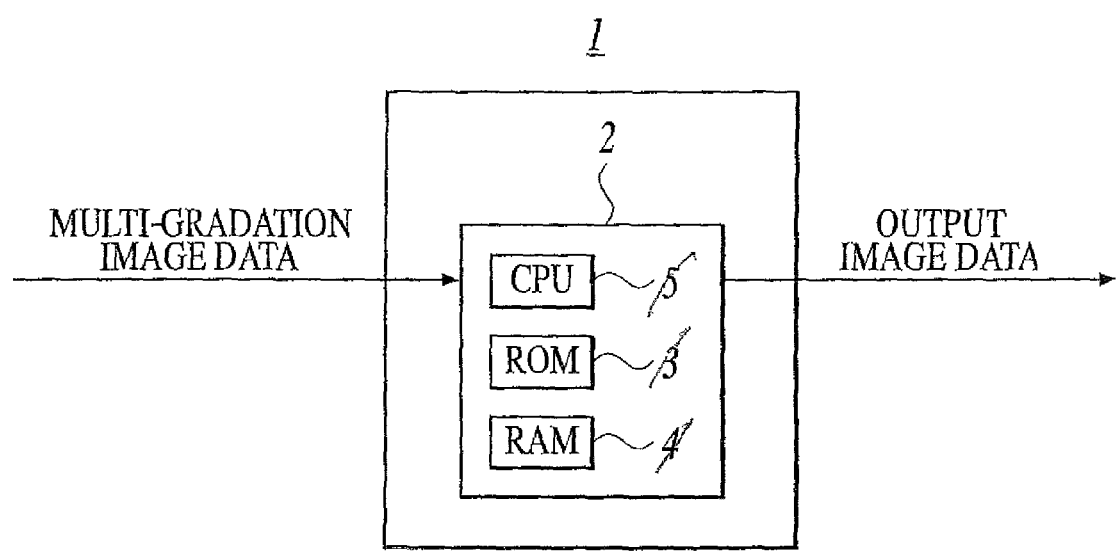
FIG. 1 is a block diagram showing a schematic configuration of an image processing apparatus related to the present invention.

Hereinafter, the embodiments of an image processing apparatus and an image processing method related to the present invention will be described referring to the drawings. However, the present invention is not limited to the examples shown in the drawings.

First Embodiment

Hereinafter, the first embodiment of the present invention will be described referring to the drawings.

Incidentally, the first embodiment is given to accomplish particularly the above first, second and fourth objects.

First, the configuration of an image processing apparatus 1 related to the present embodiment will be described.

FIG. 1 is a block diagram showing a schematic configuration of the image processing apparatus related to the present invention. As shown in FIG. 1, the image processing apparatus 1 comprises a processor 2 for quantizing input multi-gradation image (original image) data to convert it into a pseudo halftone output image data, and outputting the output image data. Incidentally, the image processing apparatus 1 can be mounted in a known output apparatus such as an inkjet printer or the like. Further, in the present embodiment, the multi-gradation image data will be explained as data related to an R(red)G(blue)B(green) image of which each pixel value comprises 8-bit (256-gradation) grayscale.

The processor (computer) 2 comprises a ROM (Read Only Memory) 3 connected each other, a RAM (Random Access Memory) 4 and a CPU (Central Processing Unit) 5.

The ROM 3 stores an image processing program. The image processing program is for making the processor 2 execute the anti-correlation digital halftoning processing to the multi-gradation image data.

The RAM 4 includes work area for the CPU 5.

The CPU 5 develops the image processing program stored in the ROM 3 to the work area in the RAM 4, and generates an output image from the multi-gradation image data.

Next, the image processing method related to the present invention will be described with reference to FIG. 2. Incidentally, in the following explanation, the image processing apparatus 1 executes the processing with switching the observed pixel in the direction from left to right. However, the processing direction after changing a row including a predetermined number of pixels, may be the also direction from left to right, may be the direction from right to left contrary, or may be selected at random between the left direction and the right direction. Preferably, the image processing apparatus 1 reverses the processing direction for every row or a plurality of rows so as to execute the processing in the snaking order as a whole.

Figure 2:
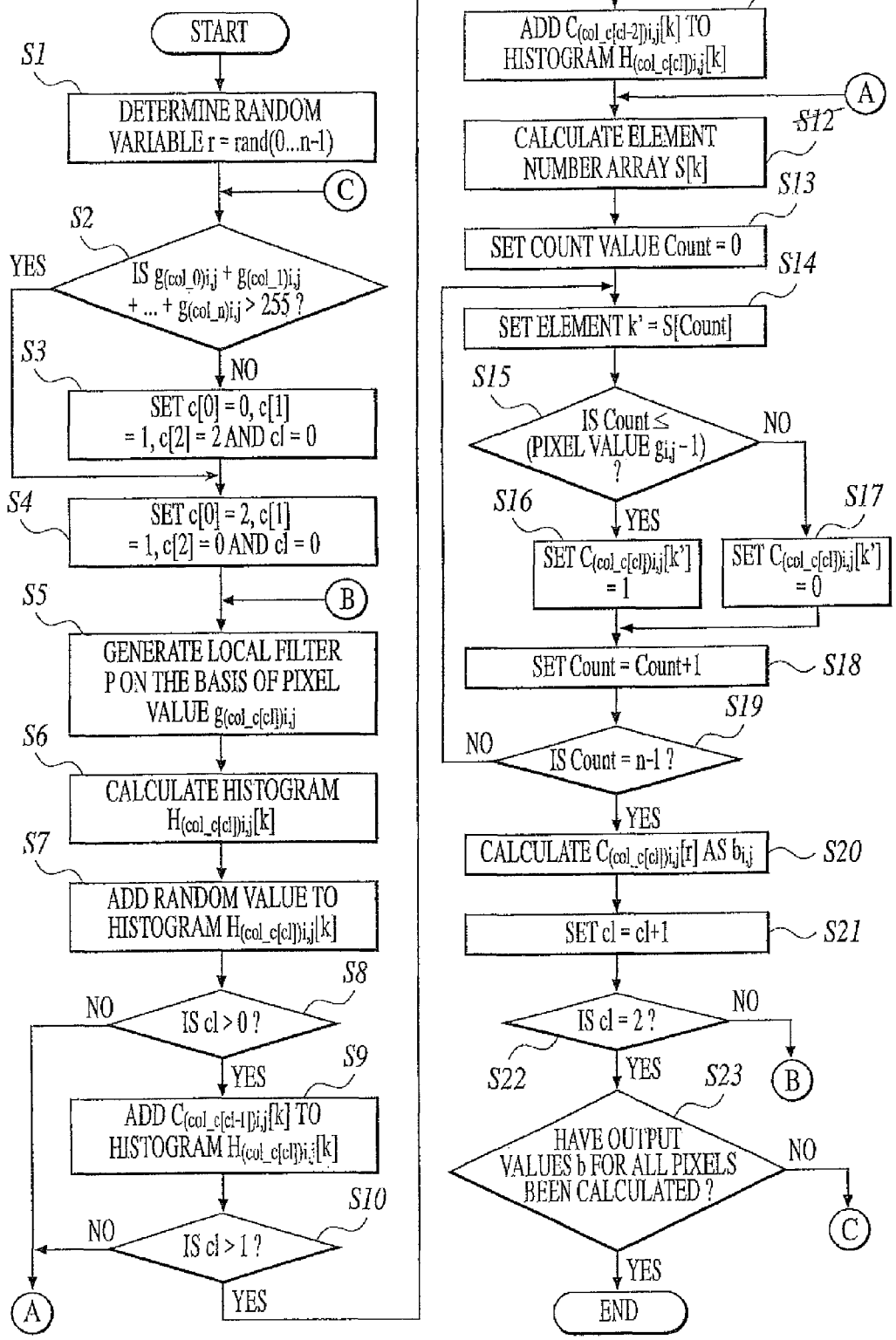
FIG. 2 is a flowchart showing an anti-correlation digital halftoning processing over time, executed by a processor of an image processing apparatus, in a first embodiment.

FIG. 2 is a flowchart showing the anti-correlation digital halftoning processing over time, which the processor 2 of the image processing apparatus 1 executes on the basis of the image processing program in order to generate the output image data.

As shown in FIG. 2, before the multi-gradation image data is input, the processor 2 previously determines a random valuable r (Step S1), similarly to the conventional Step T1.

After the multi-gradation image data is input, the processor 2 obtains a pixel value $g_{(col\_n)i,j}$ with respect to the pixel in the i-th row and the j-th column among the multi-gradation image data of each of colors. Then, the processor 2 judges whether or not the summation of the pixel values $g_{(col\_n)i,j}$ of each of colors is more than 255, that is, whether or not the summation of the occupancy rates of the pixel values of each of colors is more than 100% (Step S2). In the present embodiment, with respect to the three colors of col_0, col_1 and col_2, the processor 2 judges whether or not the summation of these occupancy rates is more than 100%. Further, in the following description, the condition is assumed as "(the occupancy rate of col_0)>(the occupancy rate of col_1)>(the occupancy rate of col_2)". Incidentally, in the following description, c[cl] includes the value of 1, 2, and 3, and denotes n in the notation col_n for identifying the color.

Hereupon, when the summation of the pixel values of each of colors $g_{(col\_0)i,j}$, $g_{(col\_1)i,j}$ and $g_{(col\_2)i,j}$ is not more than 255, that is, the summation of the occupancy rates of the pixel values of each of colors is not more than 100%, the dots of which occupancy rate per unit area is low (low occupancy rate dots) are arranged to the dot appearance information array (dot appearance pattern) after the dots of which occupancy rate per unit is high (high occupancy rate dots) are arranged to the dot appearance information array. That is, the arrangements to the dot appearance information array are performed in order of col_0, col_1 and col_2. For that purpose, c[cl] is set as c[0]=0, c[1]=1 and c[2]=2, and the value of cl is set as cl=0 as the initial value (Step S3).

On the other hand, when the summation of the pixel values of each of colors $g_{(col\_0)i,j}$, $g_{col\_1)i,j}$ and $g_{col\_2)i,j}$ is more than 255, that is, the summation of the occupancy rates of the pixel values of each of colors is more than 100%, the dots of which occupancy rate per unit area is high (high occupancy rate dots) are arranged to the dot appearance information array (dot appearance pattern) after the dots of which occupancy rate per unit is low (low occupancy rate dots) are arranged to the dot appearance information array. That is, the arrangements to the dot appearance information array are performed in order of col_2, col_1 and col_0. For that purpose, in the present embodiment, c[cl] is set as c[0]=2, c[1]=1 and c[2]=0, and the value of cl is set as cl=0 as the initial value (Step S4).

Next, the processor 2 generates a local filter P of the pixel in the i-th row and the j-th column on the basis of the pixel value $g_{(col\_c[cl])i,j}$ (Step S5), similarly to the conventional Step T3.

After the local filter P is generated, the processor 2 calculates a histogram $H_{(col\_c[cl])i,j}[k]$ of the pixel in the i-th row and the j-th column (Step S6), similarly to the conventional Step T4.

Next, after the above histogram $H_{(col\_c[cl])i,j}[k]$ is calculated, the processor 2 adds the random value rand( ) to the histogram $H_{(col\_c[cl])i,j}[k]$, which is being processed, with the appropriate weight w corresponding to the input image data (Step S7). That is, with respect to each of the values (the expectation values) of the histograms $H_{(col\_c[cl])i,j}[0]$ to $H_{(col\_c[cl])i,j}[n-1]$, the processor 2 adds the random values corresponding to each of the values.

In particular, the following calculation is performed.

$$H_{(col\_c[cl])i,j}[k]+=w(\text{rand}(\ ),\text{In}_{i,j})$$

$\text{In}_{i,j}$ is the value of the input pixel. rand( ) is an integer random value and is always different. As the random value, for example, it is possible to use random numbers of M-sequence.

As above, in the calculation of the histogram for deciding the dot appearance pattern of the observed pixel, by adding not only the neighboring dot appearance patterns of the pixel being currently processed (dot appearance information arrays with respect to the neighboring pixel) but also the random value, the periodic structure is avoided and the generation of the pseudo outline is prevented.

Further, the amplitude corresponding to the input value is set, and the randomness is enhanced with respect to the input value (gradation value) specific for the generation of the periodicity.

After Step S7, it is judged whether or not cl is larger than 0 (Step S8). When cl is larger than 0, $C_{(col\_c[cl-1])i,j}[k]$ is added to $H_{(col\_c[cl])i,j}[k]$ (Step S9).

Moreover, after Step S9, it is judged whether or not cl is larger than 1 (Step S10). When cl is larger than 1, $C_{(col\_c[cl-2])i,j}[k]$ is added to $H_{col\_c[cl])i,j}[k]$ (Step S11).

Incidentally, when cl is 0 in Step S8, the processing skips over Steps S9 to S11, to Step S12. Further, when cl is equal to or less than 1 in the Step S10, the processing skips over Step S11 to Step S12.

Next, the processor 2 decides an element number array S[k] and a dot appearance pattern (dot appearance information array) $C_{(col\_c[cl])i,j}[k']$, and calculates output values b with respect to all elements, that is, the output image data (Steps S12 to S23), similarly to the conventional Steps T5 to T14.

Thereby when one pixel is focused, the dot appearance frequency is proportional to the pixel value $g_{i,j}$ thereof. Further, when a plurality of pixels adjacent each other are focused, the dot in each of pixels appears so as to maximize the anti-correlation with the neighboring pixels substantially. Therefore, the dispersibility of the dots formed on a recording medium while an image recording is improved.

Incidentally, in the present embodiment, "1" is added to cl in Step S21, and it is judged whether or not cl is 2 in Step S22. Thereby, it is judged whether or not the quantization has been performed with respect to all the color of col_0, col_1 and col_2.

Figure 3:
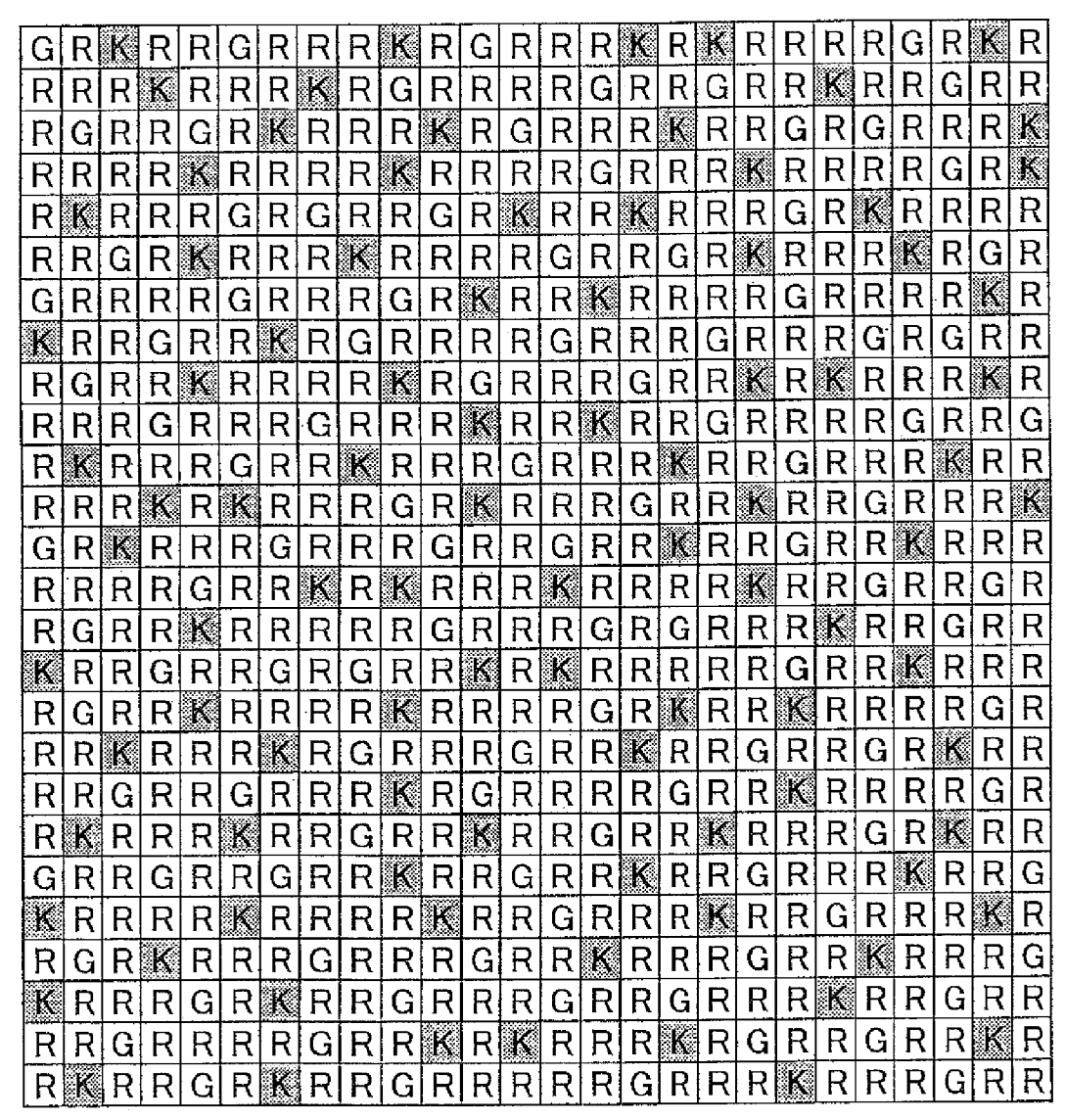
Figure 4:
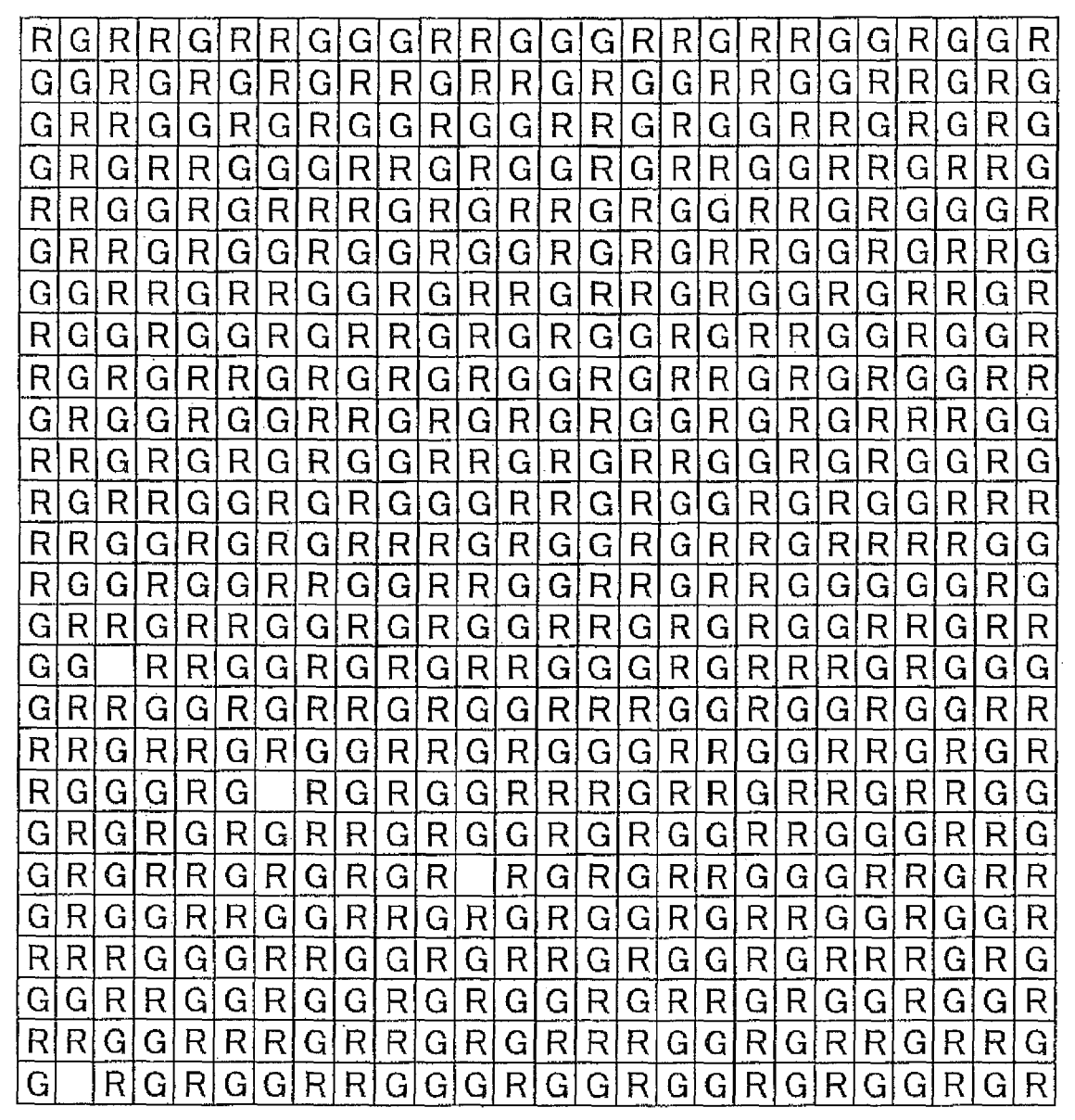
Figure 5:
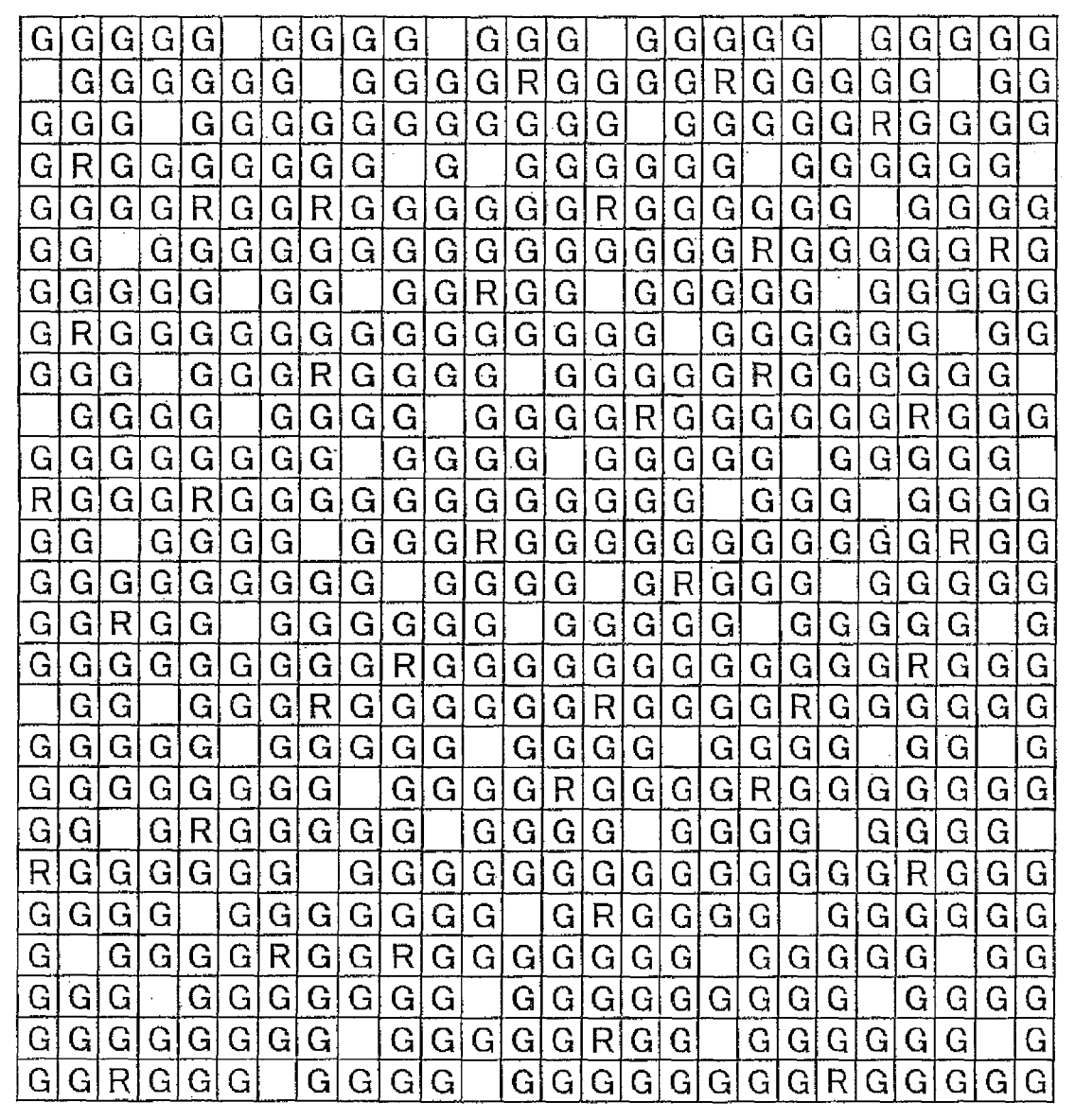

The output images obtained by the above image processing method are shown in FIGS. 3 to 5.

Figure 6:
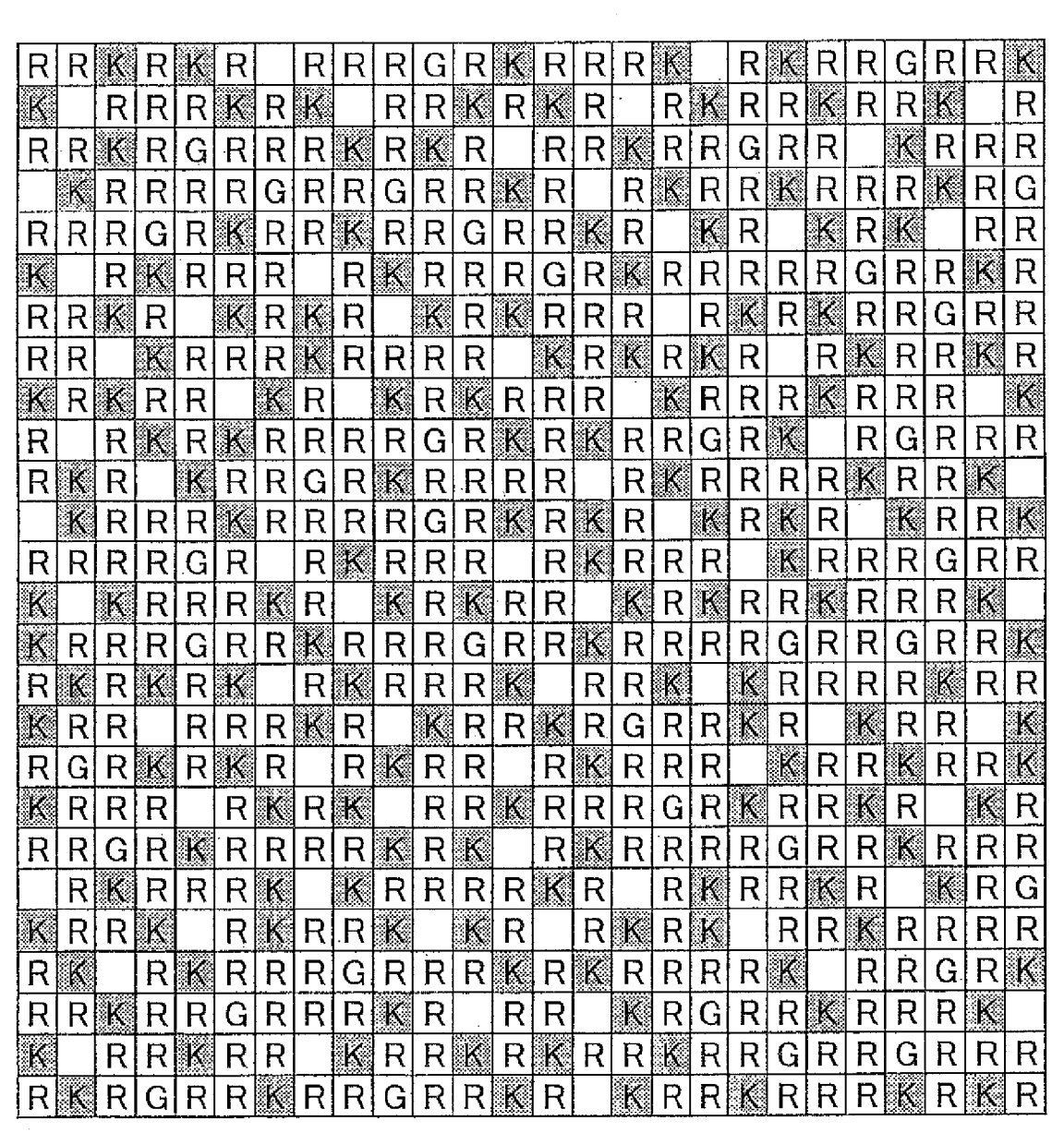
Figure 7:
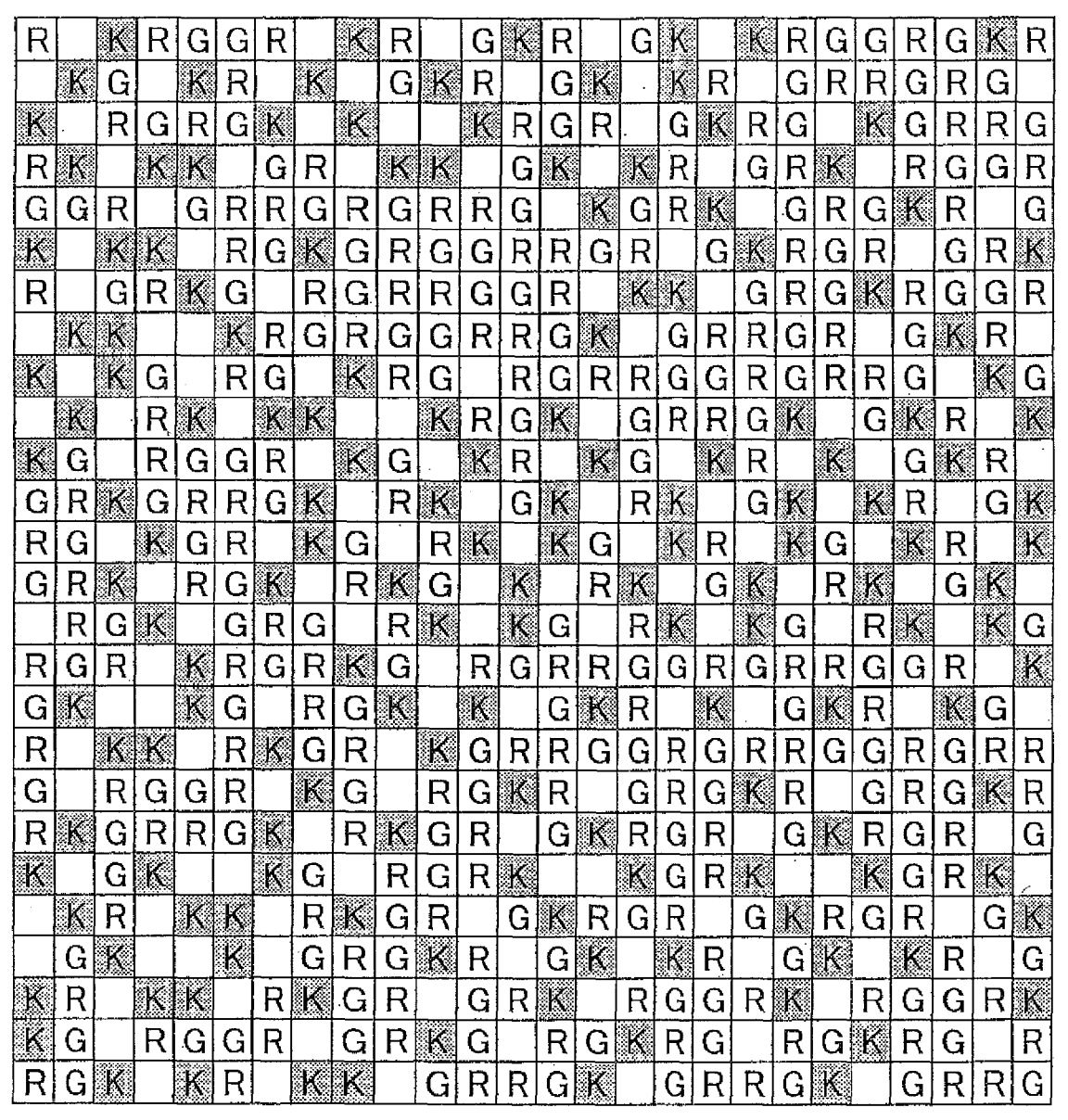
Figure 8:
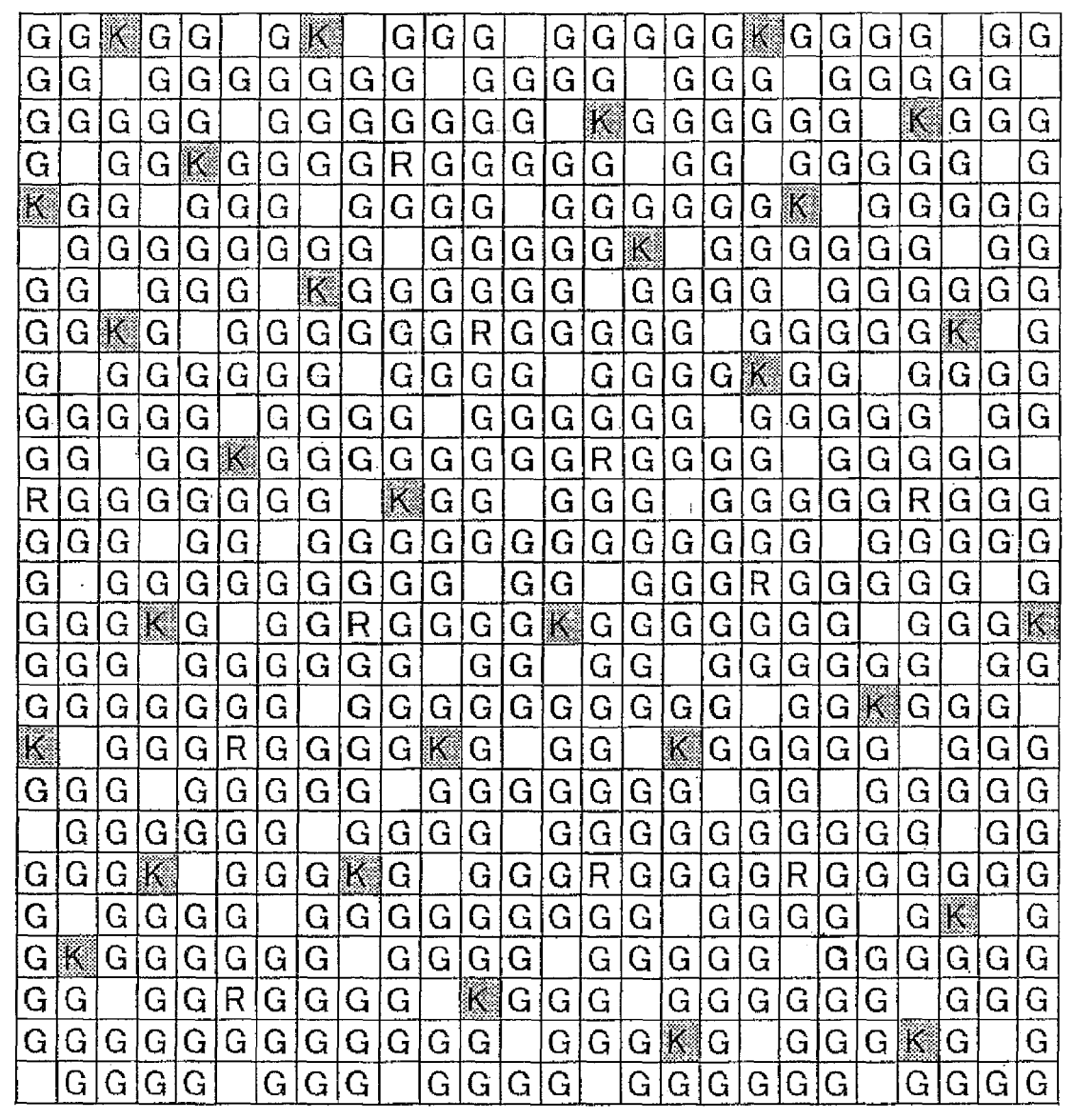

Incidentally the output images obtained by the conventional image processing method are shown in FIGS. 6 to 8.

Incidentally, in FIGS. 3 to 8, each of colors is represented by an alphabetical letter so that the output images can be represented in ways easy to understand. That is, the red dot is represented by "R", the green dot is represented by "G", the yellow dot in the case where the red dot and the green dot are overlapped each other is represented by white color (no alphabetical letter), and the portion where the dot does not exist is painted in black and represented by "K". Incidentally, hereupon, the examples where the blue dot does not exist are shown.

FIGS. 3 and 6 are the examples of the output images in the case of the input multi-gradation image (original image) where R(red)=180, G(green)=40 and B(blue)=0.

FIGS. 4 and 7 are the examples of the output images in the case of the input multi-gradation image (original image) where R(red)=128, G(green)=128 and B(blue)=0.

FIGS. 5 and 8 are the examples of the output images in the case of the input multi-gradation image (original image) where R(red)=40, G(green)=220 and B(blue)=0.

As shown in FIGS. 3 to 5, the output images obtained by the image processing apparatus and the image processing method in the present embodiment differs from the conventional output image shown in FIGS. 6 to 8. That is, the dots of each of colors disperse uniformly, and consequently, the overlapping part or the non-dotted point part is decreased.

As above, according to the above image processing method, in the calculation of the histogram for deciding the dot appearance pattern of the observed pixel, the correlation between the dots of different colors is adjusted by concerning not only the dot appearance patterns around the observed pixel with regard to the color which is currently processed but also the dot appearance pattern of the observed pixel with regard to the color which has been processed. Therefore, it is possible to obtain the RGB image of which color heterogeneity or roughness is reduced and local variation of lightness is inhibited.

That is, because the dot appearance patterns $C_{(col\_c[1])i,j}$ of the second color and $C_{(col\_c[2])i,j}$ of the third color are decided on the basis of the dot appearance pattern $C_{(col\_c[0])i,j}$ of the first color previously decided with respect to the pixel in the i-th row and j-th column, it is possible to certainly adjust the correlation between the dots of different colors.

Incidentally, as the example of FIG. 3, in the case where the input pixel value of the observed pixel is as R (red)=180, G (green)=40 and B (blue)=0, the first color is red, the second color is green and the third color is blue. As the example in FIG. 5, in the case where the input pixel value of the observed pixel is as R=40, G=220 and B=0, the first color is blue, the second color is red and the third color is green. As the example in FIG. 5, in the case where the input pixel value of the observed pixel is as R=128, G=128 and B=0, because the summation of the occupancy rates of the dots described later is just 100%, although the first color, the second color and the third color are different from each other, the three colors may be defined in any order among red, green and blue.

Further, according to the image processing apparatus and the image processing method in the present embodiment, in the dot arrangement in the processing for quantizing the multi-gradation image data to convert it into pseudo halftone output image data, it is possible to control the dot so as not to generate the periodic structure by adding a random value to the expectation value of the dot appearance in the neighboring pixel of the observed pixel, which is calculated for every element number of the element composing the dot appearance information array with respect to the neighboring pixel of the observed pixel. Accordingly, it is possible to prevent the output image from the pseudo outline.

Further, according to the image processing apparatus and the image processing method of the present embodiment, in the image processing for quantizing the multi-gradation image data to convert it into pseudo halftone output image data, the arrangement of the dot of which the occupancy rate per unit area is low is performed, after performing the arrangement of the dot of which the occupancy rate per unit area is high is performed, in the case where there are two or more kinds of the dots of which the occupancy rates per unit area are different from each other and the summation of the occupancy rates of dots is not more than 100%, in the multi-gradation image data, and the arrangement of the dot of which the occupancy rate per unit area is high is performed, after performing the arrangement of the dot of which the occupancy rate per unit area is low is performed, in a case that there are two or more kinds of dots of which the occupancy rates per unit area are different from each other and the summation of the occupancy rates of dots is more than 100%, in the multi-gradation image data. Accordingly, it is possible to obtain the favorable dot dispersibility, regardless of the occupancy rate per unit area of each of dots. Thereby, it is possible to perform the favorable image processing.

Second Embodiment

Next, the second embodiment will be described.

Incidentally, the second embodiment is given to accomplish particularly the above first, second and fourth objects.

Because an image processing apparatus 1 in the present embodiment comprises the same configurations as the image processing apparatus described in the above first embodiment, the explanation thereof will be omitted.

Further, the same note is provided to the same component as one of the above first embodiment.

Hereinafter, an image processing method related to the present embodiment will be described with reference to FIG. 9.

Incidentally, in the first embodiment, the random value is added in the calculation of the histogram for deciding the dot appearance pattern of the observed pixel. However, in the present embodiment, the random value is added to the gradation value of the observed pixel of the multi-gradation image data. Thereby, the periodic structure easily generated by the specific input value is avoided, and consequently, the generation of the pseudo outline is prevented.

Further, in the following explanation, the image processing apparatus 1 executes the processing with switching the observed pixel in the direction from left to right. However, the processing direction after changing a row including a predetermined number of pixels, may be the also direction from left to right, may be the direction from right to left contrary, or may be selected at random between the left direction and the right direction. Preferably, the image processing apparatus 1 reverses the processing direction for every row or a plurality of rows so as to execute the processing in the snaking order as a whole.

FIG. 9 is a flowchart showing the anti-correlation digital halftoning processing over time, which the processor 2 of the image processing apparatus 1 executes on the basis of the image processing program in order to generate the output image data.

As shown in FIG. 2, before the multi-gradation image data is input, the processor 2 previously determines a random valuable r (Step S51), similarly to the conventional Step T1.

After the multi-gradation image data is input, the processor 2 obtains a pixel value $g_{(col\_n)i,j}$ with regard to the pixel in the i-th row and the j-th column among the multi-gradation image data of each of colors. Then, the processor 2 judges whether or not the summation of the pixel values $g_{(col\_n)i,j}$ of each of colors is more than 255, that is, whether or not the summation of the occupancy rates of the pixel values of each of colors is more than 100% (Step S52) In the present embodiment, with respect to the three colors of col_0, col_1 and col_2, the processor 2 judges whether the summation of the occupancy rates of the three colors of each of colors is more than 100%. Further, also in the present embodiment, the condition is assumed as "(the occupancy rate of col_0)>(the occupancy rate of col_1)>(the occupancy rate of col_2)".

Hereupon, when the summation of the pixel values of each of colors $g_{(col\_0)i,j}$, $g_{(col\_1)i,j}$ and $g_{(col\_2)i,j}$ is not more than 255, that is, the summation of the occupancy rates of the pixel values of each of colors is not more than 100%, the dots of which occupancy rate per unit area is low (low occupancy rate dots) are arranged to the dot appearance information array (dot appearance pattern) after the dots of which occupancy rate per unit is high (high occupancy rate dots) are arranged to the dot appearance information array. That is, the arrangements to the dot appearance information array are performed in order of col_0, col_1 and col_2. For that purpose, c[cl] is set as c[0]=0, c[1]=1 and c[2]=2, and the value of cl is set as cl=0 as the initial value (Step S53).

On the other hand, when the summation of the pixel values of each of colors $g_{(col\_0)i,j}$, $g_{(col\_1)i,j}$ and $g_{(col\_2)i,j}$ is more than 255, that is, the summation of the occupancy rates of the pixel values of each of colors is more than 100%, the dots of which occupancy rate per unit area is high (high occupancy rate dots) are arranged to the dot appearance information array (dot appearance pattern) after the dots of which occupancy rate per unit is low (low occupancy rate dots) are arranged to the dot appearance information array. That is, the arrangements to the dot appearance information array are performed in order of col_2, col_1 and col_0. For that purpose, in the present embodiment, c[cl] is set as c[0] 2, c[1] 1 and c[2]=0, and the value of cl is set as cl=0 as the initial value (Step S54).

Next, the processor 2 generates the random value, and adds the random value to the pixel value $g_{(col\_c[cl])i,j}$ (Step S55). Incidentally, the addition method of the random value will be explained in detail in the following sixth embodiment.

As above, the periodic structure is avoided by adding the random value to the pixel value of the observed pixel, and consequently, the generation of the pseudo outline is prevented.

Further, the amplitude corresponding to the input value is set, and the randomness is enhanced with respect to the input value (gradation value) specific for the generation of the periodicity.

Next, the processor 2 generates a local filter P of the pixel in the i-th row and the j-th column on the basis of the pixel value $g_{(col\_c[cl])i,j}$ (Step S56), similarly to the conventional Step T3.

After the local filter P is generated, the processor 2 calculates a histogram $H_{(col\_c[cl])i,j}[k]$ of the pixel in the i-th row and the j-th column (Step S57), similarly to the conventional Step T4.

After Step S57, it is judged whether or not cl is larger than 0 (Step S58). When cl is larger than 0, $C_{(col\_c[cl-1])i,j}[k]$ is added to $H_{(col\_c[cl])i,j}[k]$ (Step S59).

Moreover, after Step S59, it is judged whether or not cl is larger than 1 (Step S60). When cl is larger than 1, $C_{(col\_c[cl-2])i,j}[k]$ is added to $H_{(col\_c[cl])i,j}[k]$ (Step S61).

Incidentally, when cl is 0 in Step S58, the processing skips over Steps S59 to S61 to Step S62. Further, when cl is equal to or less than 1 in Step S60, the processing skips over Step S61 to Step S62.

Next, the processor 2 decides an element number array S[k] and a dot appearance pattern (dot appearance information array) $C_{(col\_c[cl])i,j}[k']$, and calculates output values b with respect to all elements, that is, the output image data (Steps S62 to S73), similarly to the conventional Steps T6 to T14.

Thereby when one pixel is focused, the dot appearance frequency is proportional to the pixel value $g_{i,j}$ thereof. Further, when a plurality of pixels adjacent each other are focused, the dot in each of pixels appears so as to maximize the anti-correlation with the neighboring pixels substantially. Therefore, the dispersibility of the dots formed on a recording medium while an image recording is improved.

Incidentally, in the present embodiment, "1" is added to cl in Step S71, and it is judged whether or not cl is 2 in Step S72. Thereby, it is judged whether or not the quantization has been performed with respect to all the color of col_0, col_1 and col_2.

As above, according to the image processing apparatus and the image processing method in the present embodiment, it is possible to obtain the same effects as those of the above first embodiment.

Incidentally, in the first embodiment and the second embodiment, the multi-gradation image data with regard to the RGB color image is quantized and converted into the pseudo halftone output image data. However, not limited to this case, the multi-gradation black-and-white data with regard to a plurality of grayscale colors may be quantized, and the pseudo halftone output image data may be generated.

Further, in the first embodiment and the second embodiment, all the processing is not always executed at the same time. By executing part of the processing, part of effects described above can be realized. Hereinafter, embodiments for accomplishing the first object, the second object and the fourth object severally, which are accomplished in the above first embodiment and the above second embodiment, will be described. Further, an embodiment for accomplishing the third object related to those embodiments will be also described.

Third Embodiment

Hereinafter, the third embodiment of the present invention will be described with reference to the drawings.

Incidentally, the third embodiment is given to accomplish particularly the above first object.

Further, the same note is provided to the same component as one of the above first embodiment.

First, the configuration of an image processing apparatus 1 related to the present invention will be explained.

FIG. 1 is a block diagram showing a schematic configuration of the image processing apparatus. As shown in FIG. 1, the image processing apparatus 1 comprises a processor 2 for converting an input multi-gradation image data into a pseudo halftone output image data, and outputting the output image data. Incidentally, the image processing apparatus 1 can be mounted in a known output apparatus such as an inkjet printer or the like. Further, in the present embodiment, the multi-gradation image data will be explained as data related to a gradation image each of which gradation values of R(red), G(green) and B(blue) changes from 0 to n (n≧2), as shown in FIG. 10A.

The processor (computer) 2 comprises a ROM (Read Only Memory) 3 connected each other, a RAM (Random Access Memory) 4 and a CPU (Central Processing Unit) 5.

The ROM 3 stores an image processing program related to the present invention. The image processing program is for making the processor 2 execute the anti-correlation digital halftoning processing to the multi-gradation image data.

The RAM 4 includes work area for the CPU 5.

The CPU 5 develops the image processing program stored in the ROM 3 to the work area in the RAM 4, and generates an output image from the multi-gradation image data.

Next, the image processing method related to the present invention will be described with reference to FIGS. 11 and 12. Incidentally, in the following explanation, the image processing apparatus 1 executes the processing with switching the observed pixel in the direction from left to right. However, the processing direction after changing a row including a predetermined number of pixels, may be the also direction from left to right, may be the direction from right to left contrary, or may be selected at random between the left direction and the right direction. Preferably, the image processing apparatus 1 reverses the processing direction for every row or a plurality of rows so as to execute the processing in the snaking order as a whole.

Figure 11:
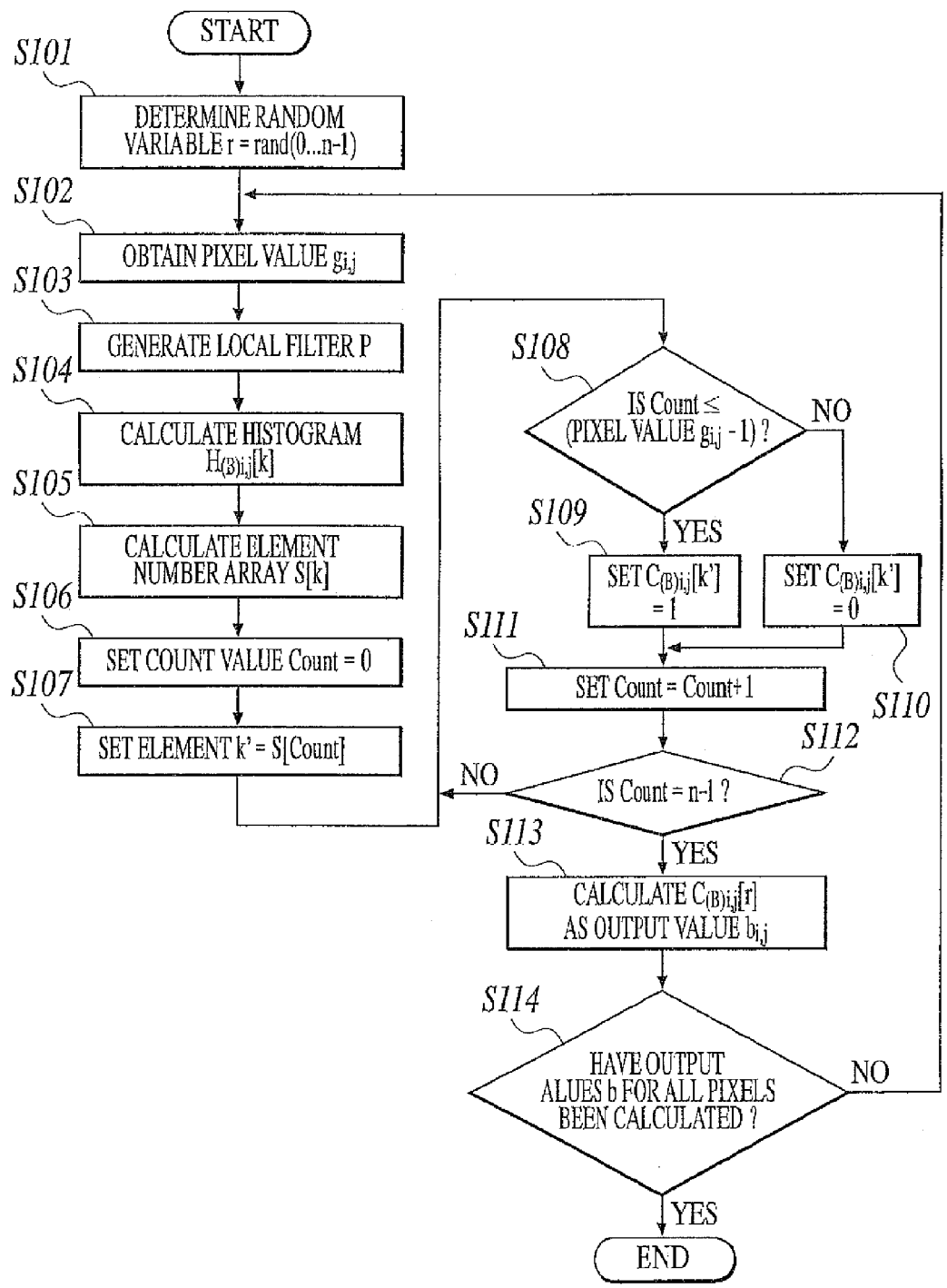
FIG. 11 is a flowchart showing an anti-correlation digital halftoning processing of a first color over time, executed by a processor of an image processing apparatus, in a third embodiment.

FIG. 11 is a flowchart showing the anti-correlation digital halftoning (the first quantization) processing, executed by the processor 2 of the image processing apparatus 1 on the basis of the above image processing program in order to generate the output image data of any one color of red, green or blue (in the present embodiment, the color is blue as an example).

As shown in FIG. 11, before the multi-gradation image data is input, the processor 2 previously determines a random valuable r (Step S101), similarly to the conventional Step T1.

After the multi-gradation image data is input, the processor 2 obtains a pixel value $g_{i,j}$ with regard to the pixel in the i-th row and the j-th column among the blue multi-gradation image data (Step S102). Then, the processor 2 generates a local filter P of the pixel in the i-th row and the j-th column on the basis of the pixel value $g_{i,j}$ (Step S103), similarly to the conventional Step T3.

After the local filter P is generated, the processor 2 calculates a histogram $H_{(B)i,j}[k]$ of the pixel in the i-th row and the j-th column (Step S104), similarly to the conventional Step T4. Hereupon, the letter "k" in the parenthesis of the subscript provided to "H" represents the color (blue, in the present embodiment).

Next, the processor 2 decides an element number array S[k] and a dot appearance pattern (dot appearance information array) $C_{(B)i,j}[k]$, and calculates output values b with respect to all elements, that is, the output image data (Steps S105 to S114), similarly to the conventional Steps T5 to T14. Thereby when one pixel is focused, dot appearance frequency is proportional to the pixel value $g_{i,j}$ thereof. Further, when a plurality of pixels adjacent each other are focused, the dot in each of pixels appears so as to maximize the anti-correlation with the neighboring pixels substantially. Therefore, the dispersibility of the dots formed on a recording medium while an image recording is improved.

When it is judged that the output image data of blue has been calculated, the processor 2 executes the anti-correlation digital halftoning (the second quantization) processing for generating the output image data of green and red.

Figure 12:
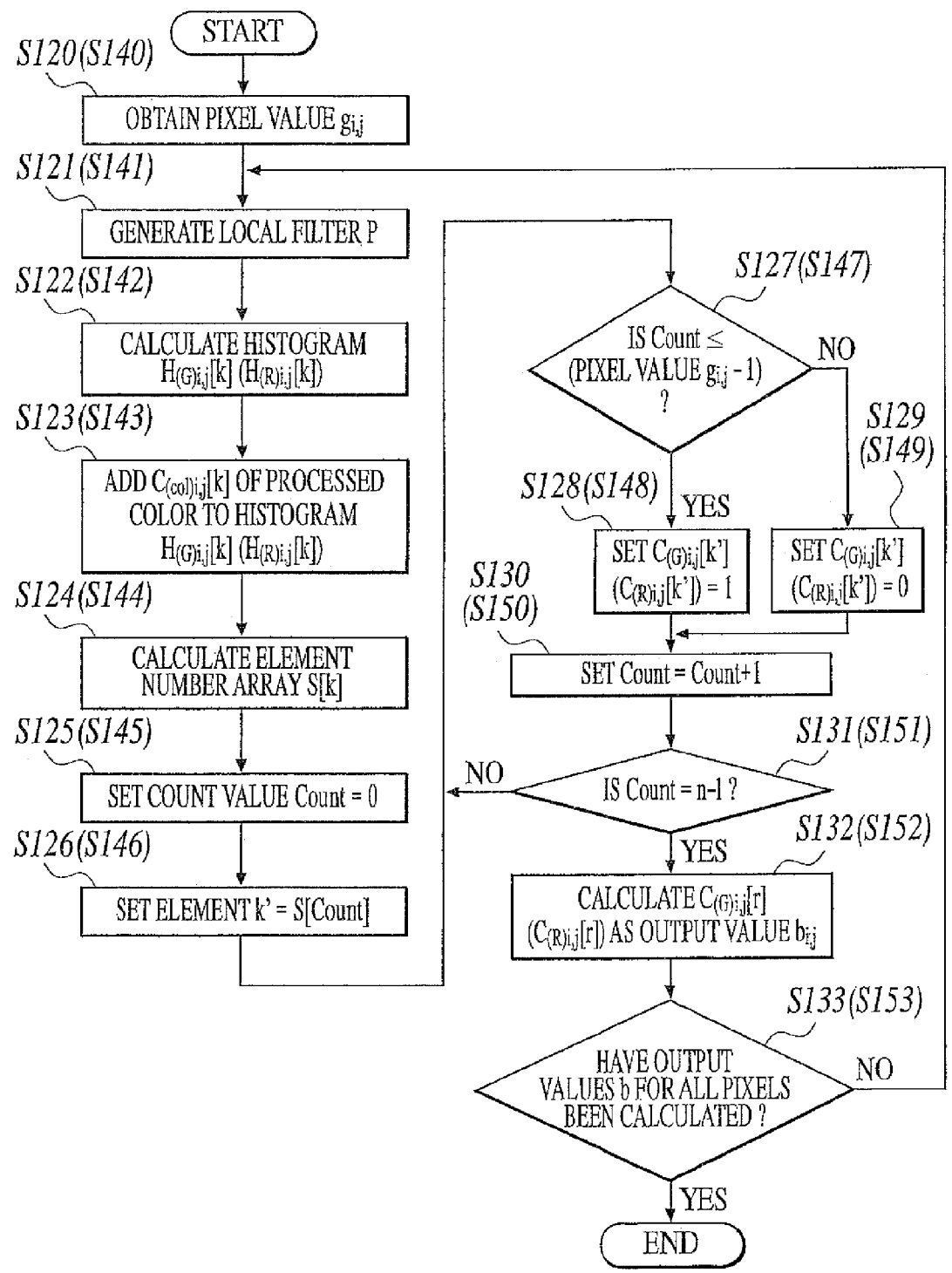
FIG. 12 is a flowchart showing an anti-correlation digital halftoning processing of a second or later colors over time, executed by a processor of an image processing apparatus, in a third embodiment.

FIG. 12 is a flowchart showing the anti-correlation digital halftoning processing that the processor 2 of the image processing apparatus 1 executes for generating the output image data of the second or later colors, on the basis of the image processing program. Incidentally, in the present embodiment, the processor 2 executes the anti-correlation digital halftoning processing in order of blue, green and red.

As shown in FIG. 12, the processor 2 executes the same processing as the above Steps S102 to S104, that is, obtains the pixel value $g_{i,j}$ of green with respect to the pixel in the i-th row and the j-th column, generates the local filter P, and calculates the histogram $H_{(G)i,j}[k]$ (Steps S120 to S122).

After the histogram $H_{(G)i,j}[k]$ of green is calculated, the processor 2 add the dot appearance pattern $C_{(B)i,j}[k]$ of blue, which is decided with respect to the pixel in the i-th row and the j-th column in the above Steps S107 to S111, to the histogram $H_{(G)i,j}[k]$ with a predetermined weight $W_{(B)i,j}$, as shown in the following formula written in C language (Step S123). That is, each of the dot appearance patterns $C_{(B)i,j}[0]$ to $C_{(B)i,j}[k]$ is added to each of the histograms $H_{(G)i,j}[0]$ to $H_{(G)i,j}[n-1]$ with a predetermined weight $W_{(B)i,j}$, respectively.

$$H_{(G)i,j}[k]+=W_{(B)i,j}*C_{(B)i,j}[k]$$

Thereby, the correlation between the blue dots and the green dots is adjusted. Hereupon, "a predetermined weight" is set on the basis of the relation between the color processed previously and the color processed currently, that is, between blue and green. When the amount of the weight $W_{(B)i,j}$ is large, it is hard that the blue dots and the green dots are overlapped each other. When the weight $W_{(B)i,j}$ is close to 0, the blue dots and the green dots are dispersed at random each other, as before. When the weight $W_{(B)i,j}$ is a negative value, the blue dots and green dots tend to be overlapped each other. In the present embodiment, also in view of the amount of the coefficient of the above-described local filter, the amount of the weight $W_{(B)i,j}$ is set to 64 (times). Incidentally, the subscript "col" in FIG. 4 represents the color to which the processing has been executed (hereupon, the color is blue).

Next, the processor 2 calculates the element number array S[k], decides the dot appearance pattern $C_{(G)i,j}[k]$, calculates the output values b with respect to all pixels, and ends the generation of the output image data of green (Steps S124 to S133), similarly to the above Steps S105 to S114.

Next, the processor 2 executes the same processing as the above Steps S102 to S104, that is, obtains the pixel value $g_{i,j}$ of red with respect to the pixel in the i-th row and the j-th column, generates the local filter P, and calculates the histogram $H_{(R)i,j}[k]$ (Steps S140 to S142).

After the histogram $H_{(R)i,j}[k]$ of red is calculated, the processor 2 adds the dot appearance pattern $C_{(B)i,j}[k]$ of blue, which is decided with respect to the pixel in the i-th row and the j-th column in the above Steps S107 to S111, and the dot appearance pattern $C_{(G)i,j}[k]$ of green, which is decided with respect to the pixel in the i-th row and the j-th column in the above Steps S126 to S130 with respect to the pixel in the i-th row and the j-th column, to the histogram $H_{(R)i,j}[k]$ with predetermined weights $W_{(B)i,j}$ and $W_{(G)i,j}$, respectively (Step S143). Thereby, the correlations between the blue dots and the red dots, and the green dots and the red dots are adjusted. Incidentally, in the present embodiment, the amount of the weight $W_{(G)i,j}$ is also set to 64 (times).

$$H_{(R)i,j}[k]+=W_{(B)i,j}*C_{(B)i,j}[k]+W_{(G)i,j}*C_{(G)i,j}[k]$$

Hereupon, in order to simplify the calculation, all the decided dot appearance patterns $C_{(B)i,j}[k]$ and $C_{(G)i,j}[k]$ may be not always used. For example, also when the above formula is defined as follows by using only the dot appearance pattern $C_{(B)i,j}[k]$ of blue, the favorable result can be obtained compared with the case of the conventional dot arrangement.

$$H_{(R)i,j}[k]+=W_{(B)i,j}*C_{(B)i,j}[k]$$

Next, the processor 2 calculates the element number array S[k], decides the dot appearance pattern $C_{(R)i,j}[k]$, calculates the output values b with respect to all pixels, and ends the generation of the output image data of red (Steps S144 to S153), similarly to the above Steps S105 to S114.

The output image obtained by the above image processing method is shown in FIG. 10B, and the output image obtained by the conventional image processing method is shown in FIG. 10C as comparison. Incidentally, in FIGS. 10B and 10C, in the case where any one of dots of R, G or B is output, the pixel is represented with white, and in the case where any dot is not output, the pixel is represented with black, so as to represent the dominance of the output image clearly.

As shown in these figures, according to the output image obtained by the above image processing method, the dots of each of colors are dispersed uniformly, and consequently, there are less overlapping part or non-dotted point part, differing from the conventional output image.

As above, according to the above image processing method, in the calculation of the histogram for determining the dot appearance pattern of the observed pixel, the correlation between the dots of different colors is adjusted by concerning not only the dot appearance patterns around the observed pixel with regard to the color which is currently processed but also the dot appearance pattern of the observed pixel with regard to the color which has been processed.

Therefore, it is possible to obtain the RGB image of which color heterogeneity or roughness is reduced and local variation of lightness is inhibited.

That is, because the dot appearance patterns $C_{(G)i,j}[k]$ of green and $C_{(R)i,j}[k]$ of red are decided on the basis of the dot appearance pattern $C_{(B)i,j}[k]$ of blue previously decided with respect to the pixel in the i-th row and j-th column, it is possible to certainly adjust the correlation between the dots of different colors.

Modification of the Third Embodiment (1)

Next, a modification of the image processing apparatus 1 in the above third embodiment will be described. Incidentally, the same note is provided to the same component as one of the above third embodiment, and the explanation thereof will be omitted.

The image processing apparatus 1 of the present modification comprises the same components as those of the image processing apparatus 1 described in the above third embodiment. However, the image processing apparatus 1 of the present modification performs the generation of the output image data by not frame sequential method but line sequential method. That is, after this image processing apparatus 1 has calculated the output values b of blue (green) with respect to all the pixels composing the column in the above Step S114 (S133), the image processing apparatus 1 ends the anti-correlation digital halftoning processing for blue (green), and starts the anti-digital halftoning processing for green (red).

When the dot appearance patterns of the second or later colors are decided, because also the image processing apparatus 1 uses the dot appearance pattern which has been already decided for other color, it is possible to obtain the same effect as the above third embodiment.

Modification of the Third Embodiment (2)

Next, another modification of the image processing apparatus 1 will be described. Incidentally, the same note is provided to the same component as one of the above third embodiment, and the explanation thereof will be omitted.

The image processing apparatus 1 of the present modification comprises the same components as those of the image processing apparatus 1 described in the above third embodiment. However, the image processing apparatus 1 of the present modification performs the generation of the output image data by not frame sequential method but dot sequential method. That is, after this image processing apparatus 1 has calculated the output value b of blue (green) with respect to one pixel in the above Step S114 (S133), the image processing apparatus 1 ends the anti-correlation digital halftoning processing for blue (green), and starts the anti-digital halftoning processing for green (red).

When the dot appearance patterns of the second or later colors are decided, because also the image processing apparatus 1 uses the dot appearance pattern which has been already decided for the color, it is possible to obtain the same effects as those of the above third embodiment.

Incidentally, in the above third embodiment and the modifications, the above explanation is given in the case where the anti-correlation digital halftoning processing of green is started after the output value $b_{i,j}$ of blue is calculated. However, the anti-correlation digital halftoning processing of green may be started before the output value $b_{i,j}$ is calculated as long as after the dot appearance pattern $C_{(B)i,j}[k]$ of blue has been decided.

Further, the above explanation is given in the case where the random valuable r is determined in the above Step S101. However, the fixed value in the range of 0 to (n−1) may be previously decided, or the random valuable r may be decided after the dot appearance patterns for all images are decided.

Further, the above explanation is given in the case where the histograms $H_{i,j}[k]$ are arranged in ascending order when the element number array S[k] is calculated. However, the histograms $H_{i,j}[k]$ may be arranged in another order, as long as there is dispersibility between the dots to be appeared. Further, when the element number array S[k] is calculated, instead of using the histogram $H_{i,j}[k]$, an evaluation function related to the distribution of the dot around the observed pixel may be set and used. It is possible to set such evaluation function by using the dot appearance pattern for the neighboring pixels of the observed pixel.

Further, although each of the amounts of the weights $W_{(B)i,j}$ and $W_{(B)i,j}$ are explained as 64 (times), it may be another value such as −32 (times), 128 (times) or the like. When the amount is −32 (times), it is also possible that the dispersibility between the dots of different colors is decreased and the dots of almost colors are overlapped each other. Further, when the amount is 128 (times), the dots of each of colors are dispersed more uniformly as shown in FIG. 10D. Consequently, it is possible to further decrease the overlapping part or the non-dotted point part.

In addition, the explanation is given in the case where each of the dot appearance patterns $C_{(B)i,j}[k]$ of blue and $C_{(G)i,j}[k]$ of green with respect to the pixel in the i-th row and the j-th column is added to the histogram $H_{(R)i,j}[k]$ of red with respect to the pixel in the i-th row and the j-th column with each of the weights $W_{(B)i,j}$ and $W_{(G)i,j}$ respectively. However, as shown in the following formula, each of the dot appearance patterns $C_{(B)i+\delta,j}[k]$ of blue and $C_{(G)i+\delta,j}[k]$ of green with respect to the neighboring pixel of the pixel in the i-th row and the j-th column may be also add with each of the predetermined weights $W_{(B)i+\delta,j}[k]$ and $W_{(G)i+\delta,j}[k]$ respectively. Incidentally, in the formula, the summation symbol "Σ" in the right-hand side means that the summation is executed with respect to all the processed colors. Further, "δ" is "−1" or "+1", and denotes the index of the column being already processed according to the processing direction of the image processing apparatus 1. However, the value of "δ" is not limited to the above value.

$$H_{i,j}[\kappa] \mathrel{+}= \sum_{col} \{W_{(col)i,j} * C_{(col)i,j}[\kappa] + W_{(col)i+\delta,j}[\kappa] * C_{(col)i+\delta,j}[\kappa]\}. \quad \text{[Formula 1]}$$

Figure 10:
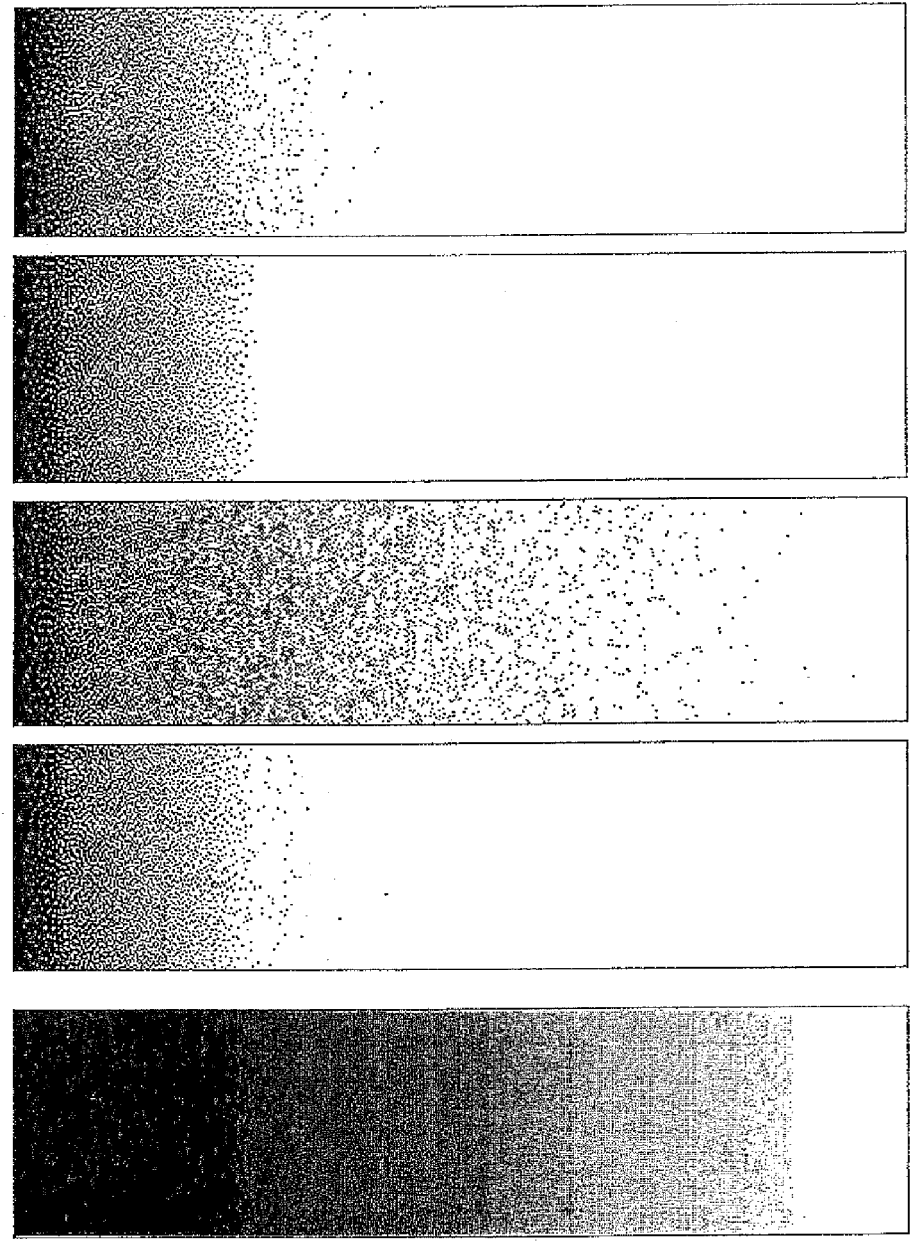
FIG. 10A is a drawing showing an output image of multi-gradation image data in a third embodiment.
FIG. 10B is a drawing showing an output image in the case where an image processing method related to a third embodiment is used.
FIG. 10C is a drawing showing an output image in the case where a conventional image processing method is used.
FIG. 10D is a drawing showing an output image in the case where an image processing method related to a third embodiment is used.
FIG. 10E is a drawing showing an output image in the case where an image processing method related to a third embodiment is used.

As concrete example, the result of the output where $W_{(col)i,j} = 64$ and $_{(col)i+\delta,j} = 32$ is shown in FIG. 10. As known in FIG. 10E, when each of the dot appearance pattern of the neighboring pixel is added, it is possible that the correlation between the blue dot and the green dot is more certainly adjusted, the color heterogeneity or the roughness is reduced, and modest randomness is provided to the dot position of each of colors.

Further, the above explanation is given in the case where the image processing apparatus 1 process the multi-gradation image data of a plurality of colors with regard to R, G and B. However, the multi-gradation image data of three colors such as Y (yellow), M (magenta) and C (cyan), the multi-gradation image data of four colors of Y, M, C, and K (black), or the like may be processed.

In this case, preferably, the anti-correlation digital halftoning processing is performed starting with the multi-gradation image data of the color of which lightness is low, that is, the color having high visibility. Thereby, compared with the case where the output image data is generated starting with the color of which lightness is high, it is possible that the dot of the color having high visibility is certainly dispersed. Therefore, it is possible to obtain the image of which color heterogeneity or roughness is visually low.

Moreover, for example, when the processing of the observed pixel is performed in order of C, M and Y, even if the dot of yellow of which lightness is the highest and visibility is the lowest is overlapped with the dot of another color, the effect caused by the overlapping is visually low. Therefore, the amount of the weight W which is used when the dot appearance patterns $C_{(C)i,j}[k]$ and $C_{(M)i,j}[k]$ are added to the histogram $H_{(Y)i,j}[k]$ of yellow may be decreased. As above, by setting the amount of the weight W on the basis of the relation between the color of which dot appearance pattern $C_{(col)i,j}[k]$ is decided first and the color of which dot appearance pattern $C_{(col)i,j}[k]$ is currently decided, it is possible that the dots of a plurality of colors each of which visibilities is different from each other are dispersed and arranged appropriately. Incidentally, the above subscript "(col)" represents any of colors of C, M or Y.

Further, it is possible to change the pixel value of each of the pixels of six basic filters $K_1$ to $K_6$ shown in FIGS. 32A to 33C. That is, the pixel values are not always the same as those in FIGS. 32A to 33C. Further, FIG. 31 is not always used when the local filter P is generated. Moreover, the local filter P may not be calculated based on the basic filters $K_1$ to $K_6$. For example, the table which previously stores the local filter P corresponding to the input pixel value may be used.

Fourth Embodiment

Next, the image processing apparatus 1 in the fourth embodiment will be described.

Incidentally, the fourth embodiment is given to accomplish particularly the above first object.

Further, the same note is provided to the same component as one of the above third embodiment.

The image processing apparatus 1 in the present embodiment comprises the same configurations as the image processing apparatus 1 explained in the above third embodiment. However, the image processing apparatus 1 in the present embodiment performs the quantization processing to the multi-gradation black-and-white image data with respect to a plurality of grayscale colors, and generates the pseudo halftone output image data.

Figure 13:
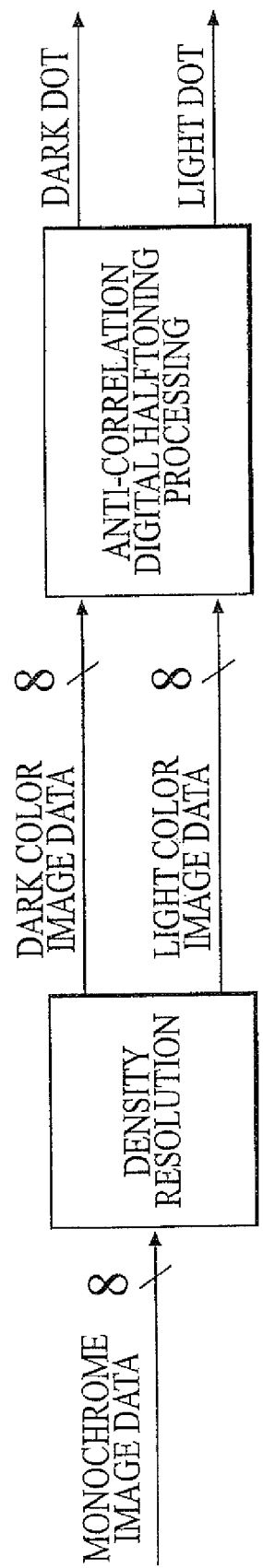
FIG. 13 is a drawing showing procedure for generating output image data, to which trilevel halftoning is performed, from black-and-white image data in a fourth embodiment.

In particular, for example, as shown in FIG. 13, the image processing apparatus 1 performs the density resolution of the white-and-black image data of 256-gradation, that is, 8-bit, into the dark color image data and the light color image data, by using the density resolution table. After that, first, the image processing apparatus 1 performs the anti-correlation digital halftoning (the first quantization) with respect to the dark color image data. Next, the image processing apparatus 1 performs the anti-correlation digital halftoning (the second quantization) with respect to the light color image data by using the dot appearance pattern of the dark dot according to the following formula. Thereby, the output image data, to which trilevel halftoning is performed, is generated.

$$H_{(light)i,j}[k]+W*C_{(dark)i,j}[k]$$

Figure 14:
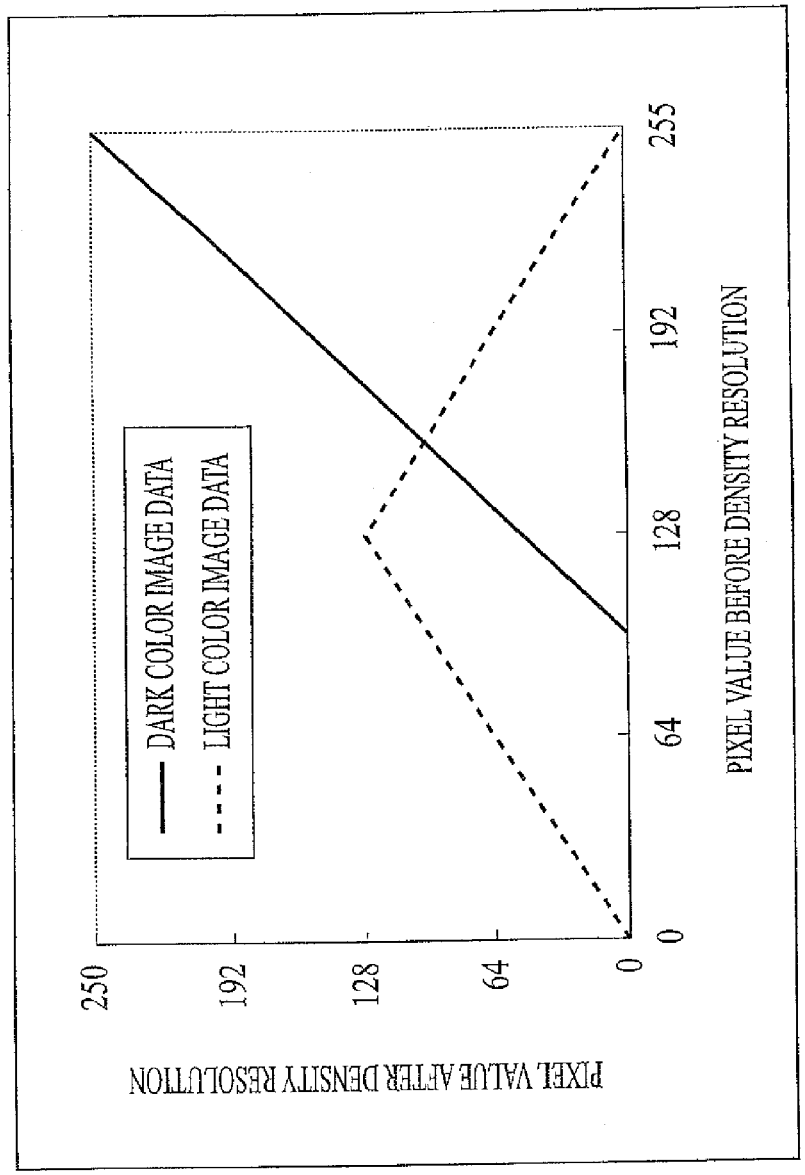
FIG. 14 is a drawing showing a density resolution table in a fourth embodiment.

Incidentally, as the density resolution table, for example, the one shown in FIG. 14 can be cited. Further, in the above formula, "$H_{(light)i,j}[k]$" is the histogram for calculating the dot appearance pattern of the light dot, and "$H_{(dark)i,j}[k]$" is the histogram for calculating the dot appearance pattern of the dark dot. Further, "W" is the positive fixed number.

Hereupon, preferably, the amount of the weight W is adjusted according to the pixel value of the dark color image data which has been processed with respect to the pixel in the i-th row and the j-th column. Concretely, when the pixel value of the dark color image data is small, it is preferable that the dark dot and the light dot are overlapped each other by bringing the amount of the weight W close to 0. Further, when the pixel value of the dark color image data is large, it is preferable that the random overlapping of the dark dot and the light dot is reduced by increasing the amount of the weight W.

According to the present image processing apparatus 1, compared with the case where each of the appearance of the dark and the light dots is decided independently, the dispersibility of the dark dot and the light dot is improved, and the random overlapping is reduced. Therefore, it is possible to decrease the heterogeneity of the dark and the light dots or the roughness.

Incidentally, in the above fourth embodiment, the explanation is given in the case where the density resolution of the black-and-white image data into the dark color image data and the light color image data is performed before the anti-correlation digital halftoning is performed. However, the density resolution of the black-and-white image data into the three or more image data may be performed. In this case, it is preferable that the anti-correlation digital halftoning is performed with respect to the image data in ascending order of the lightness, that is, the descending order of the density. Then, in the anti-correlation digital halftoning with respect to the high lightness image data, it is preferable that the lower the lightness of the color of the dot appearance pattern $C_{(dark)i,j}[k]$ is, the larger the amount of the weight W is made to be, to use for the calculation of the dot appearance pattern $C_{(light)i,j}[k]$. Thereby, the lower the lightness of the dot is and the higher the visibility of the dot is, the more the dispersibility can be improved. Therefore, it is possible to obtain the image of which color heterogeneity or roughness is visually low.

Fifth Embodiment

Next, the image processing apparatus 1 in the fifth embodiment will be described.

Incidentally, the fifth embodiment is given to accomplish particularly the above first object.

Further, the same note is provided to the same component as one of the above third embodiment, and the explanation thereof will be omitted.

The image processing apparatus 1 in the present embodiment comprises the same configurations as the image processing apparatus 1 explained in the above third embodiment. However, the image processing apparatus 1 in the present embodiment processes the color multi-gradation image data, and generates the color output image data to which multilevel halftoning is performed for every color.

Figure 15:
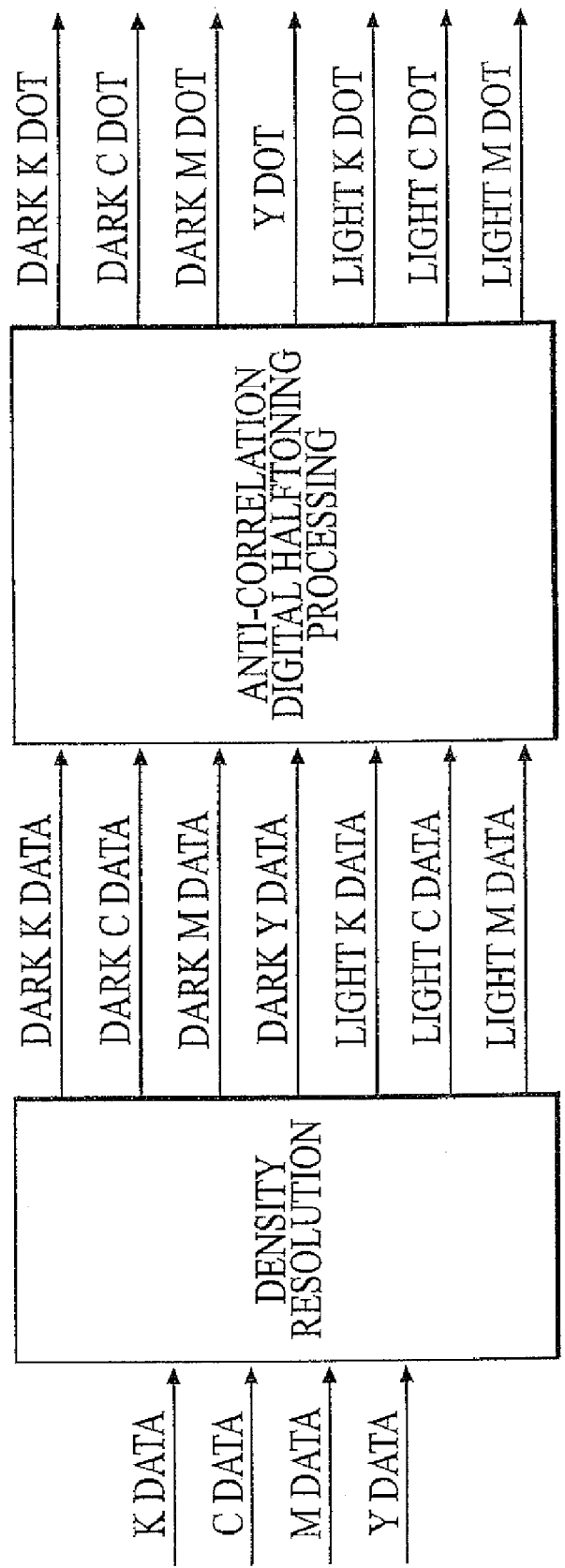
FIG. 15 is a drawing showing procedure for generating output image data, to which trilevel halftoning is performed for each of colors, from color multi-gradation image data in a fifth embodiment.

In particular, for example, as shown in FIG. 15, the image processing apparatus 1 generates the data of dark black, dark cyan, dark magenta and dark yellow, and the data of light black, light cyan and light magenta from the image data comprising 256-gradation for every color of Y, M, Y and K. After that, the image processing apparatus 1 performs the anti-correlation digital halftoning processing with respect to any one color. Next, the image processing apparatus 1 performs the anti-correlation digital halftoning processing with respect to the data of the second or later color by using the dot appearance pattern which has been already decided. Thereby, the image processing apparatus 1 generates the output image data, to which the bilevel halftoning is performed with respect to the color of yellow and the trilevel halftoning is performed with respect to the colors of black, cyan and magenta. Incidentally, the order for the anti-correlation digital halftoning processing may be the order of dark black, dark cyan, dark magenta, light black, light cyan, light magenta, and dark yellow, according to the lightness of each of colors. Further, the output image data may be generated in order of dark black, light black, dark cyan, light cyan, dark magenta, light magenta, and dark yellow, in order to improve the dot dispersibility between the same system colors. Further, it is possible to use the combination of a 4-dimensional look-up-table and an interpolation calculation, the above density resolution table, or the like, for the density resolution of the image data of each of colors.

According to this image processing apparatus 1, the correlation between the dots of the different colors and density is adjusted. Therefore, unlike in the conventional case, it is possible to obtain the YMCK image of which color heterogeneity, density heterogeneity and roughness or reduced is local variation of lightness is inhibited.

Sixth Embodiment

Hereinafter, the sixth embodiment of the present invention will be described with reference to the drawings.

Incidentally, the sixth embodiment is given to accomplish particularly the second object.

Further, the same note is provided to the same component as one of the above first embodiment.

First, the configuration of an image processing apparatus 1 related to the present embodiment will be explained.

FIG. 1 is a block diagram showing a schematic configuration of the image processing apparatus 1 related to the present embodiment. As shown in FIG. 1, the image processing apparatus 1 comprises a processor 2 for quantizing an input multi-gradation image data to convert it into a pseudo halftone output image data, and outputting the output image data. Incidentally, the image processing apparatus 1 can be mounted in a known output apparatus such as an inkjet printer or the like. Further, in the present embodiment, the multi-gradation image data will be explained as data related to a RGB image each of which pixel values comprises 8-bit grayscale.

The processor (computer) 2 comprises a ROM (Read Only Memory) 3 connected each other, a RAM (Random Access Memory) 4 and a CPU (Central Processing Unit) 5.

The ROM 3 stores an image processing program related to the present invention. The image processing program is for making the processor 2 execute the anti-correlation digital halftoning processing to the multi-gradation image data.

The RAM 4 includes work area for the CPU 5.

The CPU 5 develops the image processing program stored in the ROM 3 to the work area in the RAM 4, and generates an output image from the multi-gradation image data.

Next, the image processing method related to the present invention will be described with reference to FIGS. 16 to 20. Incidentally, in the following explanation, the image processing apparatus 1 executes the processing with switching the observed pixel in the direction from left to right. However, the processing direction after changing a row including a predetermined number of pixels, may be the also direction from left to right, may be the direction from right to left contrary, or may be selected at random between the left direction and the right direction. Preferably, the image processing apparatus 1 reverses the processing direction for every row or a plurality of rows so as to execute the processing in the snaking order as a whole.

Figure 16:
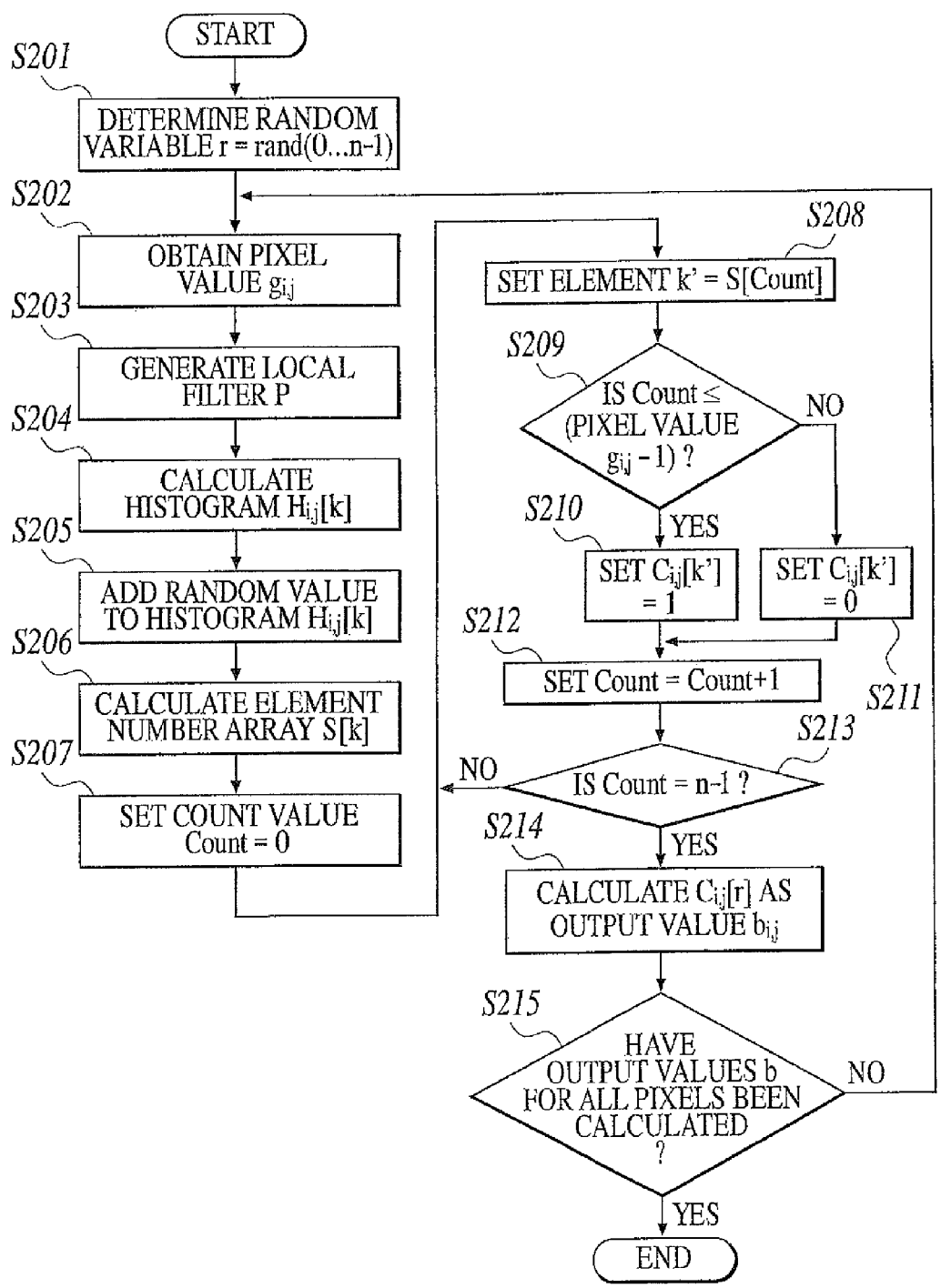
FIG. 16 is a flowchart showing an anti-correlation digital halftoning processing over time, executed by a processor of an image processing apparatus, in a sixth embodiment.

FIG. 16 is a flowchart showing the anti-correlation digital halftoning processing over time, executed by the processor 2 of the image processing apparatus 1 on the basis of the above image processing program in order to generate the output image data.

As shown in FIG. 16, before the multi-gradation image data is input, the processor 2 previously determines a random valuable r (Step S201), similarly to the conventional Step T1.

After the multi-gradation image data is input, the processor 2 obtains a pixel value $g_{i,j}$ with regard to the pixel in the i-th row and the j-th column among the multi-gradation image data (Step S202). Then, the processor 2 generates a local filter P of the pixel in the i-th row and the j-th column on the basis of the pixel value $g_{i,j}$ (Step S203), similarly to the conventional Step T3.

After the local filter P is generated, the processor 2 calculates a histogram $H_{i,j}[k]$ of the pixel in the i-th row and the j-th column (Step S204), similarly to the conventional Step T4.

Next, after the above histogram $H_{i,j}[k]$ is calculated, the processor 2 adds the random value rand( ) to the histogram $H_{i,j}[k]$, which is being processed, with the appropriate weight w corresponding to the input image data (Step S205). That is, with respect to each of the values (the expectation values) of the histograms $H_{i,j}[0]$ to $H_{i,j}[n-1]$, the processor 2 adds the random values corresponding to each of the values.

In particular, the following calculation is performed.

$$H_{i,j}[k]+w(\text{rand}(\ ),\text{In}_{i,j})$$

$\text{In}_{i,j}$ is the value of the input pixel. rand( ) is a integer random value and is always different. As the random value, for example, it is possible to use random numbers of M-sequence.

As above, in the calculation of the histogram for deciding the dot appearance pattern of the observed pixel, by adding not only the neighboring dot appearance patterns of the pixel being currently processed (dot appearance information arrays with respect to the neighboring pixel) but also the random value, the periodic structure is avoided and the generation of the pseudo outline is prevented.

Further, the amplitude corresponding to the input value is set, and the randomness is enhanced with respect to the input value (gradation value) specific for the generation of the periodicity.

After Step 8205, the processor 2 decides an element number array S[k] and a dot appearance pattern (dot appearance information array) $C_{i,j}[k]$, and calculates output values b with respect to all elements, that is, the output image data (Steps S206 to S215), similarly to the conventional Steps T5 to T14. Thereby when one pixel is focused, dot appearance frequency is proportional to the pixel value $g_{i,j}$ thereof. Further, when a plurality of pixels adjacent each other are focused, the dot in each of pixels appears so as to maximize the anti-correlation with the neighboring pixels substantially. Therefore, the dispersibility of the dots formed on a recording medium while an image recording is improved.

Figure 17C:
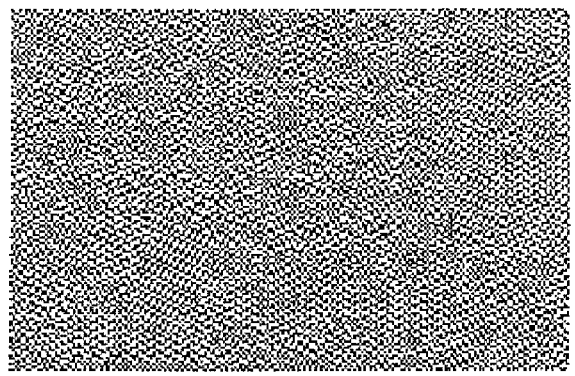
FIG. 17C is a drawing showing an output image in the case where an image processing method related to a sixth embodiment is used.
Figure 17B:
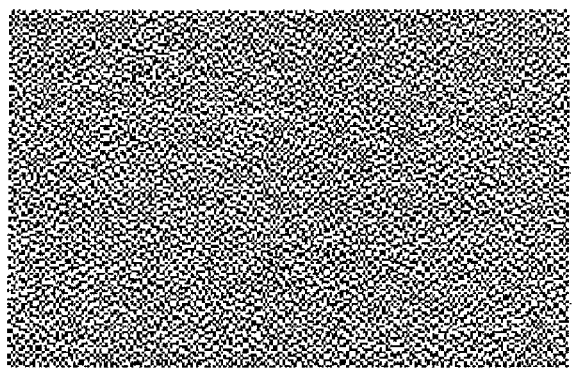
FIG. 17B is a drawing showing an output image in the case where an image processing method related to a sixth embodiment is used.
Figure 17A:
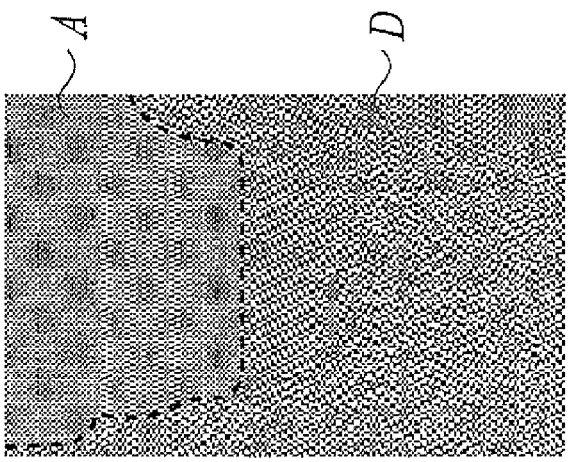
FIG. 17A is a drawing showing an output image in the case where a conventional image processing method is used.

As an example, the result in the case where the conventional algorithm is applied to 50% gray image ($\text{In}_{i,j}=128$) is shown in FIG. 17A. Further, the result in the case where the present algorithm is applied is shown in FIG. 17B. FIGS. 17A and 17B are the results in the case where the random value rand( ) is defined as integer type and w is defined as follows.

w(rand( ), $In_{i,j}$)=rand( )%32; in the case of 125≦$In_{i,j}$≦130
w(rand( ), $In_{i,j}$)=0; in the case that $In_{i,j}$ is in the range other than the above Thereby, in FIG. 17A, there exist the A part where the periodicity of regular generation and non-generation of the dots is strongly generated, and the other D part, and accordingly, the pseudo outline is generated on the border (shown by the dot-line). However, in FIG. 17B, there exist no periodic structure, and the pseudo outline is not generated.

The setting of w is decided in view of the maximum value of the filter coefficient used when the histogram of the anti-correlation digital halftoning method is calculated. It is appropriate that the maximum value of w is set to almost half of the maximum value of the filter coefficient shown in FIGS. 32A to 33C with respect to the 50% input value.

Incidentally, the weight w, which is the function of the input pixel value, for example, may be set as follows, so as to lessen the amplitude sequentially with respect to the input value adjacent to 50%.

w(rand( ), $In_{i,j}$)=rand( )%32; in the case of $In_{i,j}$=127 or 128;
w(rand( ), $In_{i,j}$)=rand( )%16; in the case of $In_{i,j}$=126 or 129;
w(rand( ), $In_{i,j}$)=rand( )%8; in the case of $In_{i,j}$=125 or 130;
w(rand( ), $In_{i,j}$)=0; in the case that $In_{i,j}$ is in the range other than the above.

Moreover, when periodic artifacts are generated in another specific portion according to the selection (setting) of the filter coefficient, w can be set appropriately corresponding to the portion (position). For example, when it is intended that the input value around 33.67% is randomize in addition to 50%, w may be set as follows.

w(rand( ), $In_{i,j}$)=rand( )%32; in the case of $In_{i,j}$=85, 127, 128, or 170
w(rand( ), $In_{i,j}$)=rand( )%16; in the case of $In_{i,j}$=84, 86, 126, 129, 169, or 171
w(rand( ), $In_{i,j}$)=rand( )%8; in the case of $In_{i,j}$=83, 87, 125, 130, 168, or 172
w(rand( ), $In_{i,j}$)=0; in the case that $In_{i,j}$ is in the range other than the above Further, in the above example, w is set as follows, in the case that $In_{i,j}$ is a value other than the specific values.

w(rand( ), $In_{i,j}$)=0

However, when it is intended to further increase the randomness, not 0 but the random value having small amplitude (for example, w(rand( ), $In_{i,j}$)=rand( )%8) may be added to the histogram, over the whole gradation range except for the above specific values.

Incidentally, although a calculation operator % for the remainder of the random value is used for the setting of w, a random value may be set as the function of the random value and the input value.

Further, as for the random value, a pattern may be prepared previously as a table, and a pattern reference address may be changed corresponding to the number (k) and the position (i, j) of the dot appearance pattern.

Figure 18:
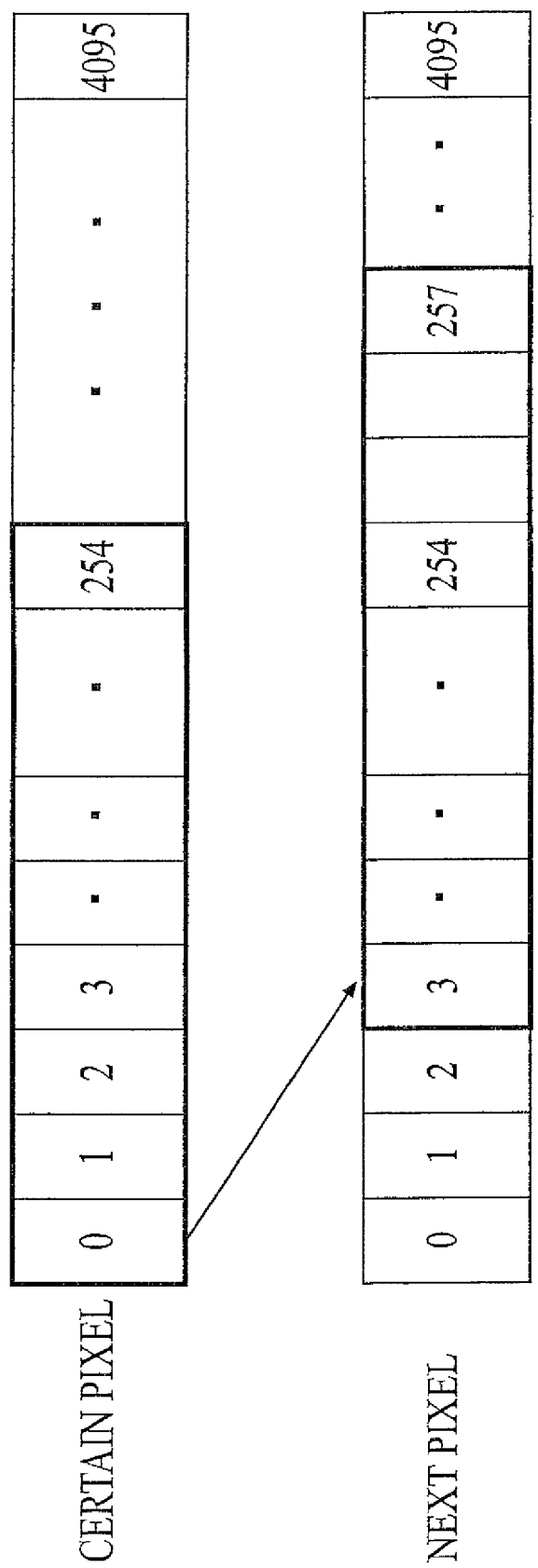
FIG. 18 is an explanation drawing of a random valuable storage table in a sixth embodiment.

For example, as shown in FIG. 18, 4096 random patterns (0 to 4095) are prepared previously, and the pattern number to be referred corresponding to k of the dot appearance pattern is changed. Moreover, the starting position to be added to the initial dot appearance pattern (k=0) may be shifted for every pixel.

Furthermore, when the processing is performed with respect to a plurality of colors, it is preferable that the dot appearance pattern of the color, which has been already processed, is added to the histogram to be calculated in the processing for the second or later colors, with a predetermined weight. By doing so, it is possible to decrease the color heterogeneity or the roughness, by adjusting the correlation with the dot of other color.

Incidentally, in the case of the anti-correlation digital halftoning processing from a color image, the anti-correlation digital halftoning processing for generating the output image data for all the color is performed.

Further, in the above embodiment, the random value is added in the calculation of the histogram for deciding the dot appearance pattern of the observed pixel. However, there is also the method where the random value is added to the gradation value of the observed pixel of the multi-gradation image data, and thereby, the periodic structure easily generated by the specific input value is avoided, and consequently, the generation of the pseudo outline is prevented.

Hereinafter, the above method will be described.

Figure 19:
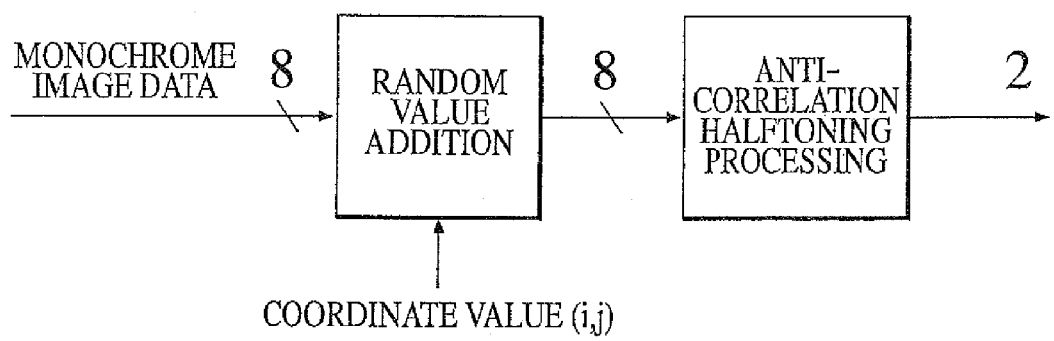
FIG. 19 is a drawing showing procedure for generating output image data, to which bilevel halftoning is performed, from monochrome multi-gradation image data in a sixth embodiment.

FIG. 19 is a block diagram of the configuration of the method. In the random value addition block, the image data and the position of the image data are input. After the random value is generated, the data is output to the anti-correlation halftoning block.

Figure 20:
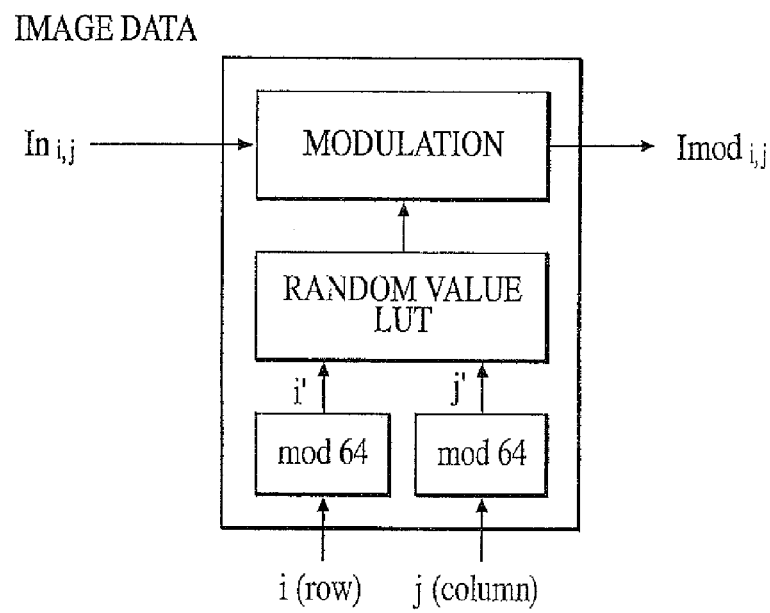
FIG. 20 is a drawing for explaining a method for executing addition of a random valuable to multi-gradation image data in a sixth embodiment.

Hereupon, as shown in the random value addition interior block diagram of FIG. 20, the random value is previously calculated by the 64×64 matrix, and stored in LUT (look-up-table). The address of the LUT is set by performing the calculation of i%64 and j%64 according to the positions of i and j. The pattern of the random value is set as the white noise characteristic.

Further, the amplitude of the random value is set as follows, according to the input value.

w(rand( ), $In_{i,j}$)=rand( )%11-5; in the case of $In_{i,j}$=127 or 128
w(rand( ), $In_{i,j}$)=rand( )%7-3; in the case of $In_{i,j}$=126 or 129
w(rand( ), $In_{i,j}$)=rand( )%3-1; in the case of $In_{i,j}$=125 or 130
w(rand( ), $In_{i,j}$)=0; in the case that $In_{i,j}$ is in the range other than the above Then, $Imod_{i,j}$ is set as $Imod_{i,j}$=$In_{i,j}$+w(rand( ), $In_{i,j}$).

The result of the processing is shown in FIG. 17C. It can be confirmed that the periodic structure is decreased albeit gradually, compared with the case of the randomization of the histogram.

Incidentally, the pattern of the random value is not limited to the white noise characteristic, and, for example, may be the blue noise characteristic.

Incidentally, in the anti-correlation halftoning block, the anti-correlation digital halftoning processing which is the same as the conventional one is performed.

According to the above method, it is also possible that the dispersibility in the vicinity of a middle level while the multi-value anti-correlation digital halftoning processing is improved. That is, in the portion described above, because the uniform level occupies 100%, the pseudo outline is sometimes generated caused by the difference of the image structure with the other portion. However, if the random value is added in the vicinity of the middle level, it is possible to avoid the uniform level and to improve the dispersibility.

As above, according to the image processing apparatus and the image processing method of the present embodiment, in the dot arrangement in the processing for quantizing the multi-gradation image data to convert it into pseudo halftone output image data, it is possible to control the dot so as not to generate the periodic structure by adding a random value to the expectation value of the dot appearance in the neighboring pixel of the observed pixel, which is calculated for every element pixel number of the element composing the dot appearance information array with respect to the neighboring pixel. Accordingly, it is possible to prevent the output image from the pseudo outline.

Further, in the present embodiment, it is possible to adequately set the amount of correction for preventing the periodicity, according to the input gradation value, by setting and changing the random value according to the gradation value of the pixel. Consequently, it is possible to set the strength of the randomness corresponding to the degree of needs. Therefore it is possible to control the dot so as not to generate the periodic structure. Accordingly, it is possible to prevent the output image from the pseudo outline.

Moreover, in the present embodiment, it is possible to control the space frequency characteristic by setting and changing the random value according to the position of the pixel. Consequently, it is possible to control the dot so as not to generate the periodic structure, more certainly. Accordingly, it is possible to prevent the output image from the pseudo outline.

Furthermore, in the dot arrangement in the processing for quantizing the multi-gradation image data to convert it into pseudo halftone output image data, it is possible to control the dot so as not to generate the periodic structure by adding a random value to the gradation value of the observed pixel of the multi-gradation image data. Accordingly, it is possible to prevent the output image from the pseudo outline.

Moreover, when the multi-value anti-correlation digital halftoning method is applied, it is possible to prevent the pseudo outline in the vicinity of the quantization level.

Incidentally, the present invention is not limited to each of the above embodiments, and may be modified or changed design diversely without departing from the essence thereof.

For example, in the present embodiment, the input image is the monochrome image comprising the 8-bit grayscale. However, not limited to that, it is possible to use other input image of which gradation, resolution, color (monochrome or color) or the like are appropriate.

Further, in the present embodiment, the output image is the black-and-white output image to which the bilevel halftoning is performed. However, not limited to that, it is possible to use the output image comprising three or more output values including the color image.

Seventh Embodiment

Hereinafter, the seventh embodiment of the present invention will be described with reference to the drawings.

Incidentally, the seventh embodiment is given to accomplish particularly the third object.

Further, the same note is provided to the same component as one of the above first embodiment.

First, the configuration of an image processing apparatus 1 related to the present embodiment will be explained.

FIG. 1 is a block diagram showing a schematic configuration of the image processing apparatus 1 related to the present embodiment. As shown in FIG. 1, the image processing apparatus 1 comprises a processor 2 for quantizing an input multi-gradation image (original image) data to convert it into a pseudo halftone output image data, and outputting the output image data. Incidentally, the image processing apparatus 1 can be mounted in a known output apparatus such as a leaser printer, digital copier or the like. Further, in the present embodiment, the multi-gradation image data will be explained as data with regard to a monochrome image each of which pixel values comprises the 8-bit grayscale. Further, in the present embodiment, the 8-bit (256-gradation) multi-gradation image data is quantized to two levels (values) of white (non-recording) or black (dot recording) with respect to one pixel.

The processor (computer) 2 comprises a ROM (Read Only Memory) 3 connected each other, a RAM (Random Access Memory) 4 and a CPU (Central Processing Unit) 5.

The ROM 3 stores an image processing program related to the present invention. The image processing program is for making the processor 2 execute the anti-correlation digital halftoning processing to the multi-gradation image data.

The RAM 4 includes work area for the CPU 5.

The CPU 5 develops the image processing program stored in the ROM 3 to the work area in the RAM 4, and generates an output image from the multi-gradation image data.

Next, the image processing method related to the present invention will be described with reference to FIGS. 21A to 26E. Incidentally, in the following explanation, the image processing apparatus 1 executes the processing with switching the observed pixel in the direction from left to right. However, the processing direction after changing a row including a predetermined number of pixels, may be the also direction from left to right, may be the direction from right to left contrary, or may be selected at random between the left direction and the right direction. Preferably, the image processing apparatus 1 reverses the processing direction for every row or a plurality of rows so as to execute the processing in the snaking order as a whole.

Figures 23, 24:
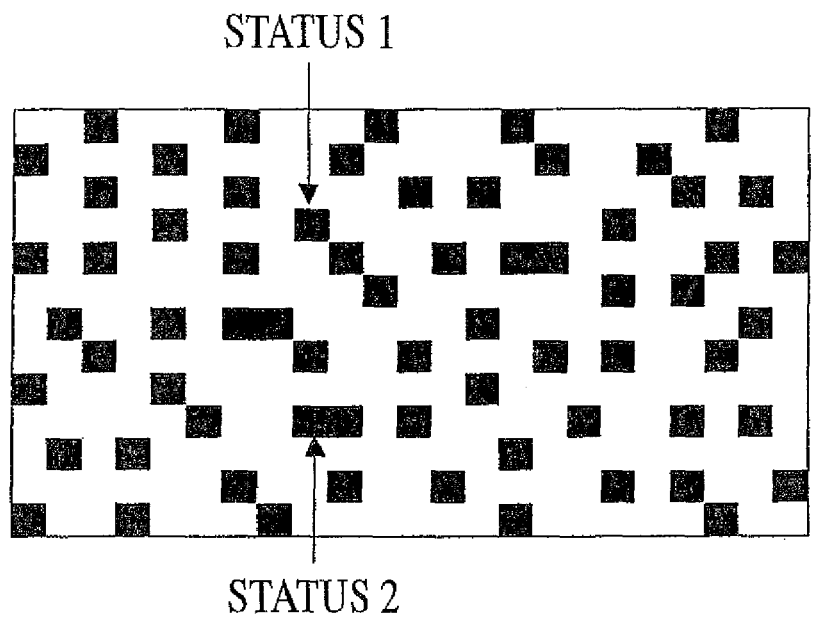
FIG. 23 is a drawing for explaining dots in status 1 and dots in status 2 in a seventh embodiment.
FIG. 24 is a correspondence table among an input pixel value, a status 1 level value and a status 2 level value in a seventh embodiment.

Further, as shown in FIG. 23, the case where after one dot is recorded, there is no effects for the generation of the next dot is defined as "status 1", and the case where after one dot is recorded, the processing is performed so as to generate the next dot is defined as "status 2".

Figure 21A:
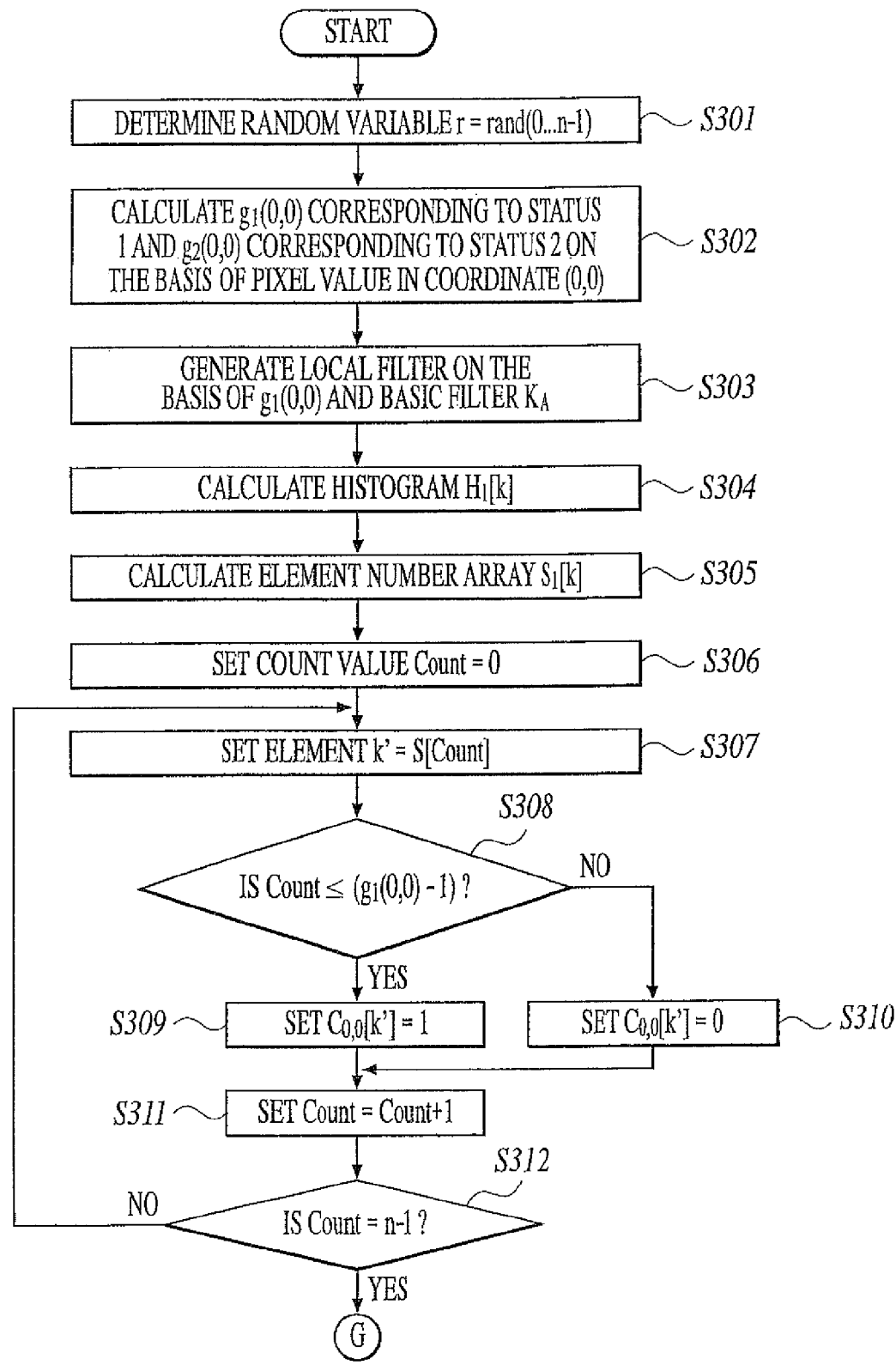
FIGS. 21A and 21B are flowcharts showing an anti-correlation digital halftoning processing over time, executed by a processor of an image processing apparatus, in a seventh embodiment.
Figure 21B:
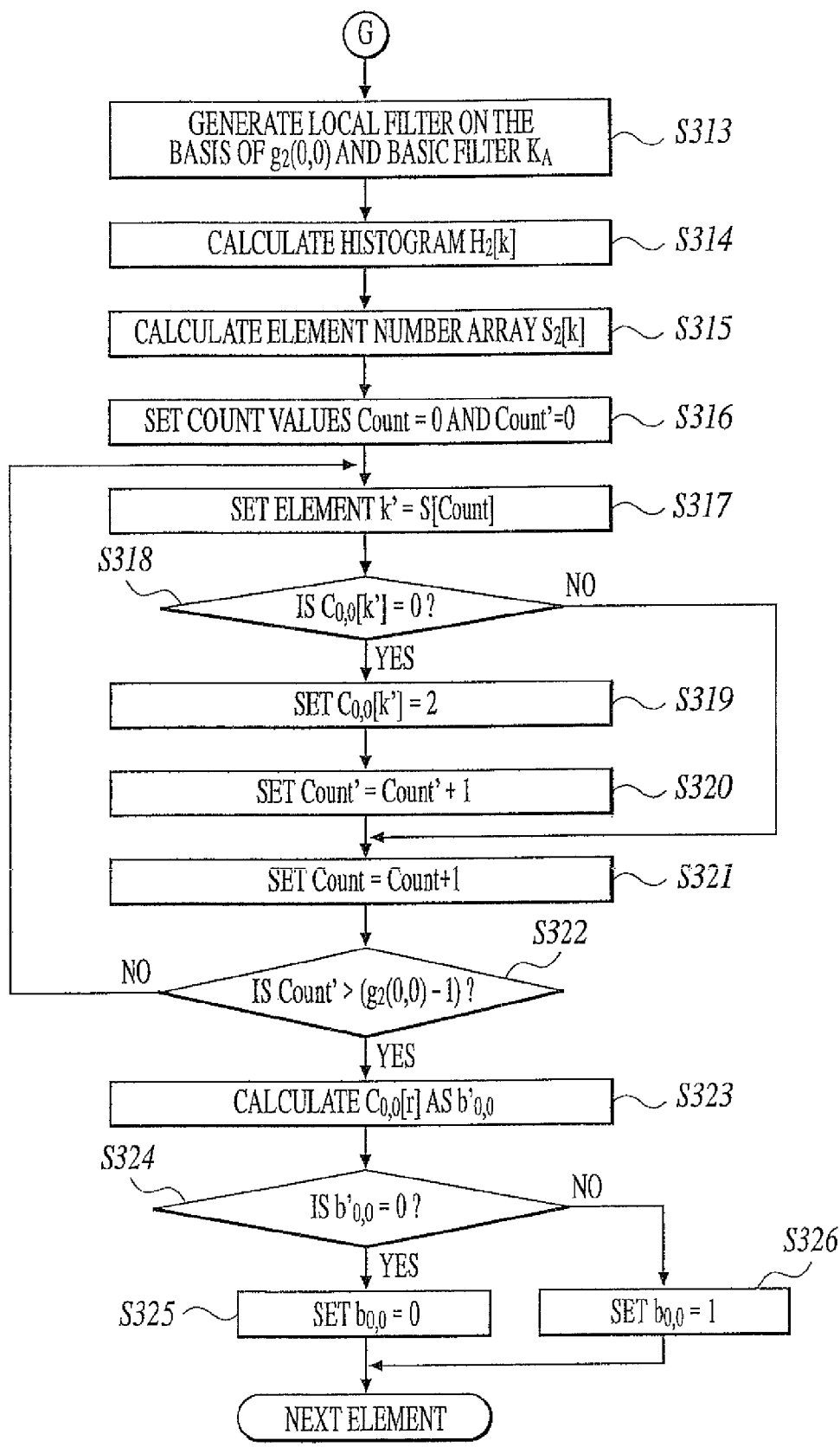

FIGS. 21A and 21B are flowcharts showing the anti-correlation digital halftoning processing over time, executed by the processor 2 of the image processing apparatus 1 on the basis of the above image processing program in order to generate the output image data of the pixel in the coordinate of the 0th row and the 0th column.

As shown in FIGS. 21A and 21B, before the multi-gradation image data is input, the processor 2 previously determines a random valuable r (Step S301), similarly to the conventional Step T1.

After the multi-gradation image data is input, the processor 2 obtains a pixel value (input pixel value) $g(0, 0)$ with regard to the pixel (observed pixel) in the 0th row and the 0th column among the multi-gradation image data. Then, the processor 2 specifies the generation probability of the dots in the status 1 and the status 2, on the basis of the above pixel value. Further, the processor 2 calculates the status 1 level value (status 1 gradation value) $g_1(0, 0)$ corresponding to the dot in the status 1, and the status 2 level value (status 2 gradation value) $g_2(0, 0)$ corresponding to the dot in the status 2. Incidentally, the pixel value $g(0, 0)$ means the gradation value of the pixel in the 0th row and the 0th column. Further, hereupon, the summation of the generation probability of the status 1 and the status 2 is set to be 1, and the summation of the status 1 level value $g_1(0, 0)$ and the status 2 level value $g_2(0, 0)$ is set to be the value of the pixel value $g(0, 0)$.

In the table of FIG. 24, the correspondence between the status 1 level value $g_1$ and the status 2 level value $g_2$ is shown. This correspondence is the same as the relation between the generation probability of the status 1 and the status 2 with respect to the input pixel value, and is decided so as to optimize the output image.

After the status 1 level value $g_1(0, 0)$ and the status 2 level value $g_2(0, 0)$ are calculated, the processor 2 generates the local filter $P_1$ (Step S303) with respect to the status 1 dot of the pixel in the 0th row and the 0th column, on the basis of the status 1 level value $g_1(0, 0)$ and the basic filter $K_A$ shown in FIG. 25A, among the two filters of the basic filter $K_A$ (where all of the coefficients are positive numbers) shown in FIG. 25A and the basic filter $K_B$ (where the coefficient of the pixel just left side of the observed pixel is a negative number) shown in FIG. 25B. Because the detail procedures are the same as those of the conventional Step T3, the description thereof will be omitted.

After the local filter $P_1$ is generated, the processor 2 calculates the histogram $H_1(0, 0)[k]$ of the status 1 level value $g_1(0, 0)$ in the 0th row and the 0th column (Step S304). Because the detail procedures are the same as those of the conventional Step T4, the description thereof will be omitted. Incidentally, in the present embodiment, "dot appearance pattern $C_{i,j}[k]$" is the sequence (dot appearance information array) composed of $C_{i,j}[0]$ to $C_{i,j}[n-1]$ each of which is 0, 1 or 2. If the dot appearance pattern $C_{i,j}[k]$ is "1" when any value of 0 to (n-1) is assigned to the element k, the dot appearance pattern $C_{i,j}[k]$ means that the dot of the status 1 is formed in the pixel in the i-th row and the j-th column. If the dot appearance pattern $C_{i,j}[k]$ is "2", it means that the dot of the status 2 is formed in the pixel in the i-th row and the j-th column. If the dot appearance pattern $C_{i,j}[k]$ is "0", it means that the dot is not formed.

Next, the processor 2 rearranges the histograms $H_1(0, 0)[0]$ to $H_1(0, 0)[n-1]$ of the status 1 level value $g_1(0, 0)$ calculated with respect to each element k, in ascending order. Then the processor 2 calculates the element number array $S_1[k]$ which represents the order of the histogram $H_1(0, 0)[k]$ (Step S305).

For example, the histograms $H_1(0, 0)[0]$ to $H_1(0, 0)[n-1]$ are rearranged in the order of "$H_1(0, 0)[8] < H_1(0, 0)[3] < H_1(0, 0)[4] < H_1(0, 0)[1] < H_1(0, 0)[5] < \ldots < H_1(0, 0)[n-1]$", the element number array $S_1[k]$ is calculated as $\{8, 3, 4, 1, 5, \ldots, (n-1)\}$. Incidentally, in the element number array $S_1[k]$, "8" is the 0th element and "3" is the 1st element.

After Step S305, the processor 2 provides "1 (status 1 dot recording)" or "0 (non-recording)" to the dot appearance pattern (dot appearance information array) $C_{0,0}[k']$, similarly to the conventional Steps T6 to T12. Then, the processor 2 decides the appearance pattern of the status 1 dot among the dot appearance pattern $C_{0,0}[k]$ (Steps S306 to S312).

After the appearance pattern of the status 1 dot is decided, next, the processor 2 generates the local filter $P_2$ (Step S313) with respect to the status 2 dot of the pixel in the 0th row and the 0th column, on the basis of the status 2 level value $g_2(0, 0)$ and the basic filter $K_A$ shown in FIG. 25A, among the two filters of the basic filter $K_A$ shown in FIG. 25A and the basic filter $K_B$ shown in FIG. 25B. Then, the processor 2 calculates the histogram $H_2(0, 0)[k]$ (Step S314). The detail procedures are the same as those of the above Steps S303 and S304.

Next, the processor 2 performs the same processing as the above Step S305, and calculates the element number array $S_2[k]$ of the histogram $H_2(0, 0)[k]$ calculated with respect to each of elements k (Step S315).

After the element number array $S_2[k]$ is calculated, the processor 2 sets the count value Count to 0 and sets the count value Count' to 0 (Step S316). Further, the processor 2 assigns the value of the element S[Count] the order of which corresponds to the count value Count among the element number array S[k] to the element k' of the element number array $S_2[k]$ (Step S317).

Then, the processor 2 judges whether or not "0" is set to the dot appearance pattern $C_{0,0}[k']$ of the part of the element k corresponding to the element k' (=0) (Step S318). When "0" is set to the dot appearance pattern $C_{0,0}[k']$ by the processing of the above Step S310, the processor 2 changes "0", which is set in the dot appearance pattern $C_{0,0}[k']$ of the aforementioned part, into "2" (Step S319), and adds 1 to the count value Count' 1 (Step S320).

On the other hand, when "1" is set to the dot appearance pattern $C_{0,0}[k']$ of the part of the element k corresponding to the element k' (=0) by the processing of the above Step S309, the processor 2 does not change "1", which is set in the dot appearance pattern $C_{0,0}[k']$ of the aforementioned part, and leaves it as it is.

That is, in the dot appearance pattern $C_{0,0}[k]$, the processor 2 set "2" which means the status 2 dot, while avoiding the part where "1" which means the status 1 dot is already set.

After the above processing is ended, the processor 2 adds 1 to the count value Count (Step S321). Then the processor 2 compares the relation between the count value Count' (=1) and (status 2 level value $g_2(0, 0)-1$) (Step S322). The processor 2 repeatedly perform the processing from Step S317 to Step S321 until the count value Count' exceeds (status 2 level value $g_2(0, 0)-1$). Thereby, the processor 2 decides the appearance pattern of the status 2 dot among the dot appearance patterns $C_{0,0}[k]$ Then when the appearance pattern of the status 2 dot is decided, according to that, the dot appearance pattern $C_{0,0}[k]$ is decided.

Incidentally, in order to decide the appearance pattern of the status 2 dot, the processor 2 should repeatedly perform the processing from Step S317 to Step S321 until the count value Count' exceeds (status 2 level value $g_2(0, 0)-1$), and it is not necessary to repeat the processing until the element number k is (n-1) as the processing for the status 1 dot. This is because the part where "2" is not set to the dot appearance pattern $C_{0,0}[k]$ is set to "1" or "0" in the above processing for the status 1 dot. Thereby, there is the advantage that it is not necessary to perform excessive processing.

After the dot appearance pattern $C_{0,0}[k]$ is decided, the processor 2 calculates $C_{0,0}[r]$, the index of which is the random variable determined in the above Step S1, as the output value $b'_{0,0}$ of the pixel in the 0th row and the 0th column, among the dot appearance patterns $C_{0,0}[k]$ (Step S323).

Then, the processor 2 judges whether the output value $b'_{0,0}$ is "0" (Step S324). When the value $b'_{0,0}$ is "0", the output $b_{0,0}$ is "0", that is, non-recording (white) is decided. When the value $b'_{0,0}$ is "1" or "2", the output $b_{0,0}$ is "1", that is, recording black is decided (Step S326).

After that, the processing for the next pixel is performed.

Figure 22A:
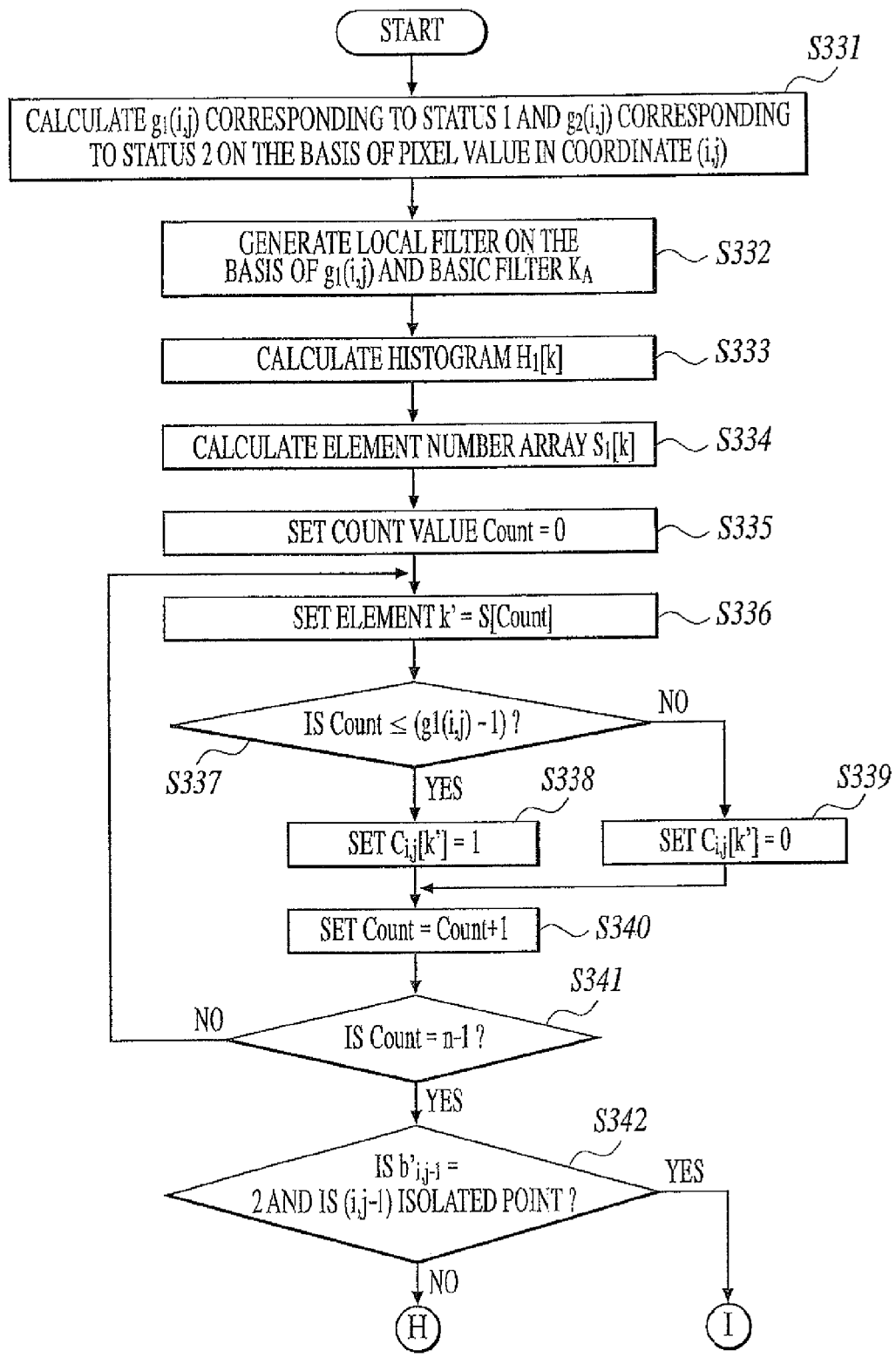
FIGS. 22A and 22B are flowcharts showing an anti-correlation digital halftoning processing over time, executed by a processor of an image processing apparatus, in a seventh embodiment.
Figure 22B:
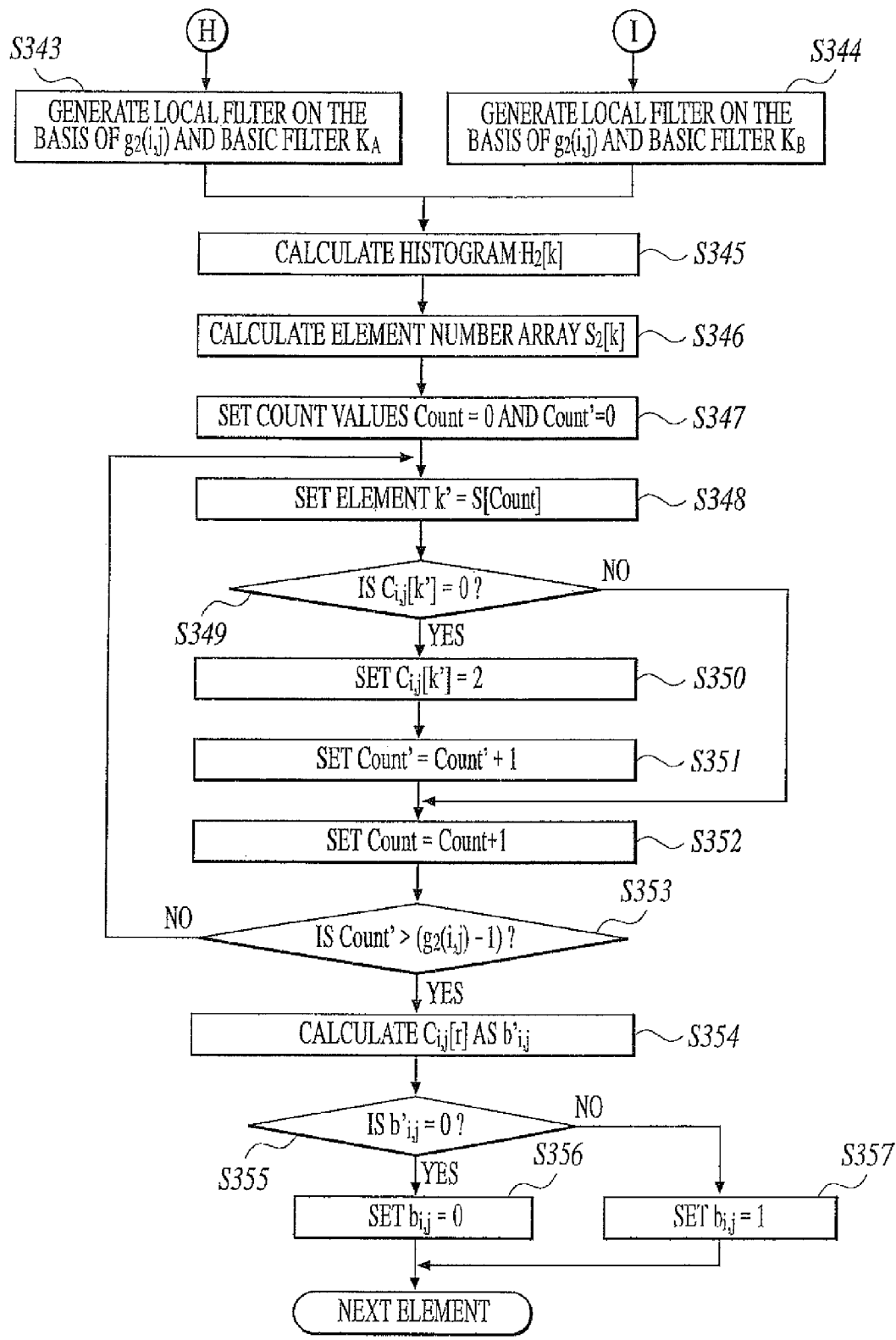

FIGS. 22A and 22B are flowcharts showing the anti-correlation digital halftoning processing over time, executed by the processor 2 of the image processing apparatus 1, in order to generate the output image data of the pixels in the coordinates other than the coordinate of the i-th row and the j-th column.

As shown in FIGS. 22A and 22B, first, the processor 2 obtains the pixel value (input pixel value) $g(i, j)$ with regard to the pixel (observed pixel) in the i-th row and the j-th column among the multi-gradation image data. Then, the processor 2 specifies the generation probability of the dots in the status 1 and the status 2, on the basis of the above pixel value. Furthers the processor 2 calculates the status 1 level value (status 1 gradation value) $g_1(i, j)$ corresponding to the dot in the status 1, and the status 2 level value (status 2 gradation value) $g_2(i, j)$ corresponding to the dot in the status 2. Incidentally, the pixel value $g(i, j)$ means the gradation value of the pixel in the 0th row and the 0th column, and is any value in the range of 0 to n (n=255) in the present embodiment. Further, hereupon the summation of the generation probability of the status 1 and the status 2 is set to be 1, and the summation of the status 1 level value $g_1(i, j)$ and the status 2 level value $g_2(i, j)$ is set to be the value of the pixel value $g(i, j)$.

In the table of FIG. 24, the correspondence between the status 1 level value $g_1$ and the status 2 level value $g_2$ is shown. This correspondence is the same as the relation between the generation probability of the status 1 and the status 2 with respect to the input pixel value, and is decided so as to optimize the output image.

After the status 1 level value $g_1(i, j)$ and the status 2 level value $g_2(i, j)$ are calculated, the processor 2 generates the local filter $P_1$ (Step S332) with respect to the status 1 of the pixel in the i-th row and the j-th column, on the basis of the status 1 level value $g_1(i, j)$ and the basic filter $K_A$ shown in FIG. 25A, among the two filters of the basic filter $K_A$ (where all of the coefficients are positive numbers) shown in FIG. 25A and the basic filter $K_B$ (where the coefficient of the pixel just left side of the observed pixel is a negative number) shown in FIG. 25B. Because the detail procedures are the same as those of the conventional Step T3, the description thereof will be omitted.

After the local filter P– is generated, the processor 2 calculates the histogram $H_1(i, j)[k]$ of the status 1 level value $g_1(i, j)$ in the i-th row and the j-th column (Step S333). Because the detail procedures are the same as those of the conventional Step T4, the description thereof will be omitted. Incidentally, in the present embodiment, "dot appearance pattern $C_{i,j}[k]$" is the sequence (dot appearance information array) composed of $C_{i,j}[0]$ to $C_{i,j}[n-1]$, each of which is 0, 1 or 2. If the dot appearance pattern $C_{i,j}[k]$ is "1" when any value of 0 to (n–1) is assigned to the element k, the dot appearance pattern $C_{i,j}[k]$ means that the dot of the status 1 is formed in the pixel in the i-th row and the j-th column. If the dot appearance pattern $C_{i,j}[k]$ is "2", it means that the dot of the status 2 is formed in the pixel in the i-th row and the j-th column. If the dot appearance pattern $C_{i,j}[k]$ is "0", it means that the dot is not formed.

Next, the processor 2 rearranges the histograms $H_1(i, j)[0]$ to $H_1(i, j)[n-1]$ of the status 1 level value $g_1(i, j)$ calculated with respect to each element k, in ascending order. Then the processor 2 calculates the element number array $S_1[k]$ which represents the order of the histogram $H_1(i, j)[k]$ (Step S334).

For example, the histograms $H_1(i, j)[0]$ to $H_1(i, j)[n-1]$ are rearranged in the order of "$H_1(i, j)[8] < H_1(i, j)[3] < H_1(i, j)[4] < H_1(i, j)[1] < H_1(i, j)[5] < \ldots < H_1(i, j)[n-1]$", the element number array $S_1[k]$ is calculated as $\{8, 3, 4, 1, 5, \ldots, (n-1)\}$ Incidentally, in the element number array $S_1[k]$, "8" is the 0th element and "3" is the 1st element.

After Step S334, the processor 2 provides "1 (status 1 dot recording)" or "0 (non-recording)" to the dot appearance pattern (dot appearance information array) $C_{i,j}[k']$, similarly to the conventional Steps T6 to T12. Then, the processor 2 decides the appearance pattern of the status 1 dot among the dot appearance pattern $C_{i,j}[k]$ (Steps S335 to S341).

After the appearance pattern of the status 1 dot is decided, next, the processor 2 decides the appearance pattern of the status 2 dot.

First, the processor 2 judges whether or not the output value $b'_{i,j-1}$ of the observed pixel processed just before the current observed pixel, that is, the pixel in the i-th row and the (j–1)-th column is "2 (that is, forming the status 2 dot)", and additionally, the coordinate (i, j–1) of the observed pixel processed just before the current observed pixel is an isolated point (Step S342).

Hereupon, when $b'_{i,j-1}$ is "2" and (i, j–1) is the isolated point, the processor 2 generates the local filter $P_2$ (Step S344) with respect to the status 2 dot of the pixel in the i-th row and the j-th column, on the basis of the status 2 level value $g_2(i, j)$ and the basic filter $K_B$ shown in FIG. 25B of the two basic filter $K_A$ shown in FIG. 25A and $K_B$ shown in FIG. 25B. In the basic filter $K_B$, the coefficient of the pixel just left side of the observed pixel is a negative number ("–64" in the present embodiment). When the local filter is generated and the dot appearance pattern is formed by using the basic filter $K_B$, the negative number effects to the pixel number defined as non-recording in the dot appearance pattern of the observed pixel processed just before the current observed pixel. Accordingly, the expectation value of the histogram becomes small value, and the pixel number of the dot recording is provided in the observed pixel processed just before the current observed pixel, in ascending order of the element number array $S_2[k]$. Thereby, the possibility that the aforementioned pixel number is provided with "2" becomes higher, and the possibility that the continuous dots are formed becomes higher. Hereupon, if the generation probability of the status 1 and the status 2 are changed, it is possible to change the rate for forming the continuous dots. Further, it is possible to specify the shape of systematic dot arrangement.

On the other hand, in at least one of the case where $b'_{i,j}$ is not "2" but "0" or "1", or the case where (i, j) is not the isolated point, the processor 2 generates the local filter $P_2$ (Step S343) with respect to the status 2 dot of the pixel in the i-th row and the j-th column, on the basis of the status 2 level value $g_2(i, j)$ and the basic filter $K_A$ shown in FIG. 25A, among the two filters of the basic filter $K_A$ shown in FIG. 25A and the basic filter $K_B$ shown in FIG. 25B.

Then, the processor 2 calculates the histogram $H_2(i, j)[k]$ based on the local filter (Step S345). The detail procedures are the same as those of the above Steps S332 and S333.

Next, the processor 2 performs the same processing as the above Step S334, and calculates the element number array $S_2[k]$ of the histogram $H_2(i, j)[k]$ calculated with respect to each of elements k (Step S346).

After the element number array $S_2[k]$ is calculated, the processor 2 sets the count value Count to 0 and sets the count value Count' to 0 (Step S347). Further, the processor 2 assigns the value of the element S[Count], the order of which corresponds to the count value Count among the element number array S[k] to the element k' of the element number array $S_2[k]$ (Step S348).

Then, the processor 2 judges whether or not "0" is set to the dot appearance pattern $C_{i,j}[k']$ of the part of the element k corresponding to the element k' (=0) (Step S349). When "0" is set to the dot appearance pattern $C_{i,j}[k']$ by the processing of the above Step S339, the processor 2 changes "0", which is set in the dot appearance pattern $C_{i,j}[k']$ of the aforementioned part, into "2" (Step S350), and adds 1 to the count value Count' 1 (Step S351).

On the other hand, when "1" is set to the dot appearance pattern $C_{i,j}[k']$ of the part of the element k corresponding to the element k' (=0) by the processing of the above Step S338, the processor 2 does not change "1", which is set in the dot appearance pattern $C_{i,j}[k']$ of the aforementioned part, and leaves it as it is.

That is, in the dot appearance pattern $C_{i,j}[k]$, the processor 2 set "2" which means the status 2 dot, while avoiding the part where "1" which means the status 1 dot is already set.

After the above processing is ended, the processor 2 adds 1 to the count value Count (Step S352). Then the processor 2 compares the relation between the count value Count' (=1) and (status 2 level value $g_2(i,j)$–1) (Step S353). The processor 2 repeatedly perform the processing from Step S348 to Step S352 until the count value Count' exceeds (status 2 level value $g_2(i, j)$–1). Thereby, the processor 2 decides the appearance pattern of the status 2 dot among the dot appearance patterns $C_{i,j}[k]$ Then when the appearance pattern of the status 2 dot is decided according to that, the dot appearance pattern $C_{i,j}[k]$ is decided.

Incidentally, in order to decide the appearance pattern of the status 2 dot, the processor 2 should repeatedly perform the processing from Step S348 to Step S352 until the count value Count' exceeds (status 2 level value $g_2(i, j)-1$), and it is not necessary to repeat the processing until the element number k is (n−1) as the processing for the status 1 dot. This is because the part where "2" is not set to the dot appearance pattern $C_{i,j}[k]$ is set to "1" or "0" in the above processing for the status 1 dot. Thereby, there is the advantage that it is not necessary to perform excessive processing.

After the dot appearance pattern $C_{i,j}[k]$ is decided, the processor 2 calculates $C_{i,j}[r]$, the index of which is the random variable determined in the above Step S301, as the output value $b'_{i,j}$ of the pixel in the i-th row and the j-th column, among the dot appearance patterns $C_{i,j}[k]$ (Step S354).

Then, the processor 2 judges whether the output value $b'_{i,j}$ is "0" (Step S355). When the value $b'_{i,j}$ is "0", the output $b_{i,j}$ is "0", that is, non-recording (white) is decided. When the value $b'_{i,j}$ is "1" or "2", the output $b_{i,j}$ is "1", that is, recording black is decided (Step S357).

After that, the same processing is performed to the next pixel. Finally, the above processing is performed to all the pixels, and accordingly, the output image data is calculated. Thereby, when one pixel is focused, the dot appearance frequency is proportional to the pixel value $g_{i,j}$ thereof. Further, when a plurality of pixels adjacent each other are focused, the dot in each of pixels appears so as to maximize the anti-correlation with the neighboring pixels substantially. Therefore, the dispersibility of the dots formed on a recording medium while an image recording is improved.

Further, it is possible to specify the generation probability of the status 1 and the status 2, and to control the amount of the generation of the different dot arrangements, in the highlight part of the image. Thereby, it is possible to improve the dispersibility of the status 1 and the status 2 in the halftoning processing where the anti-correlation digital halftoning is used. Moreover, it is possible to generate the specified dot arrangement by setting the coefficient of the local filter to be negative number.

Examples of the output images based on the above image processing method are shown in FIGS. 26A to 26E. FIGS. 26A to 26E show five results of the processing with respect to the patches where the pixel value is 32 and the generation probability of the status 1 and the status 2 are different respectively.

Figure 26A:
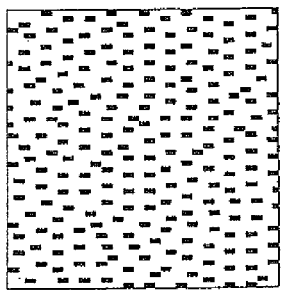
FIGS. 26A to 26E are drawings showing output images of results of an anti-correlation digital halftoning processing with respect to a patch of which pixel value is 32.
Figure 26B:
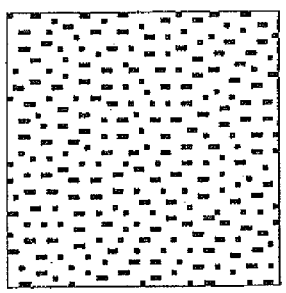
Figure 26C:
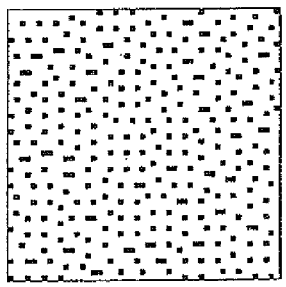
Figure 26D:
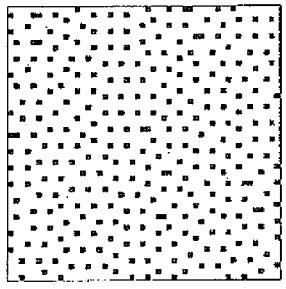
Figure 26E:
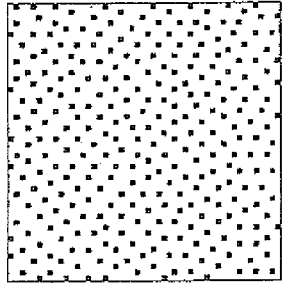

That is, in FIG. 26A, the generation probability of the status 1 is 0% and that of the status 2 is 100% Then, the generation probability of the status 1 is increased and that of the status 2 is decreased, in order of FIGS. 26B, 26C, and 26D. In FIG. 26E, the generation probability of the status 1 is 100% and that of the status 2 is 0%.

Further, as described above, as the generation probability of the status 1 becomes higher and that of the status 2 becomes lower as in the order of FIGS. 26A, 26B, 26C, 26D, and 26E, the isolated dots in the image are increased. That is, by the present invention, it is proved that the systematic dot arrangement in the output image can be controlled.

According to the image processing apparatus of the present invention, in the dot arrangement in the processing for quantizing the multi-gradation image data to convert it into pseudo halftone output image data, the shape of the systematic dot arrangement is specified in the highlight part of the multi-gradation image data. Therefore, it is possible to obtain the resolution faithful to the original image. At the same time, it is possible to generate the specified systematic dot arrangement to improve the dispersibility between the different dot arrangements, and obtain the stable effect of the processing having less dependence on the image.

Further, in the present embodiment, the shape of the systematic dot arrangement is specified by specifying the generation probability of the dot arrangement in the highlight part of the multi-gradation image data. Therefore, it is possible to obtain the resolution faithful to the original image, certainly. At the same time, it is possible to generate the specified systematic dot arrangement to improve the dispersibility between the different dot arrangements, and obtain the stable effect of the processing having less dependence on the image, certainly.

Moreover, in the present embodiment, the value representing the different dot arrangement is set in the same dot appearance information array, after the local filter is decided for every value corresponding to the generation probability of the different dot arrangement to calculate the element number array according to the local filter, in the observed pixel of the multi-gradation image data. Therefore, it is possible to obtain the resolution faithful to the original image, more certainly. At the same time, it is possible to generate the specified systematic dot arrangement to improve the dispersibility between the different dot arrangements, and obtain the stable effect of the processing having less dependence on the image, more certainly.

Furthermore, in the present embodiment, the value representing the dot arrangement is set while avoiding the element number where the value representing other dot arrangement is set. Therefore, it is possible to obtain the resolution faithful to the original image, further certainly. At the same time, it is possible to generate the specified systematic dot arrangement to improve the dispersibility between the different dot arrangements, and obtain the stable effect of the processing having less dependence on the image, further certainly.

Further, in the present embodiment, the output status of the observed pixel is judged according to the status of the pixel which is already processed and the specified dot arrangement. Therefore, it is possible to obtain the resolution faithful to the original image, furthermore certainly. At the same time, it is possible to generate the specified systematic dot arrangement to improve the dispersibility between the different dot arrangements, and obtain the stable effect of the processing having less dependence on the image, furthermore certainly.

Moreover, in the present embodiment, the shape of the dot arrangement is specified by setting a coefficient, which is close to the observed pixel in a dot continuous generation direction in the local filter, to be a negative number, with respect to the pixel needed to be generated continuously. Therefore, it is possible to obtain the resolution faithful to the original image, much further certainly. At the same time, it is possible to generate the specified systematic dot arrangement to improve the dispersibility between the different dot arrangements, and obtain the stable effect of the processing having less dependence on the image, much further certainly.

Incidentally, the present invention is not limited to each of the embodiments, and may be modified or changed design diversely without departing from the essence thereof.

For example, in the present embodiment, after the dot of the status 1 is decided, the dot of the status 2 is decided. However, not limited to that, corresponding to the diversity of the processing, for example, after the dot of the status 2 is decided, the dot of the status 1 may be decided.

Further, in the present embodiment, the two kinds of dot generation status such as the status 1 and the status 2 are defined. However, not limited to that, corresponding to the diversity of the dot arrangements, for example, another dot generation status such as the generation status of three or more continuous dots may be defined. Moreover, the dot continuous direction is not limited to the horizontal direction, and may be the vertical direction or the oblique direction.

Further, in the present embodiment, the input image is the monochrome image comprising the 8-bit grayscale. However, not limited to that, corresponding to the diversity of the images, it is possible to use other input image of which gradation, resolution, color (monochrome or color) or the like are appropriate.

Moreover, in the present embodiment, the output image is the black-and-white output image to which the bilevel halftoning is performed. However, not limited to that, it is possible to use the output image comprising three or more output values including the color image.

Eighth Embodiment

Hereinafter, the eighth embodiment of the present invention will be described with reference to the drawings.

Incidentally, the eighth embodiment is given to accomplish particularly the fourth object.

Further, the same note is provided to the same component as one of the above first embodiment.

First, the configuration of an image processing apparatus 1 related to the present invention will be explained.

FIG. 1 is a block diagram showing a schematic configuration of the image processing apparatus 1 related to the present embodiment. As shown in FIG. 1, the image processing apparatus 1 comprises a processor 2 for quantizing input multi-gradation image (original image) data to covert into a pseudo halftone output image data, and outputting the output image data. Incidentally, the image processing apparatus 1 can be mounted in a known output apparatus such as an inkjet printer or the like. Further, in the present embodiment, the multi-gradation image data will be explained as data with regard to a CM color image of which each pixel value comprises 8-bit grayscale. Further, in the present embodiment, the 8-bit (256-gradation) multi-gradation image is quantized to three levels (values) of white (non-recording), cyan (cyan dot recording) and magenta (magenta dot recording), with respect to one pixel.

The processor (computer) 2 comprises a ROM (Read Only Memory) 3 connected each other, a RAM (Random Access Memory) 4 and a CPU (Central Processing Unit) 5.

The ROM 3 stores an image processing program related to the present invention. The image processing program is for making the processor 2 execute the anti-correlation digital halftoning processing to the multi-gradation image data.

The RAM 4 includes work area for the CPU 5.

The CPU 5 develops the image processing program stored in the ROM 3 to the work area in the RAM 4, and generates an output image from the multi-gradation image data.

Next, the image processing method related to the present invention will be described with reference to FIG. 27. Incidentally, in the following explanation, the image processing apparatus 1 executes the processing with switching the observed pixel in the direction from left to right. However, the processing direction after changing a row including a predetermined number of pixels, may be the also direction from left to right, may be the direction from right to left contrary, or may be selected at random between the left direction and the right direction. Preferably, the image processing apparatus 1 reverses the processing direction for every row or a plurality of rows so as to execute the processing in the snaking order as a whole.

Figure 27:
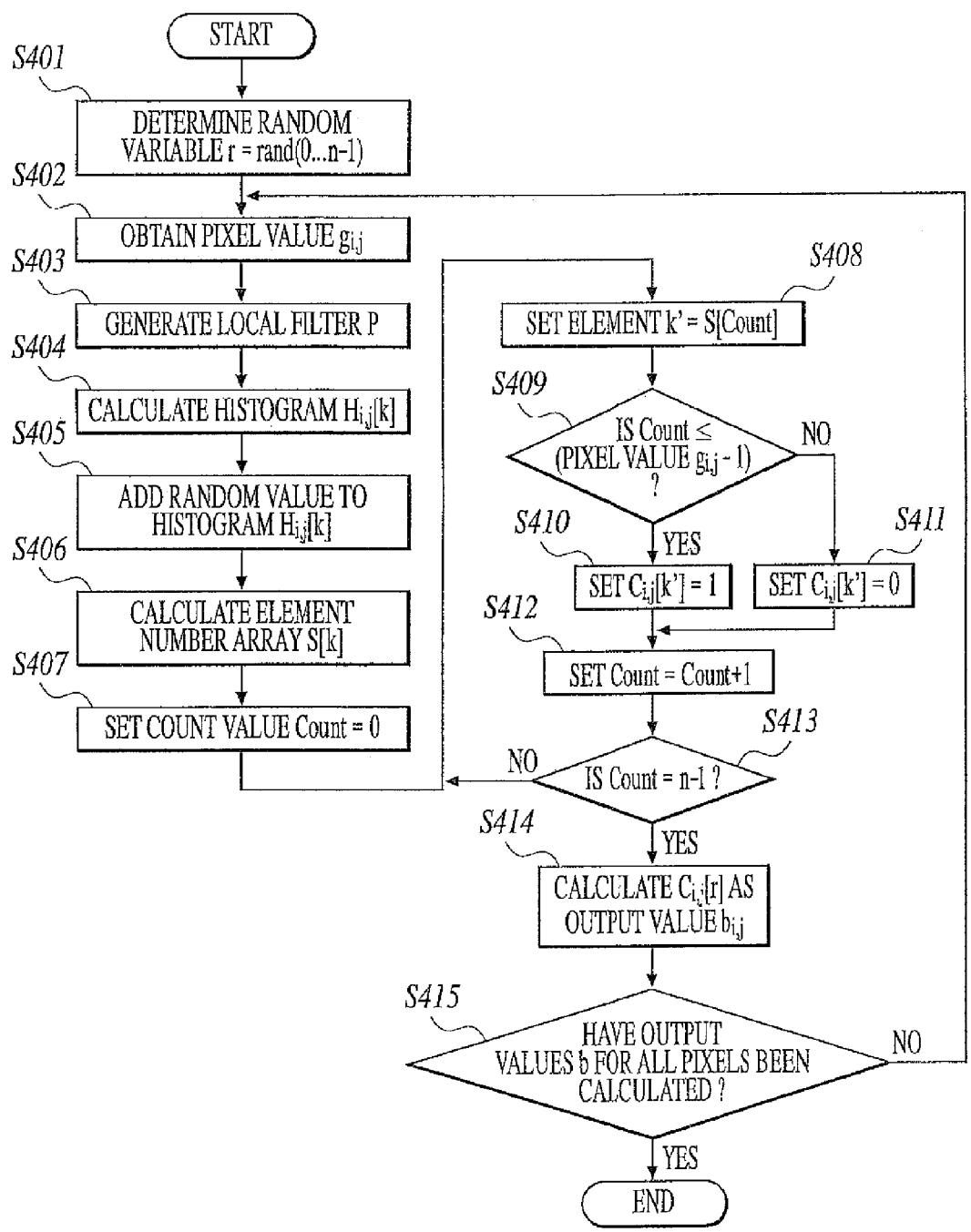
FIG. 27 is a flowchart showing an anti-correlation digital halftoning processing over time, executed by a processor of an image processing apparatus, in an eighth embodiment.
Figure 30:
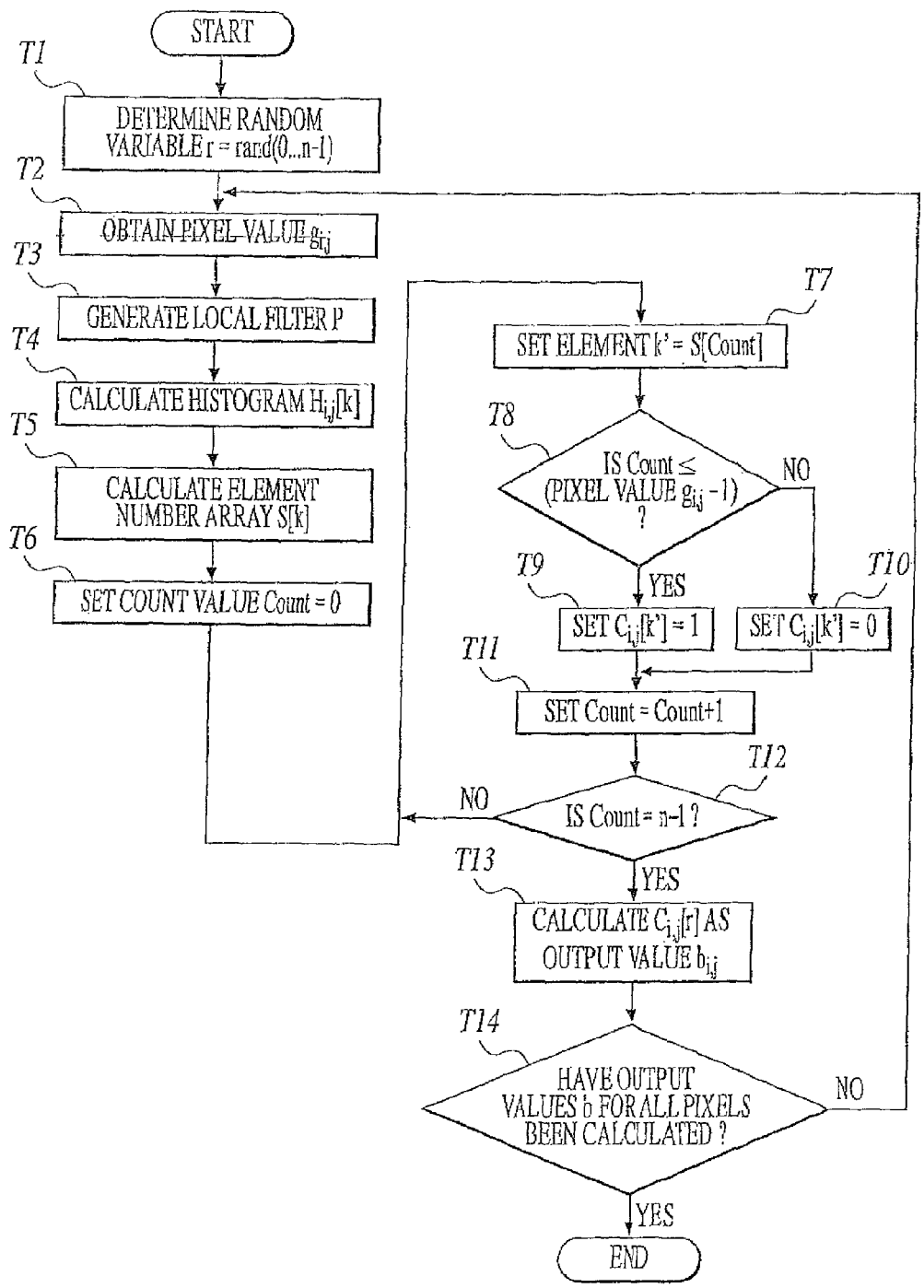
FIG. 30 is a flowchart showing an image processing by a conventional anti-correlation digital halftoning method over time.

FIG. 27 is a flowchart showing the anti-correlation digital halftoning processing executed which the processor 2 of the image processing apparatus 1 executes on the basis of the image processing program in order to generate the output image data of any one color of cyan and magenta (the first color output image data).

As shown in FIG. 27, before the multi-gradation image data is input, the processor 2 previously determines a random valuable r (Step S401), similarly to the conventional Step T1.

After the multi-gradation image data is input, the processor 2 obtains a pixel value $g_{i,j}$ with regard to the pixel (observed pixel) in the i-th row and the j-th column among the multi-gradation image data (Step S402). Then, the processor 2 generates a local filter P of the pixel in the i-th row and the j-th column on the basis of the pixel value $g_{i,j}$ (Step S403), similarly to the conventional Step T3.

After the local filter P is generated, the processor 2 calculates a histogram $H_{i,j}[k]$ of the pixel in the i-th row and the j-th column (Step S404), similarly to the conventional Step T4.

Next, the processor 2 rearranges the histograms $H_{i,j}[0]$ to $H_{i,j}[n-1]$ calculated for each element k in ascending order, and calculates an element number array S[k] representing the order of the histogram $H_{i,j}[k]$ (Step S405).

For example, the histograms $H_{i,j}[0]$ to $H_{i,j}[n-1]$ are rearranged in the order of "$H_{i,j}[8]<H_{i,j}[3]<H_{i,j}[4]<H_{i,j}[1]<H_{i,j}[5]<\ldots<H_{i,j}[n-1]$", the element number array S[k] is calculated as $\{8, 3, 4, 1, 5, \ldots, (n-1)\}$. Incidentally, in the element number array S[k], "8" is the 0th element and "3" is the 1st element.

After Step S405, the processor 2 decides a dot appearance pattern (dot appearance information array) $C_{i,j}[k]$, and calculates output values b with respect to all elements, that is, the output image data (Steps S406 to S414), similarly to the conventional Steps T6 to T14. Thereby, when one pixel is focused, dot appearance frequency is proportional to the pixel value $g_{i,j}$ thereof. Further, when a plurality of pixels adjacent each other are focused, the dot in each of pixels appears so as to maximize the anti-correlation with the neighboring pixels substantially. Therefore, the dispersibility of the dots formed on a recording medium while an image recording is improved.

If it is judged that the first color output image data is calculated, the processor 2 executes the anti-correlation digital halftoning processing to generate the other color output image data (second color output image data), similarly to the case of the first color output image data.

Hereinafter, the method where the dots of two colors are arranged on the dot appearance pattern will be explained with the concrete example.

Hereupon, an input image is a CM color image. Further, the input image is quantized to two levels. That is, with respect to one pixel, any of white (non-recording), C (cyan dot recording), M (magenta dot recording), or B (blue dot recording) generated when the C dot and the M dot are overlapped each other, is output after the halftoning.

First, an explanation will be given to the following case; that is, the case where the dot of which occupancy rate per unit area is low (low occupancy rate dot) is arranged after the dot of which occupancy rate per unit area is high (high occupancy rate dot) is arranged to the dot appearance information array (dot appearance pattern), when there are two or more dots of which occupancy rates per unit area are different from each other and the summation of the occupancy rates is not more than 100% in the input gradation signal (multi-gradation image data), in using the anti-correlation digital halftoning method.

As an example, in the observed pixels $g_1$ and $g_2$ shown in FIG. 28A, each of dots is represented by "C" or "M" according to the difference thereof, the occupancy rate per unit area of the C dot is 80%, the occupancy rate per unit area of the M dot is 10%, and the element number to be used when the output image is output is 0.

When the output of $g_1$ is 0, the element number 0 of $g_1$ is non-recording. Accordingly, the whole arrangement of the element number array can be assumed as FIG. 28B. That is, the non-recording is set on the element number 0 side (left side) with the 10% occupancy rate, the C dots are arranged next to the non-recording with the 80% occupancy rate, and the M dots are arranged next to the C dots with the 10% occupancy rate.

Next, when the arrangement of $g_2$ is decided, the occupancy rates per unit area of the C dot and the M dot are compared each other. In this example, because the occupancy rate of the C dot is higher, the arrangement of the C dot is performed first. Then, when the arrangement of the C dot is performed, there is a high possibility that the C dots are arranged in the element numbers of the non-recording of $g_1$ by the anti-correlation digital halftoning. Therefore, the arrangement is given as FIG. 28C. That is, the C dots of the 10% occupancy rate part among the 80% occupancy rate are arranged in the 10% occupancy rate part on the element number 0 side (that is, the left side) where the arrangement of $g_1$ is set as non-recording. Then, the C dots of another 10% occupancy rate part among the remaining 70% occupancy rate are arranged in the element numbers other than those where the C dots have been arranged for the arrangement of $g_1$ as much as possible. Therefore the C dots of another 10% occupancy rate part among the remaining 70% occupancy rate are arranged in the 10% occupancy rate part on the right side where the element numbers are large and the M dots have been arranged for the arrangement of $g_1$. Then, the C dots of the further remaining 60% occupancy rate part are arranged in the element numbers where the C dots have been arranged for the arrangement of $g_1$. After that, the M dots are arranged in the 10% occupancy rate part among the vacant part (that is, the 20% occupancy rate part where the C dots have been arranged for the arrangement of $g_1$). Accordingly, the other 10% occupancy rate part is set as non-recording. Thereby, the output of $g_2$ is decided as C.

Hereupon, the occupancy rate per unit area of the C dots is as high as 80% and the probability of appearance of the M dots and the non-recording are low. Therefore, there is highly probability of the dot appearance as follows: that is, only the C dots appear for a while; then, after only the C dots appear for a while, the M dot appears; furthermore, after only the C dots appear for a while again, the non-recording appears. Seen on a screen, the M dots and the non-recording appear dispersively on the background of C dots as shown in FIG. 28D.

That is, it is possible that the continuous appearance of the non-recording and the low occupancy rate dot is prevented, when there are two or more dots of which occupancy rates per unit area are different from each other and the summation of the occupancy rates is not more than 100% in the input gradation signal (multi-gradation image data), in using the anti-correlation digital halftoning method.

Next, an explanation will be given to the following case; that is, the case where the dot of which occupancy rate per unit area is high (high occupancy rate dot) is arranged after the dot of which occupancy rate per unit area is low (low occupancy rate dot) is arranged to the dot appearance information array (dot appearance pattern), when there are two or more dots of which occupancy rates per unit area are different from each other and the summation of the occupancy rates is more than 100% in the input gradation signal (multi-gradation image data), in using the anti-correlation digital halftoning method.

As an example, in the observed pixels $g_1$ and $g_2$ shown in FIG. 29A, each of dots is represented by "C" or "M" according to the difference thereof, the occupancy rate per unit area of the C dot is 10%, the occupancy rate per unit area of the M dot is 95%, and the element number to be used when the output image is output is 0.

When the output of $g_1$ is B (blue dot recording), that is, the C dot and the M dot are overlapped each other, the element number 0 of $g_1$ is B. Accordingly, the whole arrangement of the element number array can be assumed as FIG. 29B. That is, the M dots are arranged on the element number 0 side (left side) with the 90% occupancy rate, the C dots of the 5% occupancy rate part among the 10% occupancy rate are arranged in the vacant part next to the M dots, and the other C dots of the 5% occupancy rate part are arranged on the element number 0 side (left side) while being overlapped with the M dots. Accordingly, as a result, in the 5% occupancy rate of the element number 0 side (left side), the B dots resulted from the overlapping of the C dots and the M dots are arranged.

Next, when the arrangement of $g_2$ is decided, the occupancy rates per unit area of the C dot and the M dot are compared each other. In this example, because the occupancy rate of the C dot is lower, the arrangement of the C dot is performed first. Then, when the arrangement of the C dot is performed, there is a high possibility that the C dots are arranged in the element numbers other than those where the B dots resulted from the overlapping of the C dots and the M dots are arranged by the anti-correlation digital halftoning. Therefore, the arrangement is given as FIG. 29C. That is, the C dots are applied in the 10% occupancy rate part next to the 5% occupancy rate part on the element number 0 side where the B dots have been arranged for the arrangement of $g_1$. Then, the M dots are arranged in the element numbers other than those where the C dots have been arranged as much as possible. Therefore the M dots are arranged in the 5% occupancy rate part on the element number 0 side and the 90% occupancy rate part on the right side of which element number is large. As a result, the B dots are arranged in the 5% occupancy rate part where the M dots and C dots are overlapped each other. Thereby, the output of $g_2$ is decided as M.

Hereupon, the occupancy rate per unit area of the M dots is as high as 95% and the probability of appearance of the C dots and the B dots are low. Therefore, there is highly probability of the dot appearance as follows: that is, only the M dots appear for a while; then, after only the M dots appear for a while, the C dot appears; furthermore, after only the M dots appear for a while again, the B dot appears. Seen on a screen, the M dots and the non-recording appear dispersively on the background of M dots as shown in FIG. 29D.

That is, it is possible that the continuous appearance of the overlapped dot and the low occupancy rate dot is prevented, when there are two or more dots of which occupancy rates per unit area are different from each other and the summation of the occupancy rates is more than 100% in the input gradation signal (multi-gradation image data), in using the anti-correlation digital halftoning method.

Incidentally, when there are two or more dots of which occupancy rates per unit area are the same as each other in the input gradation signal (multi-gradation image data) in using the anti-correlation digital halftoning method, the order of the arrangement of the dots to the dot appearance information array (dot appearance pattern) may be decided by an appropriate method.

For example, when each of different dots is respectively represented by C and M, the case where each of the occupancy rates per unit area of the C dots and the M dots is 40%, or the case where each of the occupancy rates per unit area of the C dots and the M dots is 60%, can be cited. In these case, the order of the arrangement may be decided by an appropriate method such as the method for deciding at random by using random valuables, the method for previously preparing arrangement patterns to apply the patterns in order, or the like.

By doing as above, the diversity of the processing can be managed.

As above, according to the image processing apparatus and the image processing, in the image processing for quantizing the multi-gradation image data to convert it into pseudo halftone output image data, the arrangement of the dot of which the occupancy rate per unit area is low is performed, after performing the arrangement of the dot of which the occupancy rate per unit area is high is performed, in the case where there are two or more kinds of the dots of which the occupancy rates per unit area are different from each other and the summation of the occupancy rates of dots is not more than 100%, in the multi-gradation image data, and the arrangement of the dot of which the occupancy rate per unit area is high is performed, after performing the arrangement of the dot of which the occupancy rate per unit area is low is performed, in a case that there are two or more kinds of dots of which the occupancy rates per unit area are different from each other and the summation of the occupancy rates of dots is more than 100%, in the multi-gradation image data. Accordingly, it is possible to obtain the favorable dot dispersibility, regardless of the occupancy rate per unit area of each of dots. Thereby, it is possible to perform the favorable image processing.

Incidentally, the present invention is not limited to each of the above embodiments, and may be modified or changed design diversely without departing from the essence thereof.

For example, in the present embodiment, the present invention is applied to the dots of the different colors. However, not limited to that, corresponding to the diversity of the processing, for example, the present invention may be applied to the grayscale dots of the same color.

Further, in the present embodiment, the input image is the color image comprising only color of C and M. However, not limited to that, it is possible to use other input image of which gradation, resolution, color (monochrome or color) or the like are appropriate.

Further, in the present embodiment, the output image comprises two kinds of dots of C and M. However, not limited to that, it is possible to apply the present embodiment to the output image comprising three or more various output values, corresponding to the diversity of the ink.

Japanese Patent Application No. 2003-200460 filed on Jul. 23, 2003, Japanese Patent Application No. 2003-292120 filed Aug. 12, 2003, Japanese Patent Application No. 2003-304549 filed on Aug. 28, 2008 and Japanese Patent Application No. 2003-379682 filed on Nov. 10, 2004 including specification, claims, drawings and summary are incorporated herein by reference in its entirety.

What is claimed is:

1. An image processing apparatus comprising a processor for quantizing multi-gradation image data with regard to each of a plurality of colors different from each other by an anti-correlation digital halftoning method to convert the multi-gradation image data into pseudo halftone output image data, wherein the processor is configured to perform:

first processing for setting a dot appearance information array for each pixel of the multi-gradation image data with regard to a first color of the plurality of colors;

second processing for setting a dot appearance information array for each pixel of the multi-gradation image data with regard to a second color other than the first color of the plurality of colors, after setting the dot appearance information array of the first color; and quantization based on the dot appearance information array of the first color and the dot appearance information array of the second color, each of the dot appearance information array of the first color and the dot appearance information array of the second color including elements identified by element numbers, the number of the elements of an observed pixel of the multi-gradation image data being substantially proportional to the number of gradations of each relevant color of the multi-gradation image data, each of the elements representing presence or absence of a dot, wherein when setting the dot appearance information array with respect to an observed pixel in the first processing, the processor calculates a first expectation value of a dot appearance in a neighboring pixel of the observed pixel by using the already set dot appearance information array of the first color with respect to the neighboring pixel of the observed pixel for each of the element numbers in the already set dot appearance information array of the first color, then arranges the element numbers in ascending order of first expectation value, and sets the dot appearance information array of the first color with respect to the observed pixel so that a value indicating presence of a dot is set for one or more of the elements whose first expectation values are smaller than those of the rest of the elements of the arranged element numbers, the number of the one or more of the elements corresponding to a number related to a pixel value of the first color of the observed pixel, while a value indicating absence of a dot is set for the rest of the elements of the arranged element numbers, when setting the dot appearance information array with respect to an observed pixel in the second processing, the processor calculates a second expectation value of a dot appearance in a neighboring pixel of the observed pixel by using the already set dot appearance information array of the first color and the already set dot appearance information array of the second color with respect to the neighboring pixel of the observed pixel for each of the element numbers in the already set dot appearance information array of the first color and the already set dot appearance information array of the second color, then arranges the element numbers in ascending order of second expectation value, and then sets the dot appearance information array of the second color with respect to the observed pixel so that a value indicating presence of a dot is set for one or more of the elements whose second expectation values are smaller than those of the rest of the elements of the arranged element numbers, the number of the one or more of the elements corresponding to a number related to a pixel value of the second color of the observed pixel, while a value indicating absence of a dot is set for the rest of the elements of the arranged element numbers.

2. The image processing apparatus of claim 1, wherein in the second processing, the processor calculates an appearance expectation value of a dot appearance in the neighboring pixel of the observed pixel by using the already set dot appearance information array of the second color with respect to the neighboring pixel of the observed pixel for each of the element numbers in the already set dot appearance information array of the second color, then calculates the second expectation value by adding the value set for each of the elements in the dot appearance information array of the first color set in the first processing with respect to the observed pixel or with respect to the observed pixel and the neighboring pixel thereof, to each appearance expectation value calculated for each of the elements, with a predetermined weight.

3. The image processing apparatus of claim 1 wherein after the second processing, the processor further performs third processing for setting a dot appearance information array for each pixel of the multi-gradation image data with regard to a third color other than the first and second colors of the plurality of colors, the dot appearance information array of the third color including elements identified by element numbers, the number of the elements of an observed pixel of the multi-gradation image data being substantially proportional to the number of gradations of the third color of the multi-gradation image data, each of the elements representing presence or absence of a dot, wherein the processor performs the quantization based on the dot appearance information array of the first color, the dot appearance information array of the second color, and the dot appearance information array of the third color, in the third processing, the processor calculates an appearance expectation value of a dot appearance in a neighboring pixel of an observed pixel by using the already set dot appearance information array of the third color with respect to the neighboring pixel of the observed pixel for each of the element numbers in the already set dot appearance information array of the third color, then calculates a third expectation value of a dot appearance in the neighboring pixel of the observed pixel for each of the element numbers by adding the value set for each of the elements in the dot appearance information array of the first color set in the first processing with respect to the observed pixel or with respect to the observed pixel and the neighboring pixel thereof, and the value set for each of the elements in the dot appearance information array of the second color set in the second processing with respect to the observed pixel or with respect to the observed pixel and the neighboring pixel thereof, to each appearance expectation value calculated for each of the elements, with predetermined weights, respectively, then arranges the element numbers in ascending order of third expectation value, and then sets the dot appearance information array of the third color with respect to the observed pixel so that a value indicating presence of a dot is set for one or more of the elements whose third expectation values are smaller than those of the rest of the elements of the arranged element numbers, the number of the one or more of the elements corresponding to a number related to a pixel value of the third color of the observed pixel, while a value indicating absence of a dot is set for the rest of the elements of the arranged element numbers.

4. The image processing apparatus of claim 1, wherein brightness of the first color is lower than that of the second color.

5. The image processing apparatus of claim 1, wherein the first color is blue, and the second color is red or green.

6. The image processing apparatus of claim 1, wherein the first color is black, and the second color is magenta or cyan.

7. An image processing method of quantizing multi-gradation image data with regard to each of a plurality of colors different from each other by an anti-correlation digital halftoning method to convert the multi-gradation image data into pseudo halftone output image data, the method comprising:

performing first processing for setting a dot appearance information array for each pixel of the multi-gradation image data with regard to a first color of the plurality of colors;

performing second processing for setting a dot appearance information array for each pixel of the multi-gradation image data with regard to a second color other than the first color of the plurality of colors, after setting the dot appearance information array of the first color; and performing quantization based on the dot appearance information array of the first color and the dot appearance information array of the second color, each of the dot appearance information array of the first color and the dot appearance information array of the second color including elements identified by element numbers, the number of the elements of an observed pixel of the multi-gradation image data being substantially proportional to the number of gradations of each relevant color of the multi-gradation image data, each of the elements representing presence or absence of a dot, wherein when setting the dot appearance information array with respect to an observed pixel in the first processing, a first expectation value of a dot appearance in a neighboring pixel of the observed pixel is calculated by using the already set dot appearance information array of the first color with respect to the neighboring pixel of the observed pixel for each of the element numbers in the already set dot appearance information array of the first color, then the element numbers are arranged in ascending order of first expectation value, and the dot appearance information array of the first color with respect to the observed pixel is set so that a value indicating presence of a dot is set for one or more of the elements whose first expectation values are smaller than those of the rest of the elements of the arranged element numbers, the number of the one or more of the elements corresponding to a number related to a pixel value of the first color of the observed pixel, while a value indicating absence of a dot is set for the rest of the elements of the arranged element numbers, when setting the dot appearance information array with respect to an observed pixel in the second processing, a second expectation value of a dot appearance in a neighboring pixel of the observed pixel is calculated by using the already set dot appearance information array of the first color and the already set dot appearance information array of the second color with respect to the neighboring pixel of the observed pixel for each of the element numbers in the already set dot appearance information array of the first color and the already set dot appearance information array of the second color, then the element numbers are arranged in ascending order of second expectation value, and then the dot appearance information array of the second color with respect to the observed pixel is set so that a value indicating presence of a dot is set for one or more of the elements whose second expectation values are smaller than those of the rest of the elements of the arranged element numbers, the number of the one or more of the elements corresponding to a number related to a pixel value of the second color of the observed pixel, while a value indicating absence of a dot is set for the rest of the elements of the arranged element numbers.

8. The image processing method of claim 7, wherein in the second processing, an appearance expectation value of a dot appearance in the neighboring pixel of the observed pixel is calculated by using the already set dot appearance information array of the second color with respect to the neighboring pixel of the observed pixel for each of the element numbers in the already set dot appearance information array of the second color, then the second expectation value is calculated by adding the value set for each of the elements in the dot appearance information array of the first color set in the first processing with respect to the observed pixel or with respect to the observed pixel and the neighboring pixel thereof, to each appearance expectation value calculated for each of the elements, with a predetermined weight.

9. The image processing method of claim 7, further comprising performing third processing for setting a dot appearance information array for each pixel of the multi-gradation image data with regard to a third color other than the first and second colors of the plurality of colors, after the second processing, the dot appearance information array of the third color including elements identified by element numbers, the number of the elements of an observed pixel of the multi-gradation image data being substantially proportional to the number of gradations of the third color of the multi-gradation image data, each of the elements representing presence or absence of a dot,
wherein the quantization is performed based on the dot appearance information array of the first color, the dot appearance information array of the second color, and the dot appearance information array of the third color,
in the third processing, an appearance expectation value of a dot appearance in a neighboring pixel of an observed pixel is calculated by using the already set dot appearance information array of the third color with respect to the neighboring pixel of the observed pixel for each of the element numbers in the already set dot appearance information array of the third color, then a third expectation value of a dot appearance in the neighboring pixel of the observed pixel is calculated for each of the element numbers by adding the value set for each of the elements in the dot appearance information array of the first color set in the first processing with respect to the observed pixel or with respect to the observed pixel and the neighboring pixel thereof, and the value set for each of the elements in the dot appearance information array of the second color set in the second processing with respect to the observed pixel or with respect to the observed pixel and the neighboring pixel thereof, to each appearance expectation value calculated for each of the elements, with predetermined weights, respectively, then the element numbers are arranged in ascending order of third expectation value, and then the dot appearance information array of the third color with respect to the observed pixel is set so that a value indicating presence of a dot is set for one or more of the elements whose third expectation values are smaller than those of the rest of the elements of the arranged element numbers, the number of the one or more of the elements corresponding to a number related to a pixel value of the third color of the observed pixel, while a value indicating absence of a dot is set for the rest of the elements of the arranged element numbers.

10. The image processing method of claim 7, wherein in the first processing, a color whose brightness is lower than that of the second color is selected as the first color.

11. The image processing method of claim 7, wherein blue is selected as the first color, and red or green is selected as the second color.

12. The image processing method of claim 7, wherein black is selected as the first color, and magenta or cyan is selected as the second color.

13. An image processing apparatus comprising a processor for resolving multi-gradation black-and-white image data into multi-gradation image data having a plurality of densities different from each other and for quantizing the multi-gradation image data by an anti-correlation digital halftoning method to convert the multi-gradation image data into pseudo halftone output image data,
wherein the processor is configured to perform:
first processing for setting a dot appearance information array for each pixel of the multi-gradation image data with regard to a first density of the plurality of densities;
second processing for setting a dot appearance information array for each pixel of the multi-gradation image data with regard to a second density other than the first density of the plurality of densities, after setting the dot appearance information array of the first density; and
quantization based on the dot appearance information array of the first density and the dot appearance information array of the second density,
each of the dot appearance information array of the first density and the dot appearance information array of the second density including elements identified by element numbers, the number of the elements of an observed pixel of the multi-gradation image data being substantially proportional to the number of gradations of each relevant density of the resolved multi-gradation black-and-white image data, each of the elements representing presence or absence of a dot,
wherein when setting the dot appearance information array with respect to an observed pixel in the first processing,
the processor calculates a first expectation value of a dot appearance in a neighboring pixel of the observed pixel by using the already set dot appearance information array of the first density with respect to the neighboring pixel of the observed pixel for each of the element numbers in the already set dot appearance information array of the first density, then arranges the element numbers in ascending order of first expectation value, and sets the dot appearance information array of the first density with respect to the observed pixel so that a value indicating presence of a dot is set for one or more of the elements whose first expectation values are smaller than those of the rest of the elements of the arranged element numbers, the number of the one or more of the elements corresponding to a number related to a pixel value of the observed pixel, while a value indicating absence of a dot is set for the rest of the elements of the arranged element numbers,
when setting the dot appearance information array with respect to an observed pixel in the second processing,
the processor calculates a second expectation value of a dot appearance in a neighboring pixel of the observed pixel by using the already set dot appearance information array of the first density and the already set dot appearance information array of the second density with respect to the neighboring pixel of the observed pixel for each of the element numbers in the already set dot appearance information array of the first density and the already set dot appearance information array of the second density, then arranges the element numbers in ascending order of second expectation value, and then sets the dot appearance information array of the second density with respect to the observed pixel so that a value indicating presence of a dot is set for one or more of the elements whose second expectation values are smaller than those of the rest of the elements of the arranged element numbers, the number of the one or more of the elements corresponding to a number related to a pixel value of the observed pixel, while a value indicating absence of a dot is set for the rest of the elements of the arranged element numbers.

14. The image processing apparatus of claim 13, wherein in the second processing, the processor calculates an appearance expectation value of a dot appearance in the neighboring pixel of the observed pixel by using the already set dot appearance information array of the second density with respect to the neighboring pixel of the observed pixel for each of the element numbers in the already set dot appearance information array of the second density, then calculates the second expectation value by adding the value set for each of the elements in the dot appearance information array of the first density in the first processing with respect to the observed pixel or with respect to the observed pixel and the neighboring pixel thereof, to each appearance expectation value calculated for each of the elements, with a predetermined weight.

15. The image processing apparatus of claim 13, wherein after the second processing, the processor further performs third processing for setting a dot appearance information array for each pixel of the multi-gradation image data with regard to a third density other than the first and second densities of the plurality of densities, the dot appearance information array of the third density including elements identified by element numbers, the number of the elements of an observed pixel of the multi-gradation image data being substantially proportional to the number of gradations of the third density of the resolved multi-gradation black-and-white image data, each of the elements representing presence or absence of a dot, wherein the processor performs the quantization based on the dot appearance information array of the first density, the dot appearance information array of the second density, and the dot appearance information array of the third density, in the third processing, the processor calculates an appearance expectation value of a dot appearance in a neighboring pixel of an observed pixel by using the already set dot appearance information array of the third density with respect to the neighboring pixel of the observed pixel for each of the element numbers in the already set dot appearance information array of the third density, then calculates a third expectation value of a dot appearance in the neighboring pixel of the observed pixel for each of the element numbers by adding the value set for each of the elements in the dot appearance information array of the first density in the first processing with respect to the observed pixel or with respect to the observed pixel and the neighboring pixel thereof, and the value set for each of the elements in the dot appearance information array of the second density in the second processing with respect to the observed pixel or with respect to the observed pixel and the neighboring pixel thereof, to each appearance expectation value calculated for each of the elements, with predetermined weights, respectively, then arranges the element numbers in ascending order of third expectation value, and then sets the dot appearance information array of the third density with respect to the observed pixel so that a value indicating presence of a dot is set for one or more of the elements whose third expectation values are smaller than those of the rest of the elements of the arranged element numbers, the number of the one or more of the elements corresponding to a number related to a pixel value of the observed pixel, while a value indicating absence of a dot is set for the rest of the elements of the arranged element numbers.

16. The image processing apparatus of claim 13, wherein brightness of the first density is lower than that of the second density.

17. An image processing method of resolving multi-gradation black-and-white image data into multi-gradation image data having a plurality of densities different from each other and quantizing the multi-gradation image data by an anti-correlation digital halftoning method to convert the multi-gradation image data into pseudo halftone output image data, the method comprising:

performing first processing for setting a dot appearance information array for each pixel of the multi-gradation image data with regard to a first density of the plurality of densities;

performing second processing for setting a dot appearance information array for each pixel of the multi-gradation image data with regard to a second density other than the first density of the plurality of densities, after setting the dot appearance information array of the first density; and performing quantization based on the dot appearance information array of the first density and the dot appearance information array of the second density, each of the dot appearance information array of the first density and the dot appearance information array of the second density including elements identified by element numbers, the number of the elements of an observed pixel of the multi-gradation image data being substantially proportional to the number of gradations of each relevant density of the resolved multi-gradation black-and-white image data, each of the elements representing presence or absence of a dot, wherein when setting the dot appearance information array with respect to an observed pixel in the first processing, a first expectation value of a dot appearance in a neighboring pixel of the observed pixel is calculated by using the already set dot appearance information array of the first density with respect to the neighboring pixel of the observed pixel for each of the element numbers in the already set dot appearance information array of the first density, then the element numbers are arranged in ascending order of first expectation value, and the dot appearance information array of the first density with respect to the observed pixel is set so that a value indicating presence of a dot is set for one or more of the elements whose first expectation values are smaller than those of the rest of the elements of the arranged element numbers, the number of the one or more of the elements corresponding to a number related to a pixel value of the observed pixel, while a value indicating absence of a dot is set for the rest of the elements of the arranged element numbers, when setting the dot appearance information array with respect to an observed pixel in the second processing, a second expectation value of a dot appearance in a neighboring pixel of the observed pixel is calculated by using the already set dot appearance information array of the first density and the already set dot appearance information array of the second density with respect to the neighboring pixel of the observed pixel for each of the element numbers in the already set dot appearance information array of the first density and the already set dot appearance information array of the second density, then the element numbers are arranged in ascending order of second expectation value, and then the dot appearance information array of the second density with respect to the observed pixel is set so that a value indicating presence of a dot is set for one or more of the elements whose second expectation values are smaller than those of the rest of the elements of the arranged element numbers, the number of the one or more of the elements corresponding to a number related to a pixel value of the observed pixel, while a value indicating absence of a dot is set for the rest of the elements of the arranged element numbers.

18. The image processing method of claim 17, wherein in the second processing, an appearance expectation value of a dot appearance in the neighboring pixel of the observed pixel is calculated by using the already set dot appearance information array of the second density with respect to the neighboring pixel of the observed pixel for each of the element numbers in the already set dot appearance information array of the second density, then the second expectation value is calculated by adding the value set for each of the elements in the dot appearance information array of the first density in the first processing with respect to the observed pixel or with respect to the observed pixel and the neighboring pixel thereof, to each appearance expectation value calculated for each of the elements, with a predetermined weight.

19. The image processing method of claim 17, further comprising performing third processing for setting a dot appearance information array for each pixel of the multi-gradation image data with regard to a third density other than the first and second densities of the plurality of densities after the second processing, the dot appearance information array of the third density including elements identified by element numbers, the number of the elements of an observed pixel of the multi-gradation image data being substantially proportional to the number of gradations of the third density of the resolved multi-gradation black-and-white image data, each of the elements representing presence or absence of a dot, wherein the quantization is performed based on the dot appearance information array of the first density, the dot appearance information array of the second density, and the dot appearance information array of the third density, in the third processing, an appearance expectation value of a dot appearance in a neighboring pixel of an observed pixel is calculated by using the already set dot appearance information array of the third density with respect to the neighboring pixel of the observed pixel for each of the element numbers in the already set dot appearance information array of the third density, then a third expectation value of a dot appearance in the neighboring pixel of the observed pixel is calculated for each of the element numbers by adding the value set for each of the elements in the dot appearance information array of the first density in the first processing with respect to the observed pixel or with respect to the observed pixel and the neighboring pixel thereof, and the value set for each of the elements in the dot appearance information array of the second density in the second processing with respect to the observed pixel or with respect to the observed pixel and the neighboring pixel thereof, to each appearance expectation value calculated for each of the elements, with predetermined weights, respectively, then the element numbers are arranged in ascending order of third expectation value, and then the dot appearance information array of the third density with respect to the observed pixel is set so that a value indicating presence of a dot is set for one or more of the elements whose third expectation values are smaller than those of the rest of the elements of the arranged element numbers, the number of the one or more of the elements corresponding to a number related to a pixel value of the observed pixel, while a value indicating absence of a dot is set for the rest of the elements of the arranged element numbers.

20. The image processing method of claim 17, wherein in the first processing, a density whose brightness is lower than that of the second density is selected as the first density.

* * * * *